(12) United States Patent
Limberg

(10) Patent No.: US 8,718,189 B2
(45) Date of Patent: May 6, 2014

(54) DIGITAL BROADCASTING SYSTEMS USING PARALLEL CONCATENATED CODING OF BIT-COMPLEMENTARY BITSTREAMS

(76) Inventor: Allen LeRoy Limberg, Port Charlotte, FL (US)

( * ) Notice: Subject to any disclaimer, the term of this patent is extended or adjusted under 35 U.S.C. 154(b) by 150 days.

(21) Appl. No.: 13/493,198

(22) Filed: Jun. 11, 2012

(65) Prior Publication Data

US 2013/0028335 A1 Jan. 31, 2013

Related U.S. Application Data

(60) Provisional application No. 61/520,532, filed on Jun. 11, 2011, provisional application No. 61/629,369, filed on Nov. 17, 2011, provisional application No. 61/631,834, filed on Jan. 12, 2012.

(51) Int. Cl.
*H04L 27/36* (2006.01)
(52) U.S. Cl.
USPC .......................................................... 375/298
(58) Field of Classification Search
None
See application file for complete search history.

(56) References Cited

U.S. PATENT DOCUMENTS

| 4,491,932 | A  | * | 1/1985  | Ruhman et al. | 382/131 |
| 5,835,131 | A  | * | 11/1998 | Limberg       | 348/21  |
| 7,813,456 | B2 | * | 10/2010 | Chen et al.   | 375/343 |
| 2007/0064588 | A1 | * | 3/2007 | Kisoda et al. | 370/208 |

* cited by examiner

Primary Examiner — Chieh M Fan
Assistant Examiner — Wednel Cadeau

(57) ABSTRACT

A digital television (DTV) system uses parallel concatenated coding (PCC), together with QAM constellations for modulating OFDM carriers. A first encoder responds to ONEs' complemented bits of randomized data to generate a first component of PCC. A second encoder responds to delayed bits of the randomized data to generate a second component of PCC. A constellation mapper generates QAM symbols responsive to successive time-slices of the first component of the PCC interleaved with successive time-slices of the second component of the PCC. An OFDM modulator generates a COFDM modulating signal responsive to the QAM symbols. In a receiver for the DTV system, the second component of the PCC and delayed first component of the PCC are iteratively decoded. Soft bits from the second component and delayed first component of the parallel concatenated coding are code-combined to supply soft randomized data used in that iterative decoding.

24 Claims, 38 Drawing Sheets

Fig. 25  Method of Turbo Decoding with Receiver Apparatus Modified per Fig. 23

Fig. 30  Procedure for Iterative Reed-Solomon Decoding Using the Figure 29 Apparatus Fig. 31 Gray Mapping of 64QAM for Bit-wise FEC Coding Having One-half Code Rate

| 0 | 1 1 | 0 0 | 1 1 | 0 |
|---|---|---|---|---|
| 0 | 1 1 | 0 0 | 1 1 | 0 |
| 0 | 1 1 | 0 0 | 1 1 | 0 |
| 0 | 1 1 | 0 0 | 1 1 | 0 |
| 0 | 1 1 | 0 0 | 1 1 | 0 |
| 0 | 1 1 | 0 0 | 1 1 | 0 |
| 0 | 1 1 | 0 0 | 1 1 | 0 |
| 0 | 1 1 | 0 0 | 1 1 | 0 |

PATTERN OF 1ST
BITS IN 64QAM
CONSTELLATION

PATTERN OF 3RD
BITS IN 64QAM
CONSTELLATION

Fig. 32C

| 1 1 1 1 | 0 0 0 0 |
|---|---|
| 1 1 1 1 | 0 0 0 0 |
| 1 1 1 1 | 0 0 0 0 |
| 1 1 1 1 | 0 0 0 0 |
| 1 1 1 1 | 0 0 0 0 |
| 1 1 1 1 | 0 0 0 0 |
| 1 1 1 1 | 0 0 0 0 |
| 1 1 1 1 | 0 0 0 0 |

PATTERN OF 5TH
BITS IN 64QAM
CONSTELLATION

Fig. 32E

| 0 0 | 1 1 1 1 | 0 0 |
|---|---|---|
| 0 0 | 1 1 1 1 | 0 0 |
| 0 0 | 1 1 1 1 | 0 0 |
| 0 0 | 1 1 1 1 | 0 0 |
| 0 0 | 1 1 1 1 | 0 0 |
| 0 0 | 1 1 1 1 | 0 0 |
| 0 0 | 1 1 1 1 | 0 0 |
| 0 0 | 1 1 1 1 | 0 0 |

PATTERN OF 2ND
BITS IN 64QAM
CONSTELLATION

PATTERN OF 4TH
BITS IN 64QAM
CONSTELLATION

PATTERN OF 6TH
BITS IN 64QAM
CONSTELLATION

Fig. 32F

| EARLIEST DATA BIT | EARLIEST PARITY BIT | NEXT DATA BIT | NEXT PARITY BIT | LATEST DATA BIT | LATEST PARITY BIT |
|---|---|---|---|---|---|

Fig. 33 Nature of Bits at Each Lattice Point in Each 64QAM Symbol Constellation for One-half Rate FEC Coding Fig. 34 Gray Mapping of 64QAM for Bit-wise FEC Coding Having One-third Code Rate

```
0 | 1  1 | 0  0 | 1  1 | 0        0  0 | 1  1  1  1 | 0  0        1  1  1  1 | 0  0  0  0
0 | 1  1 | 0  0 | 1  1 | 0        0  0 | 1  1  1  1 | 0  0        1  1  1  1 | 0  0  0  0
0 | 1  1 | 0  0 | 1  1 | 0        0  0 | 1  1  1  1 | 0  0        1  1  1  1 | 0  0  0  0
0 | 1  1 | 0  0 | 1  1 | 0        0  0 | 1  1  1  1 | 0  0        1  1  1  1 | 0  0  0  0
0 | 1  1 | 0  0 | 1  1 | 0        0  0 | 1  1  1  1 | 0  0        1  1  1  1 | 0  0  0  0
0 | 1  1 | 0  0 | 1  1 | 0        0  0 | 1  1  1  1 | 0  0        1  1  1  1 | 0  0  0  0
0 | 1  1 | 0  0 | 1  1 | 0        0  0 | 1  1  1  1 | 0  0        1  1  1  1 | 0  0  0  0
0 | 1  1 | 0  0 | 1  1 | 0        0  0 | 1  1  1  1 | 0  0        1  1  1  1 | 0  0  0  0
```

PATTERN OF 1ST BITS IN FIG. 29 64QAM CONSTELLATION

Fig. 35A

PATTERN OF 2ND BITS IN FIG. 29 64QAM CONSTELLATION

Fig. 35B

PATTERN OF 3RD BITS IN FIG. 29 64QAM CONSTELLATION

PATTERN OF 4TH BITS IN FIG. 29 64QAM CONSTELLATION

Fig. 35D

PATTERN OF 5TH BITS IN FIG. 29 64QAM CONSTELLATION

Fig. 35E

PATTERN OF 6TH BITS IN FIG. 29 64QAM CONSTELLATION

Fig. 35F

| EARLIER DATA BIT | EARLIER PARITY BIT FROM SET 1 | EARLIER PARITY BIT FROM SET 2 | LATER DATA BIT | LATER PARITY BIT FROM SET 1 | LATER PARITY BIT FROM SET 2 |
|---|---|---|---|---|---|

Fig. 36 Nature of Bits at Each Lattice Point in Each 64QAM Symbol Constellation for One-third Rate FEC Coding Fig. 37A Gray Mapping for - I, + Q Quadrant of 256QAM Used for Bit-wise FEC Coding Having One-half Code Rate Fig. 37B  Gray Mapping for + I, + Q Quadrant of 256QAM Used for Bit-wise FEC Coding Having One-half Code Rate

Fig. 37C Gray Mapping for -I, -Q Quadrant of 256QAM Used for Bit-wise FEC Coding Having One-half Code Rate Fig. 37D Gray Mapping for + I, - Q Quadrant of 256QAM Used for Bit-wise FEC Coding Having One-half Code Rate

| 1ST DATA BIT | 1ST PARITY BIT | 2ND DATA BIT | 2ND PARITY BIT | 3RD DATA BIT | 3RD PARITY BIT | 4TH DATA BIT | 4TH PARITY BIT |
|---|---|---|---|---|---|---|---|

Fig. 38 Nature of Bits at Each Lattice Point in Each 256QAM Symbol Constellation for One-half Rate FEC Coding

| EARLIEST DATA BIT | EARLIEST PARITY BIT FROM SET 1 | EARLIEST PARITY BIT FROM SET 2 | NEXT DATA BIT | NEXT PARITY BIT FROM SET 1 | NEXT PARITY BIT FROM SET 2 | LATEST DATA BIT | LATEST PARITY BIT FROM SET 1 | LATEST PARITY BIT FROM SET 2 |
|---|---|---|---|---|---|---|---|---|

Fig. 39 Nature of Bits at Each Lattice Point in Each 512QAM Symbol Constellation for One-third Rate FEC Coding

Fig. 40A Gray Mapping for - I, + Q Quadrant of 512QAM Used for Bit-wise FEC Coding Having One-third Code Rate Fig. 40B Gray Mapping for + I, + Q Quadrant of 512QAM Used for Bit-wise FEC Coding Having One-third Code Rate Fig. 40C Gray Mapping for - I, - Q Quadrant of 512QAM Used for Bit-wise FEC Coding Having One-third Code Rate Fig. 40D Gray Mapping for + I, - Q Quadrant of 512QAM Used for Bit-wise FEC Coding Having One-third Code Rate Mapping of 3rd, 6th, 7th, 8th & 9th Bits of 9-Bit Sequences re 512QAM Symbol Constellation

| 0100 | 1100 | 1000 | 0000 |
|------|------|------|------|
| 0110 | 1110 | 1010 | 0010 |
| 0111 | 1111 | 1011 | 0011 |
| 0101 | 1101 | 1001 | 0001 |

MAPPING OF 1ST, 2ND, 4TH & 5TH
BITS IN 9-BIT SEQUENCES IN
REGIONS 01001, 11000, 00101, 10100,
10000, 01111, 11110 & 00010 OF THE
512QAM SYMBOL CONSTELLATION

Fig. 42A

| 0000 | 1000 | 1100 | 0100 |
|------|------|------|------|
| 0010 | 1010 | 1110 | 0110 |
| 0011 | 1011 | 1111 | 0111 |
| 0001 | 1001 | 1101 | 0101 |

MAPPING OF 1ST, 2ND, 4TH & 5TH
BITS IN 9-BIT SEQUENCES IN
REGIONS 11001, 01000, 10001, 10101,
00100, 00010, 11111 & 01110 OF THE
512QAM SYMBOL CONSTELLATION

Fig. 42B

| 0101 | 1101 | 1001 | 0001 |
|------|------|------|------|
| 0111 | 1111 | 1011 | 0011 |
| 0110 | 1110 | 1010 | 0010 |
| 0100 | 1100 | 1000 | 0000 |

MAPPING OF 1ST, 2ND, 4TH & 5TH
BITS IN 9-BIT SEQUENCES IN
REGIONS 01101, 11100, 00000, 00111,
10110, 10010, 01011 & 11010 OF THE
512QAM SYMBOL CONSTELLATION

Fig. 42C

| 0001 | 1001 | 1101 | 0101 |
|------|------|------|------|
| 0011 | 1011 | 1111 | 0111 |
| 0010 | 1010 | 1110 | 0110 |
| 0000 | 1000 | 1100 | 0100 |

MAPPING OF 1ST, 2ND, 4TH & 5TH
BITS IN 9-BIT SEQUENCES IN
REGIONS 00001, 11101, 01100, 10011,
10111, 00110, 11011 & 01010 OF THE
512QAM SYMBOL CONSTELLATION

PATTERN OF 1ST
BITS IN REGION OF
512QAM SYMBOL
CONSTELLATION

PATTERN OF 2ND
BITS IN REGION OF
512QAM SYMBOL
CONSTELLATION

PATTERN OF 3RD
BITS IN 512QAM
CONSTELLATION

PATTERN OF 4TH
BITS IN REGION OF
512QAM SYMBOL
CONSTELLATION

PATTERN OF 5TH
BITS IN REGION OF
512QAM SYMBOL
CONSTELLATION

PATTERN OF 6TH
BITS IN 512QAM
CONSTELLATION

PATTERN OF 7TH
BITS IN 512QAM
CONSTELLATION

PATTERN OF 8TH
BITS IN 512QAM
CONSTELLATION

PATTERN OF 9TH
BITS IN 512QAM
CONSTELLATION

Fig. 43I

DIGITAL BROADCASTING SYSTEMS USING PARALLEL CONCATENATED CODING OF BIT-COMPLEMENTARY BITSTREAMS

This application claims the benefit of the filing dates of provisional U.S. Pat. App. Ser. No. 61/520,532 filed 11 Jun. 2011, of provisional U.S. Pat. App. Ser. No. 61/629,369 filed 17 Nov. 2011, and of provisional U.S. Pat. App. Ser. No. 61/631,834 filed 12 Jan. 2012.

FIELD OF THE INVENTION

In general the invention relates to systems of over-the-air broadcasting of digital television (DTV) signals suited for reception by mobile and handset receivers commonly referred to collectively as "M/H" receivers and by "stationary" receivers that customarily remain at one reception site. Each system employs forward-error-correction (FEC) coding of the DTV signals, which are subsequently transmitted using coded orthogonal frequency-division multiplexing (COFDM) of a plurality of carrier waves. Some aspects of the invention more specifically concern transmitters for such systems. Other aspects of the invention more specifically concern stationary receivers and M/H receivers for such systems.

BACKGROUND OF THE INVENTION

DTV broadcasting in the United States of America has been done in accordance with broadcasting standards formulated by an industry consortium called the Advanced Television Systems Committee (ATSC). ATSC published a Digital Television Standard in 1995 that employed 8-level vestigial-sideband amplitude modulation of a single radio-frequency (RF) carrier wave. This DTV transmission system is referred to as 8-VSB. In the beginning years of the twenty-first century efforts were made to provide for more robust transmission of data over broadcast DTV channels without unduly disrupting the operation of so-called "legacy" DTV receivers already in the field. These efforts culminated in an ATSC standard directed to broadcasting digital television and digital data to mobile receivers being adopted on 15 Oct. 2009. This subsequent standard also used 8-level vestigial-sideband amplitude modulation of a single RF carrier wave, so the more robust transmission of data could be time-division multiplexed with the transmission of DTV signal to so-called "legacy" DTV receivers already in the field.

DTV broadcasting in Europe has employed coded orthogonal frequency-division multiplexing (COFDM) that employs a multiplicity of RF carrier waves closely spaced across each 6-, 7- or 8-MHz-wide television channel, rather than a single RF carrier wave per television channel. Adjacent carrier waves are orthogonal to each other. Successive multi-bit symbols are selected from a serial data stream and used to modulate respective ones of the multiplicity of RF carrier waves in turn, in accordance with a conventional modulation scheme—such as quaternary phase shift keying (QPSK) or quadrature amplitude modulation (QAM). QPSK is preferably DQPSK, using differential modulation that is inherently insensitive to slowly changing amplitude and phase distortion. DPSK simplifies carrier recovery in the receiver. Customarily, the QAM is either 16 or 64 QAM using square 2-dimensional modulation constellations. In actual practice, the RF carrier waves are not modulated individually. Rather, a single carrier wave is modulated at high symbol rate using QPSK or QAM. The resulting modulated carrier wave is then transformed in a fast inverse discrete Fourier transform (I-DFT) procedure to generate the multiplicity of RF carrier waves each modulated at low symbol rate.

In Europe, broadcasting to handset receivers is done using a system referred to as DVB-H. DVB-H (Digital Video Broadcasting—Handset) is a digital broadcast standard for the transmission of broadcast content to handset receivers, published in 2004 by the European Telecommunications Standards Institute (ETSI) and identified as EN 302304. DVB-H, as a transmission standard, specifies the physical layer as well as the elements of the lower protocol layers. It uses a power-saving technique based on the time-multiplexed transmission of different services. The technique, called "time-slicing", allows substantial saving of battery power. Time-slicing facilitates soft hand-over as the receiver moves from network cell to network cell. The relatively long power-save periods may be used to search for channels in neighboring radio cells offering the selected service. Accordingly, at the border between two cells, a channel hand-over can be performed that is imperceptible by the user. Both the monitoring of the services in adjacent cells and the reception of the selected service data can utilize the same front-end tuner.

In contrast to other DVB transmission systems, which are based on the DVB Transport Stream adopted from the MPEG-2 standard, the DVB-H system is based on Internet Protocol (IP). The DVB-H baseband interface is an IP interface allowing the DVB-H system to be combined with other IP-based networks. Even so, the MPEG-2 transport stream is still used by the base layer. The IP data are embedded into the transport stream using Multi-Protocol Encapsulation (MPE), an adaptation protocol defined in the DVB Data Broadcast Specification. At the MPE level, DVB-H employs an additional stage of forward error correction called MPE-FEC, which is essentially (255, 191) transverse Reed-Solomon (TRS) coding. This TRS coding reduces the S/N requirements for reception by a handheld device by a 7 dB margin compared to DVB-T. The block interleaver used for the TRS coding creates a specific frame structure, called the "FEC frame", for incorporating the incoming data of the DVB-H codec.

The physical radio transmission of DVB-H is performed according to the DVB-T standard and employs OFDM multi-carrier modulation. DVB-T employed coded orthogonal frequency division multiplexing (COFDM) in which an 8-MHz-wide radio-frequency (RF) channel comprises somewhat fewer than 2000 or somewhat fewer than 8000 evenly-spaced carriers for transmitting to stationary DTV receivers. DVB-T2, an upgrade of DVB-T proposed in 2011, further permits somewhat fewer than 4000 evenly-spaced carrier waves, better to accommodate transmitting to mobile receivers. These choices as to number of carrier waves are commonly referred to as 2K, 8K and 4K options.

Generally, DVB-H uses only a fraction (e.g., one quarter) of the digital payload capacity of the RF channel. Typically, consecutive time intervals referred to as "super-frames" are each composed of four consecutive frame intervals of like duration, three of which frame intervals are employed for DVB-T or DVB-T2 broadcasting to stationary DTV receivers. The fourth frame interval in each super-frame is divided into eight time-slice intervals that are employed for DVB-H broadcasting to mobile and handset DTV receivers.

COFDM has been considered for DTV broadcasting in the United States of America more than once, competing in the 1990's with 8-VSB and other single-carrier transmission systems for selection by ATSC as its Digital Television Standard. COFDM was considered as a replacement for 8-VSB at the time that the ATSC Digital Television Standard was updated to permit more robust transmissions for reception by mobile receivers. At that time any technical advantages of COFDM were over-ridden by the need not to obsolete DTV receivers already in the field, lest advertising-supported over-the-air DTV fail as a commercially viable business. However, reportedly COFDM is better adapted for use in single-frequency networks (SFNs) than is 8-VSB amplitude modulation, so COFDM is likely again to be considered for DTV broadcasting in the United States of America. The 2K, 8K and 4K options are retained in proposals for such DTV broadcasting, with bit rates being scaled back to suit the 6-MHz-wide RF channels used in the United States rather than the 8-MHz-wide RF channels used in Europe.

COFDM is able to overcome frequency-selective fading quite well, but reception will fail if there is protracted severe flat-spectrum fading. Such flat-spectrum fading is sometimes referred to as a drop-out in received signal strength. Such drop-out occurs when the receiving site changes such that a sole effective signal transmission path is blocked by an intervening hill or structure, for example. Because the signaling rate in the individual OFDM carriers is very low, COFDM receivers are capable of maintaining reception despite drop-outs that are only a fraction of a second in duration. However, drop-outs that last as long as a few seconds disrupt television reception perceptibly. Such protracted drop-outs are encountered in a vehicular receiver when the vehicle passes through a tunnel, for example. By way of further example of a protracted drop-out in reception, a stationary DTV receiver may briefly discontinue COFDM reception when receiver synchronization is momentarily lost during dynamic multipath reception conditions, as caused by aircraft flying over the reception site.

The ATSC standard directed to broadcasting digital television and digital data to mobile receivers used TRS coding that extended over eighty or a few more dispersed-in-time short time-slot intervals, rather than being confined to a single longer time-slot interval. A principal purpose of the TRS coding that extended over eighty or so time-slot intervals was overcoming occasional protracted drop-outs in received signal strength. Confining TRS coding to a single longer time-slot interval as done in DVB-H sacrifices such capability, but is advantageous in that error-correction is completed within a shorter time. This helps speed up changes in RF channel tuning, for example.

Iterative-diversity transmissions were proposed to facilitate alternative or additional techniques for dealing with flat-spectrum fading of 8-VSB signals. Some of these proposals were directed to separate procedures being used for decoding earlier and later transmissions of the same coded data to generate respective sets of data packets, each identified after such decoding either as being probably correct or probably incorrect. Corresponding data packets from the two sets were compared, and a further set of data packets was chosen from the ones of the compared data packets more likely to be correct. A. L. R. Limberg proposed delaying earlier transmissions of concatenated convolutionally coded (CCC) data so as to be contemporaneously available with later transmissions of similar CCC data, then decoding the contemporaneous CCC data with respective turbo decoders that exchanged information concerning soft data bits to secure coding gain. These techniques, although comparatively robust in regard to overcoming additive White Gaussian noise (AWGN), reduce code rate by a factor of three, as compared to non-repeated transmissions with simple one-half-rate convolutional coding. Also, these techniques require more delay memory for the earlier transmitted data than does implementation of iterative-diversity reception at the transfer-stream (TS) data-packet level, owing to the parity bits of the FEC coding of the data also having to be delayed.

The parallel iterative operation of two turbo decoders consumes more power than is desirable, particularly in battery-powered receivers. Maximal-ratio code combining is a technique that has been used for combining similar transmissions from a plurality of transmitters in multiple-input/multiple-output (MIMO) networks. Searching for a way to avoid parallel iterative operation of two turbo decoders, A. L. R. Limberg considered the use of maximal ratio code combining of later transmissions of CCC with earlier similar CCC transmissions from the same 8-VSB transmitter. The hope was that a combined signal would be generated that could be decoded by iterative operation of a single turbo decoder. One problem encountered when trying to implement such an approach in 8-VSB broadcasting is that the coding of M/H-service data is not independent of the coding of main-service data. The inner convolutional coding of the M/H signal is part of a one-half-rate convolutional coding that intersperses main-service signal components with M/H-service signal components. Accordingly, practically considered, the inner convolutional coding of the later transmissions of CCC and the inner convolutional coding of the delayed earlier transmissions of CCC still have to be decoded separately. The outer convolutional coding of the M/H signal is affected by the pre-coding of the most-significant bits of 8-VSB symbols responding to main-service data interspersed among the most-significant bits of 8-VSB symbols responding to M/H-service data. There are also some problems with measuring the energies of the later transmissions of CCC and the delayed earlier transmissions of CCC to provide the information needed for weighting these transmissions for maximal-ratio code combining.

In a replacement system for DTV broadcasting in the United States of America that uses COFDM of a plurality of carrier waves, the FEC coding of main-service data and the FEC coding of M/H-service data can be kept independent of each other. Also, the inclusion of unmodulated carrier waves among the COFDM carrier waves facilitates measurements of their total root-mean-square (RMS) energy in later transmissions and in earlier transmissions of similar data to provide the information needed to weight later and delayed earlier transmissions appropriately for maximal-ratio code combining. The COFDM is based on complex-number coordinates of two-dimensional symbol constellations of quadrature amplitude modulation (QAM)

Iterative-diversity reception implemented at the transfer-stream (TS) data-packet level does not require as much delay memory for the earlier transmitted data as delaying complete earlier transmissions to be contemporaneous with later transmissions of the same data. This is because the redundant parity bits associated with FEC coding contained in those complete earlier transmissions is removed during its decoding and so do not need to be delayed. However, implementation of iterative-diversity reception at the TS data-packet level sacrifices the substantial coding gain that can be achieved by decoding delayed earlier transmissions concurrently with later transmissions of similar data. Implementation of iterative-diversity reception at the TS data-packet level is also incompatible with code-combining of delayed earlier transmissions and later transmissions of similar data being used to improve signal-to-noise ratio (SNR).

Time-sliced reception can substantially reduce the amount of delay memory required for iterative-diversity reception of DTV signals transmitted using COFDM. Such reduction in the size of delay memory also conserves the operating power that would otherwise be consumed by the eliminated memory. If each service broadcast to stationary DTV receivers occupies no more than one frame out of four in a super-frame, time-sliced reception can reduce by a factor of four the amount of delay memory that a stationary DTV receiver requires for iterative-diversity reception. If each service broadcast to M/H receivers occupies no more than 1/32 of a super-frame, time-sliced reception can reduce by a factor of thirty-two the amount of delay memory that an M/H receiver requires for iterative-diversity reception.

DVB-T2 employs low-density parity check (LDPC) coding as forward-error-correction (FEC) coding to help overcome intersymbol interference (ISI) and other AWGN, rather than using convolutional coding, product coding, or concatenated convolutional coding (CCC). An LDPC code is based on an H matrix containing a low count of ones. Encoding uses equations derived from the H matrix to generate the parity check bits. Decoding is accomplished using these equations with "soft-decisions" as to transmitted symbols to generate new estimates of the transmitted symbols. This process is repeated in an iterative manner resulting in a powerful decoder. Like parallel concatenated convolutional coding (PCCC), LDPC codes are subject to error floors. Outer coding, such as Bose-Chaudhuri-Hocquenghem (BCH) coding, can be added to LDPC technology to lower the error floor. The BCH coding can be Reed-Solomon (RS) coding, for example. Reportedly, LDPC coding provides AWGN performance that can approach the Shannon Limit even more closely than PCCC.

In US-2010-0293433-A1 published 18 Nov. 2010 with the title "Burst-error correction methods and apparatuses for wireless digital communications systems" A. L. R. Limberg described the data in the initial-transmission component of an iterative-diversity 8-VSB AM transmission differing from the data bits in the final-transmission component, the data bits in each of the components of that iterative-diversity transmission being the ONEs' complements of the data bits in the other one of the components. ONEs' complementing the data bits in the initial-transmission component of an iterative-diversity transmission tends to increase the number of ONEs therein when the original set of data bits is sparsely populated by ONEs. Accordingly, parallel concatenated convolutional coding (PCCC) generated from that data is less likely to be sparsely populated by ONEs. Sparse population of ONEs in PCCC coding is known to result in poorer reception via Rayleigh channels.

In the prior art one way that designers attempted to avoid the problem of sparse population of ONEs in convolutional coding or in PCCC was by using recursive systematic convolutional (RSC) coding, rather than non-systematic convolutional (NSC) coding that does not involve recursion. The recursion in RSC coding tends to generate ONEs in its parity bits, despite a limited number of ONEs in its data bits. This way of trying to avoid the problem of sparse population of ONEs depends upon the component codes in concatenated coding using recursion, which is not true of certain codes such as LDPC codes. ONEs' complementing the data bits when generating one of the component codes of concatenated coding will provide relief from sparsity of ONEs even when using coding methods that do not employ recursion.

In the prior art another way that designers attempted to avoid the problem of sparse population of ONEs in PCCC was by interleaving data bits for one of the component convolutional coding procedures to disperse ONEs differently than the data bits involved in the other of the component convolutional coding procedures. This had the further beneficial effect that additive white Gaussian noise (AWGN) would affect the component convolutional codes differently, even though the data bits were transmitted only once. The effects of AWGN on the parity bits in the component convolutional codes is different, the bit-interleaving providing a degree of temporal diversity between the component convolutional codes that aids in iterative decoding procedures called "turbo decoding".

The bit-interleaving of data in one component of convolutional coding in prior-art PCCC introduces undesirable delay into the soft-input/soft-output decoding of that component convolutional coding. This delay is introduced during the de-interleaving of the bit-interleaved results of the SISO decoding of that component convolutional coding. This delay is introduced in each cycle of turbo decoding in the receiver, and appreciably slows the iterative decoding procedures in aggregate.

SUMMARY OF THE INVENTION

COFDM digital television broadcast systems embodying some aspects of the invention employ transmitters that broadcast different components of parallel concatenated coding of the same data at separate times more than a second apart, to facilitate iterative-diversity reception. The set of data bits in the initial-transmission component of the COFDM iterative-diversity transmission differs from the set of data bits in the final-transmission component, the data bits in each of the components of that iterative-diversity transmission being the ONEs' complements of the data bits in the other one of the components. The data bits in each of the components of that iterative-diversity transmission are coded in similar redundant coding procedures. This is done without bit-interleaving either set of data bits before their FEC coding, in order to avoid the need for receivers to de-interleave of that set of data bits during each cycle of iterative decoding. The respective coding of each of the components of the COFDM iterative-diversity transmission differs from the other because of the data bits in each of the components of that iterative-diversity transmission being the ONEs' complements of the data bits in the other one of the components, rather than because of differential shuffling of bit order as between the components of the iterative-diversity transmission. There is a substantially greater degree of temporal diversity between the initial-transmission and the final-transmission components than that that would be furnished by a conventional bit-interleaver for PCCC.

A COFDM digital television receiver embodying aspects of the invention employs a novel form of turbo decoding using a pair of component soft-input/soft-output decoders, neither of which is preceded by a bit-interleaver or succeeded by a de-interleaver for bit-interleaved decoding results. In further aspects of the invention, iterative decoding procedures are preceded by an initial procedure in which a maximal-ratio code combiner combines the soft data bits in the earlier transmitted component of the parallel concatenated coding with the soft data bits in the corresponding later transmitted component of the parallel concatenated coding. This initial procedure generates the soft data bits used in the subsequent iterative decoding procedures, which soft data bits are less susceptible to interruption caused by losses in received signal strength.

In some embodiments of the invention, COFDM digital television broadcast systems broadcast parallel concatenated convolutional coding (PCCC) composed of two convolutional coding (CC) components transmitted a few seconds apart. The CC of the data earlier transmitted is one portion of PCCC suitable for iterative decoding procedures, and the CC of the data later transmitted is the remaining portion of the same PCCC. In a receiver the earlier CC and the later transmitted CC are combined with each other to reproduce PCCC for being turbo decoded.

In other embodiments of the invention, COFDM digital television broadcast systems transmit parallel concatenated coding composed of two low-density parity-check (LDPC) coding components transmitted a few seconds apart. The set of data bits transmitted in the LDPC coding of the initial-transmission component of the COFDM iterative-diversity transmission differs from the set of data bits transmitted in the LDPC coding of the final-transmission component of the COFDM iterative-diversity transmission, the data bits in each of the components of that iterative-diversity transmission being the ONEs' complements of the data bits in the other one of the components. In a receiver that embodies aspects of the invention, the earlier transmitted LDPC coding is delayed so as to be concurrent with the corresponding later transmitted LDPC coding. The delayed earlier transmitted LDPC coding and the corresponding later transmitted LDPC coding are then combined with each other to reproduce parallel concatenated LDPC coding for being iteratively decoded.

BRIEF DESCRIPTION OF THE DRAWING FIGURES

FIGS. 1 and 2 combine to form a schematic diagram of a portion of a novel COFDM transmitter for a DTV system, which transmitter is capable of transmitting parallel concatenated CC signals designed for iterative-diversity reception by stationary DTV receivers.

FIGS. 3 and 4 combine to form a schematic diagram of a portion of a novel COFDM transmitter for a DTV system, which transmitter is capable of transmitting parallel concatenated CC signals designed for iterative-diversity reception by mobile DTV receivers.

Figure 1:
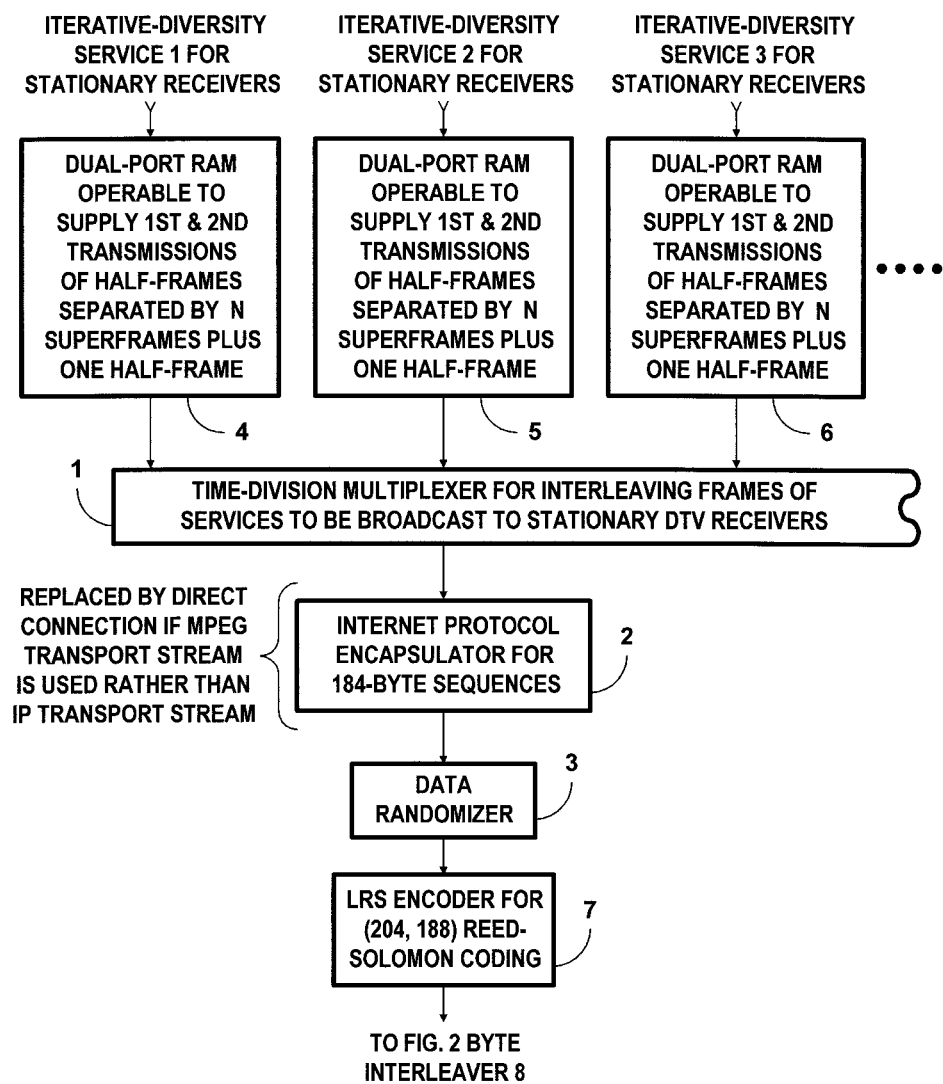
Figure 2:
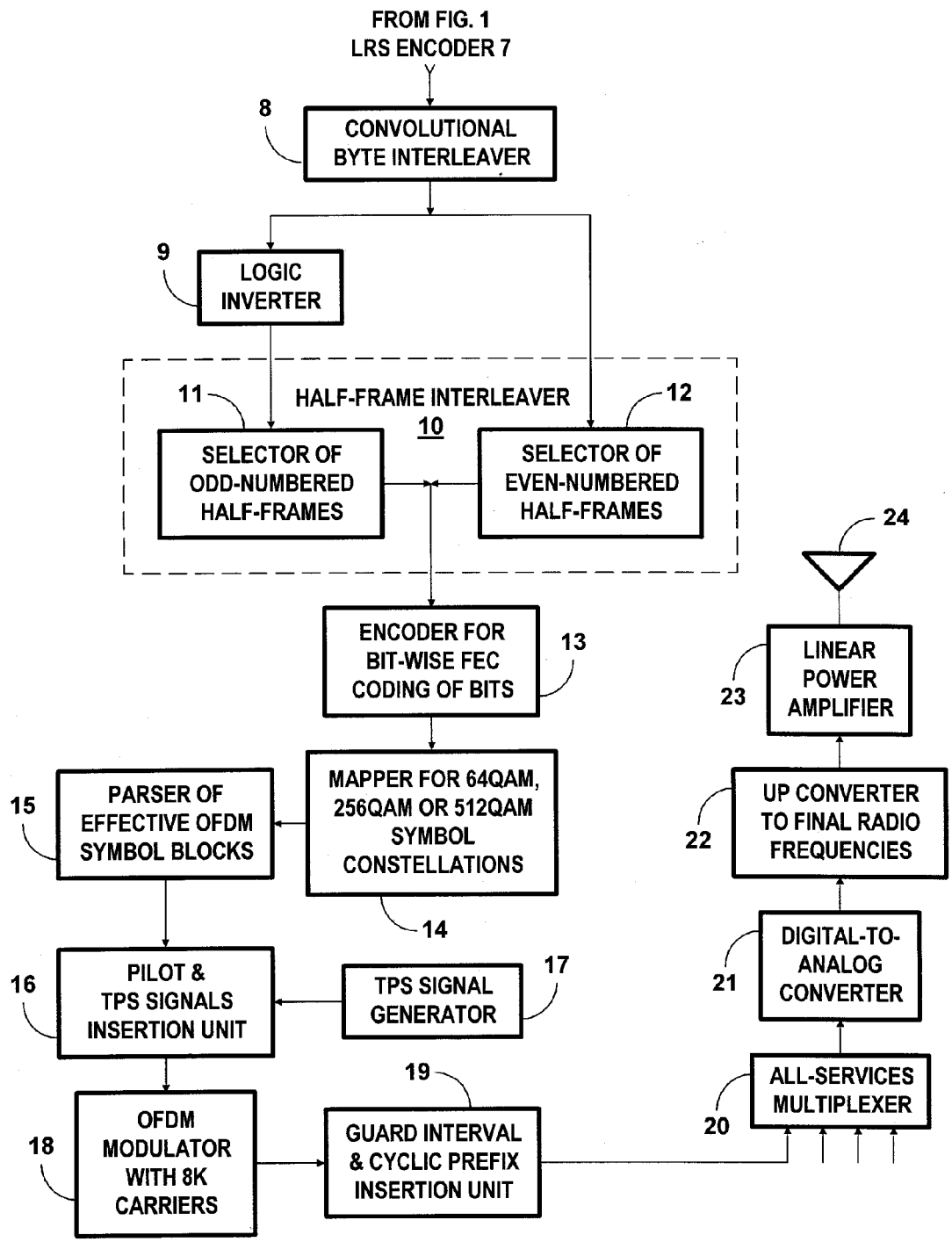
Figure 11:
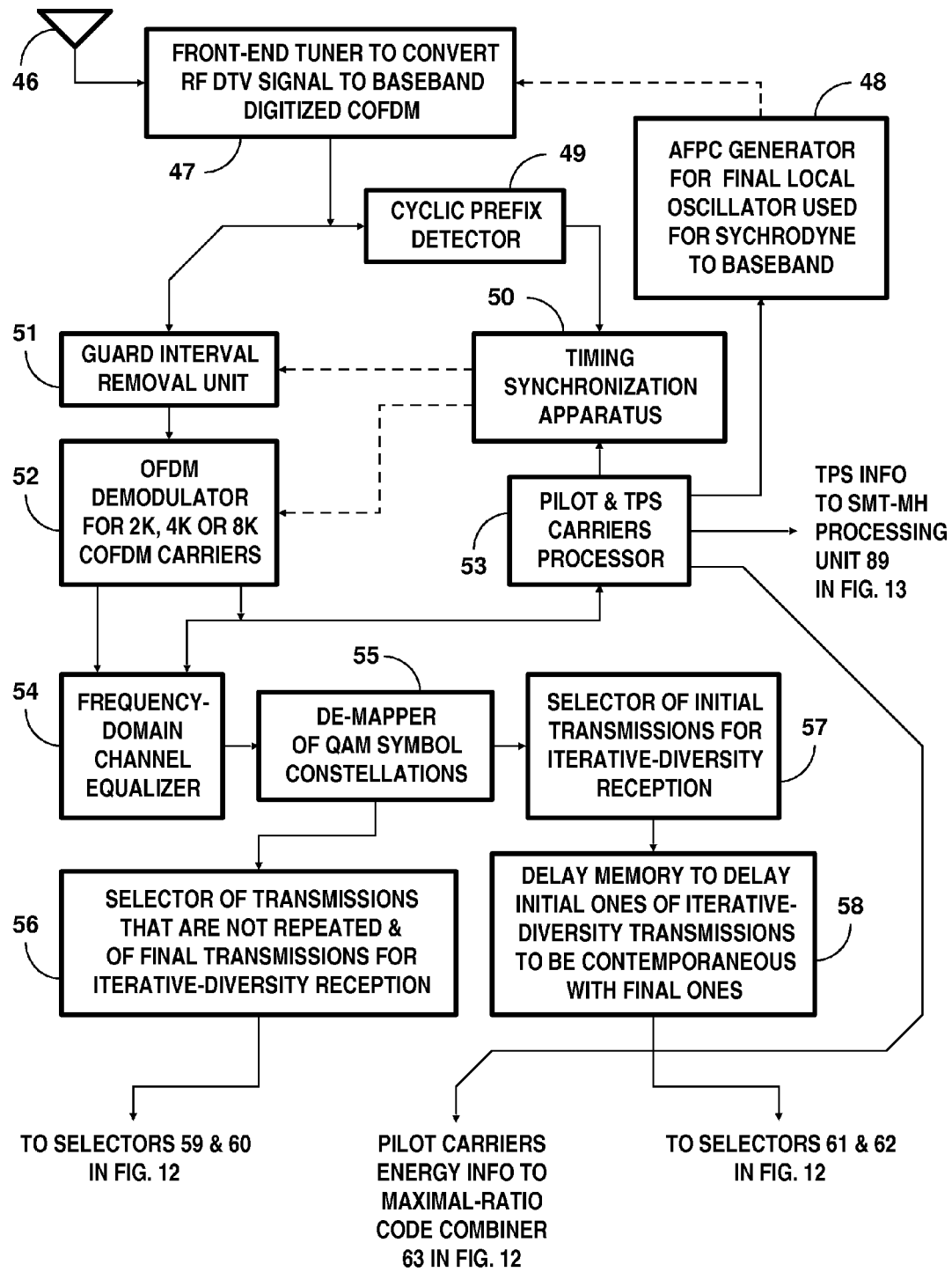
Figure 12:
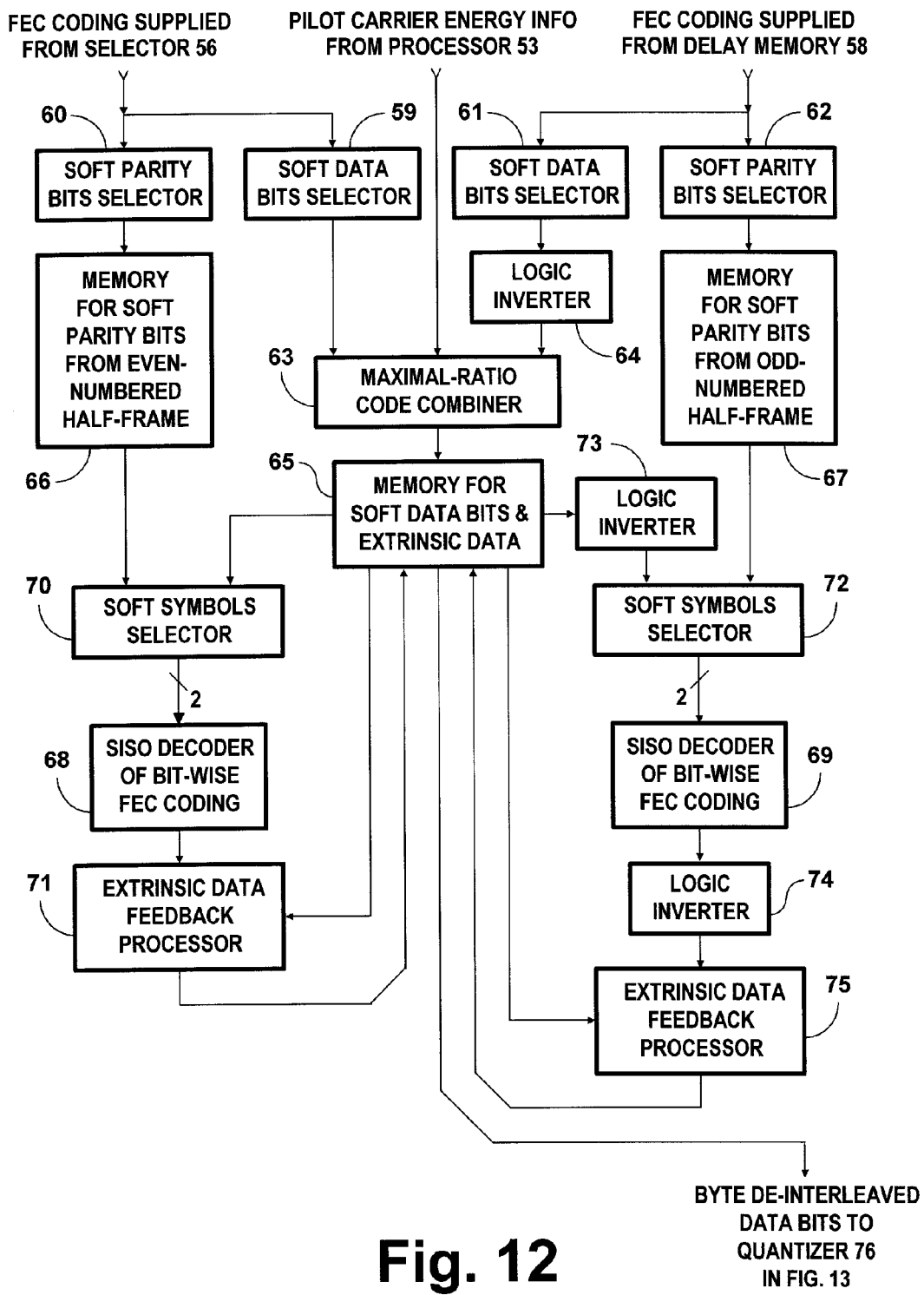
Figure 13:
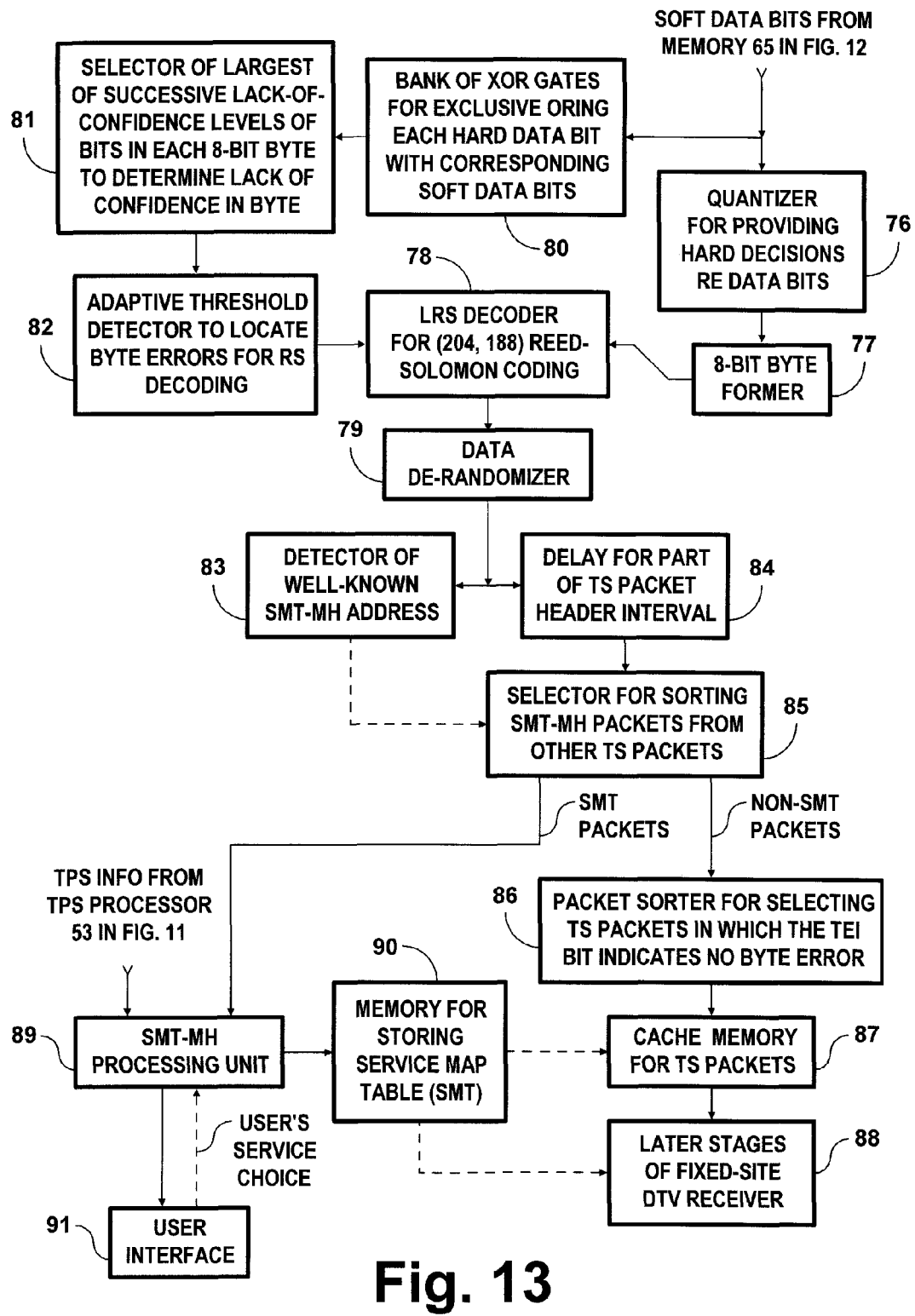

FIGS. 11, 12 and 13 combine to provide a generic schematic diagram of a stationary DTV receiver adapted for iterative-diversity reception of COFDM signals as transmitted by the portions of the DTV transmitter as depicted in FIGS. 1 and 2, which DTV receiver is novel and embodies aspects of the invention.

Figure 3:
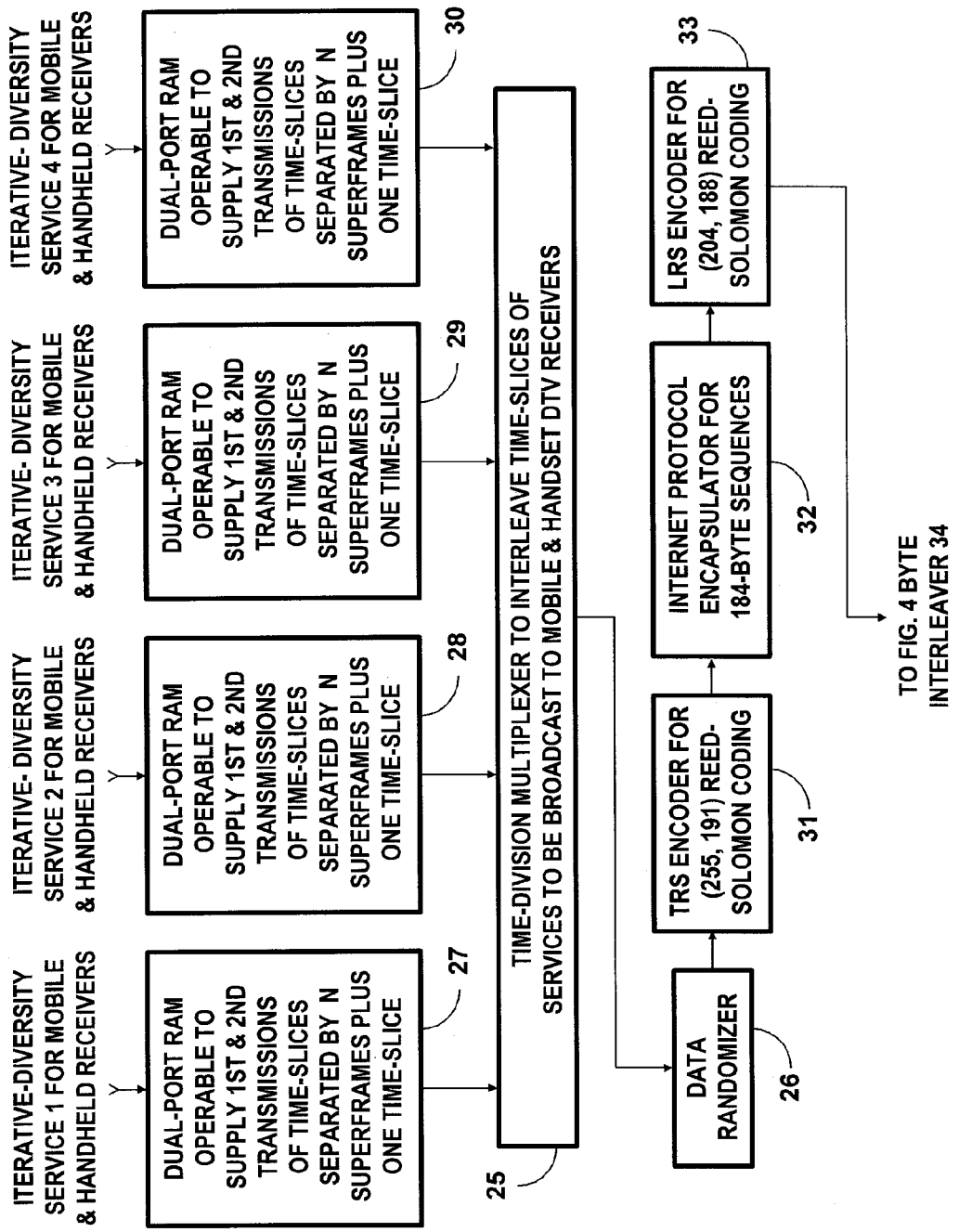
Figure 4:
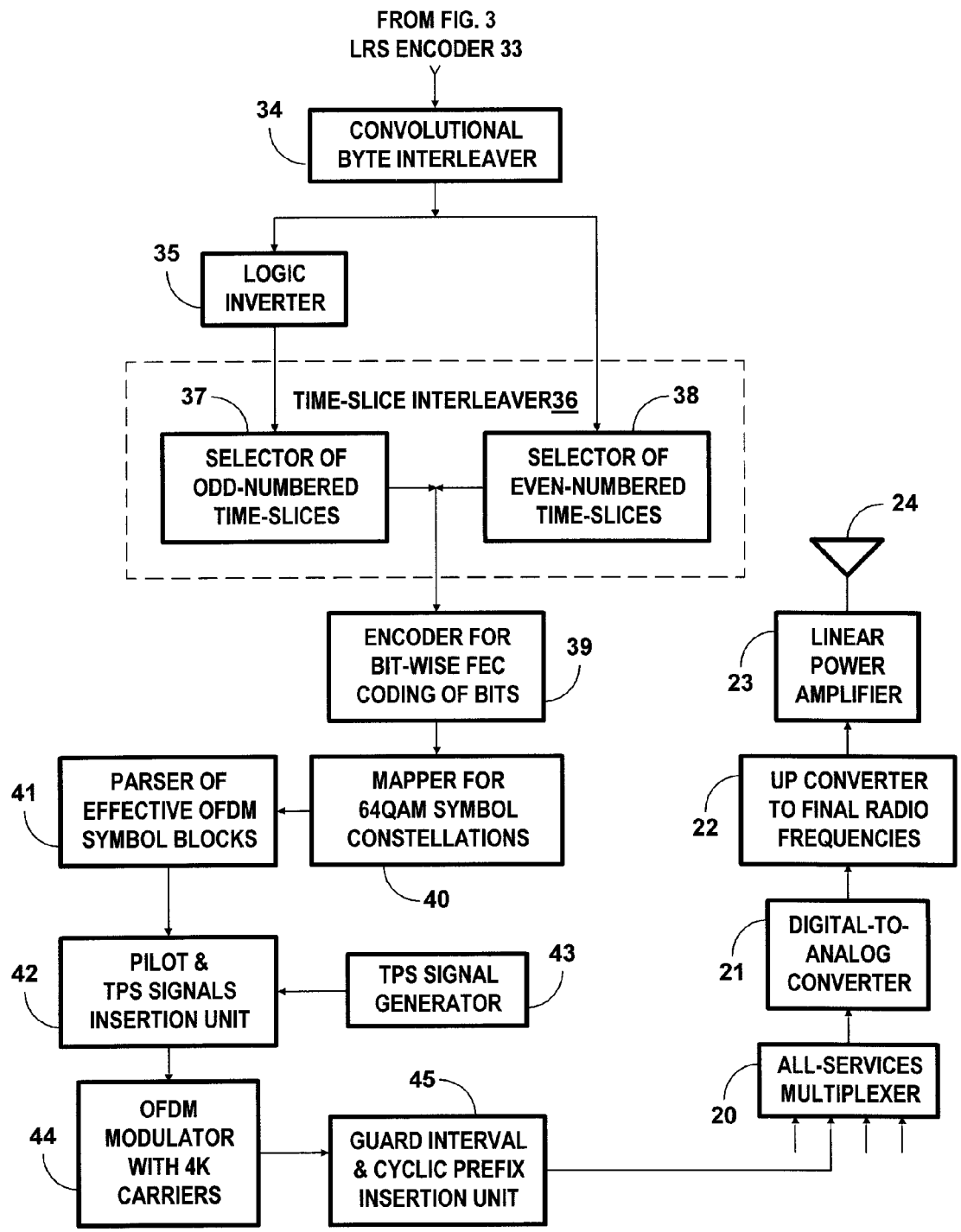

FIGS. 14, 15, 16 and 17 combine to provide a generic schematic diagram of a mobile DTV receiver adapted for iterative-diversity reception of COFDM signals as transmitted by the portions of the DTV transmitter depicted in FIGS. 3 and 4, which DTV receiver is novel and embodies aspects of the invention.

Figure 15:
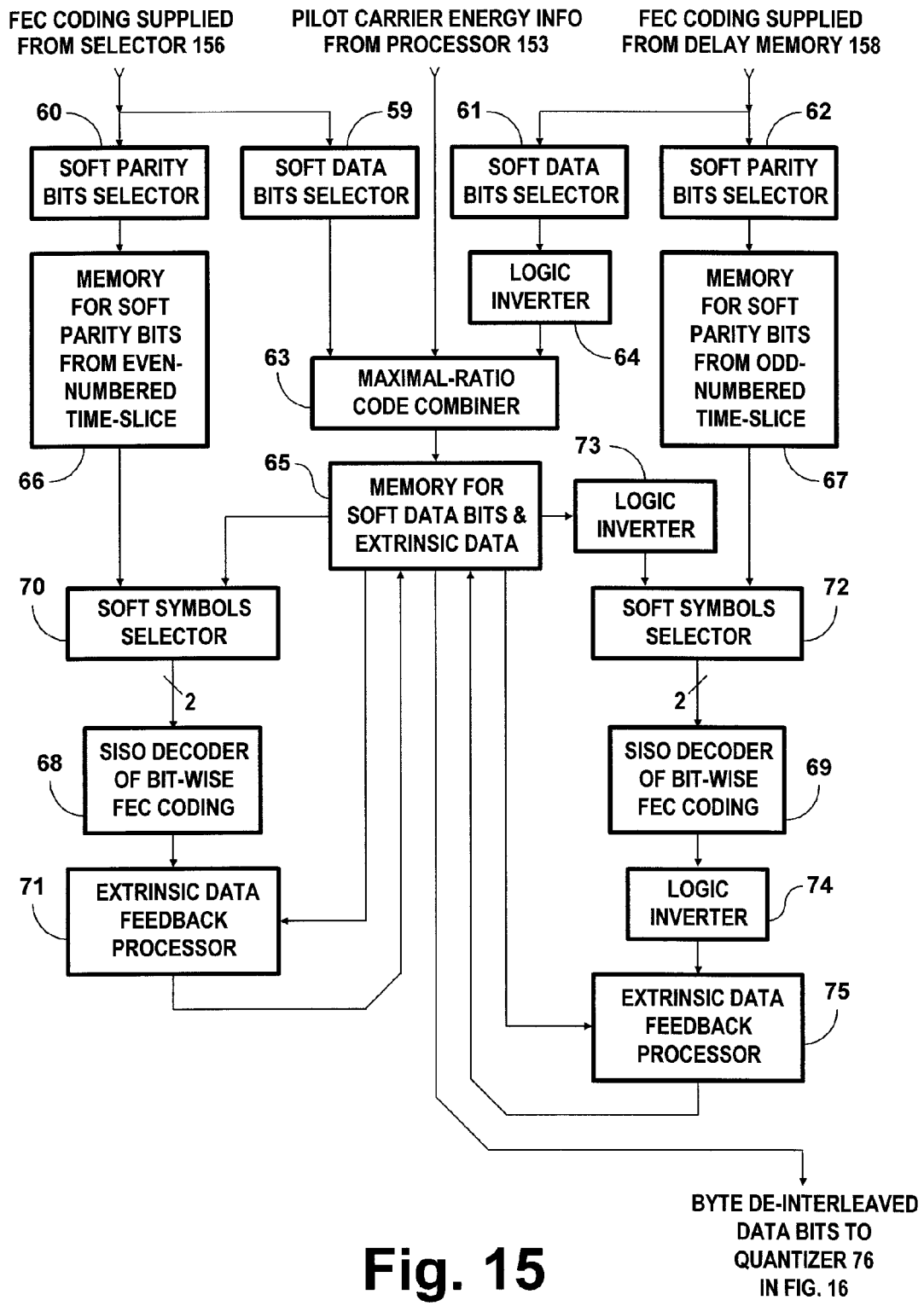

FIGS. 18, 19, 20, 21 and 22 illustrate respective sorts of decoders for various species of bit-wise forward-error-correction coding, any one of which sorts of decoders can be used in the FIG. 12 and FIG. 15 portions of a COFDM transmitter for a DTV system embodying aspects of the invention.

Figure 23:
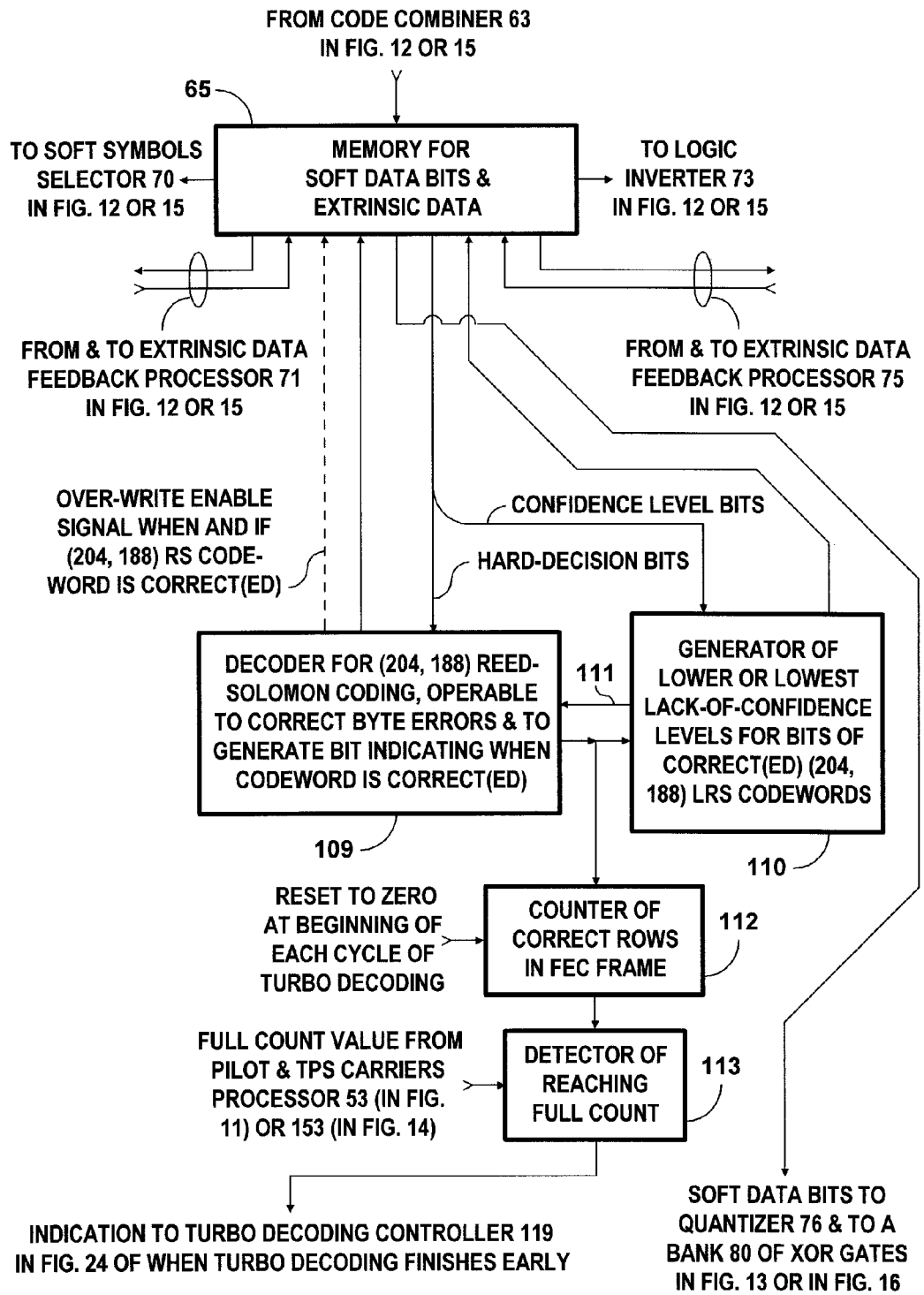

FIG. 23 is a detailed schematic diagram of a modification of either of the turbo decoders shown in FIGS. 12 and 15, in which modification a (204, 188) Reed-Solomon decoder is used to decrease the lack-of-confidence levels of data bits of correct (204, 188) Reed-Solomon codewords as an aid to turbo decoding procedures.

Figure 24:
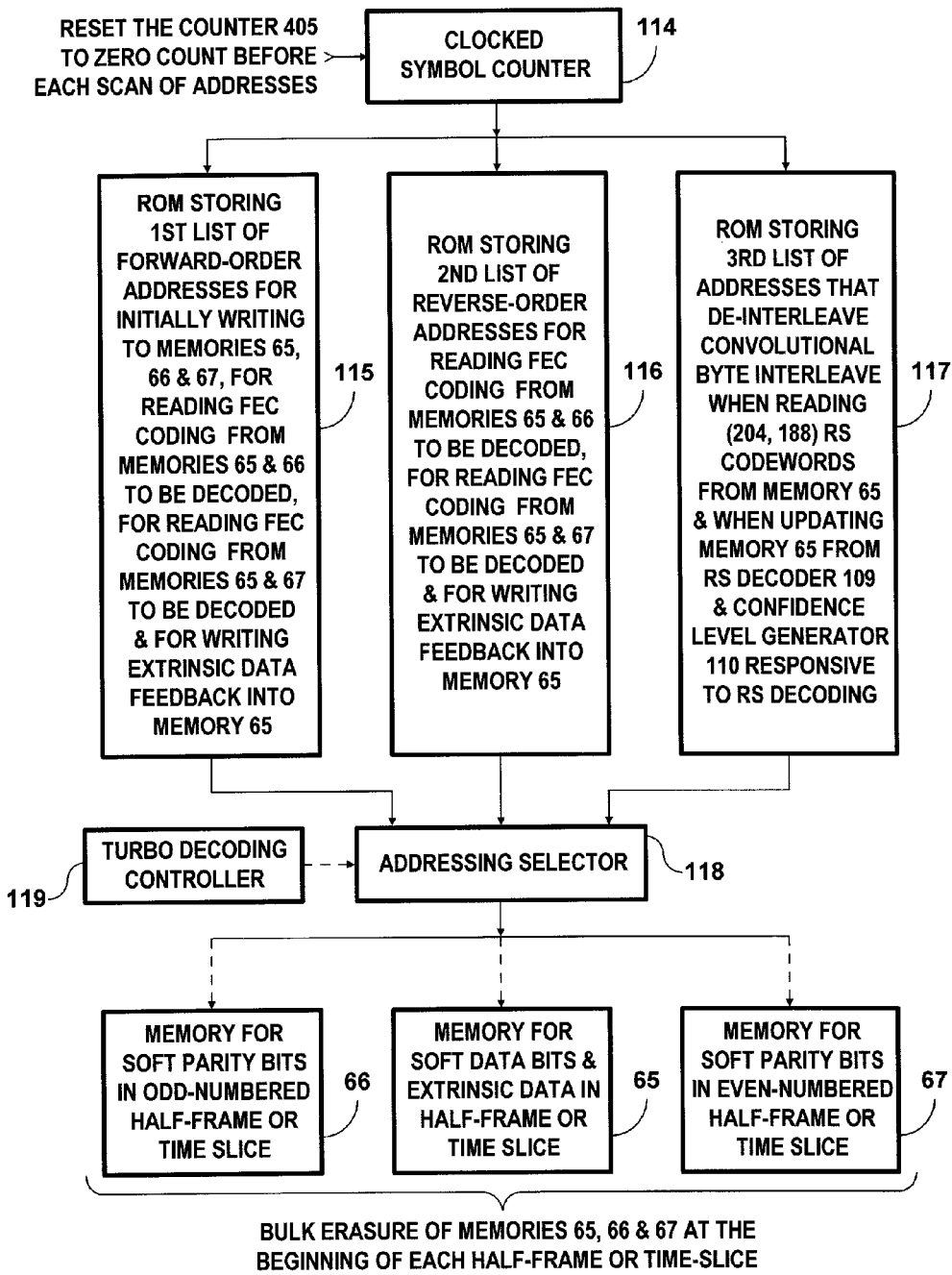

FIG. 24 is a schematic diagram of apparatus for addressing memories of either of the turbo decoders shown in FIGS. 12 and 15.

Figure 25:
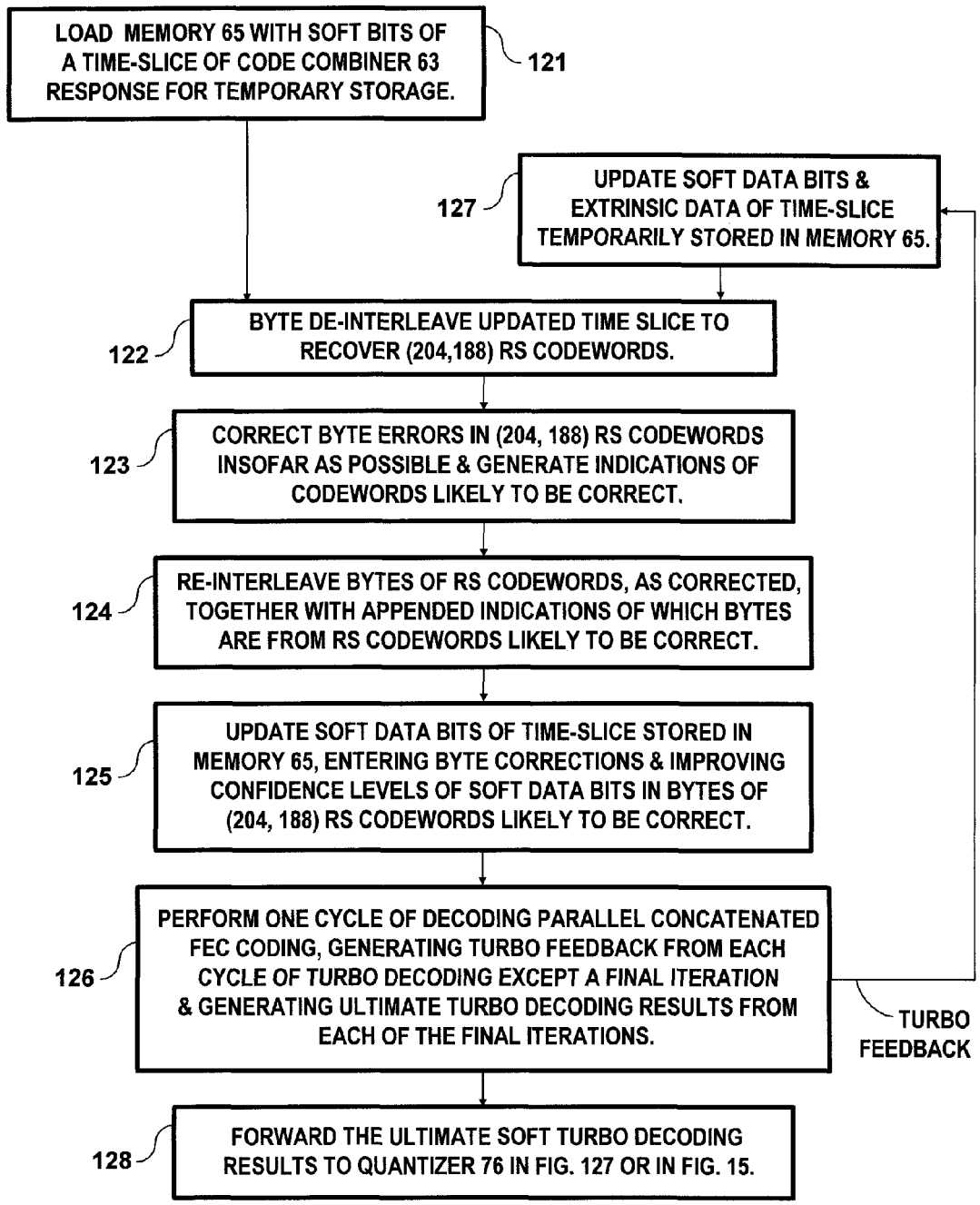

FIG. 25 is an informal flow chart illustrating the method by which turbo decoding procedures are aided by the (204, 188) Reed-Solomon decoder in either of the turbo decoders shown in FIGS. 12 and 15 as modified per FIG. 23.

Figure 26:
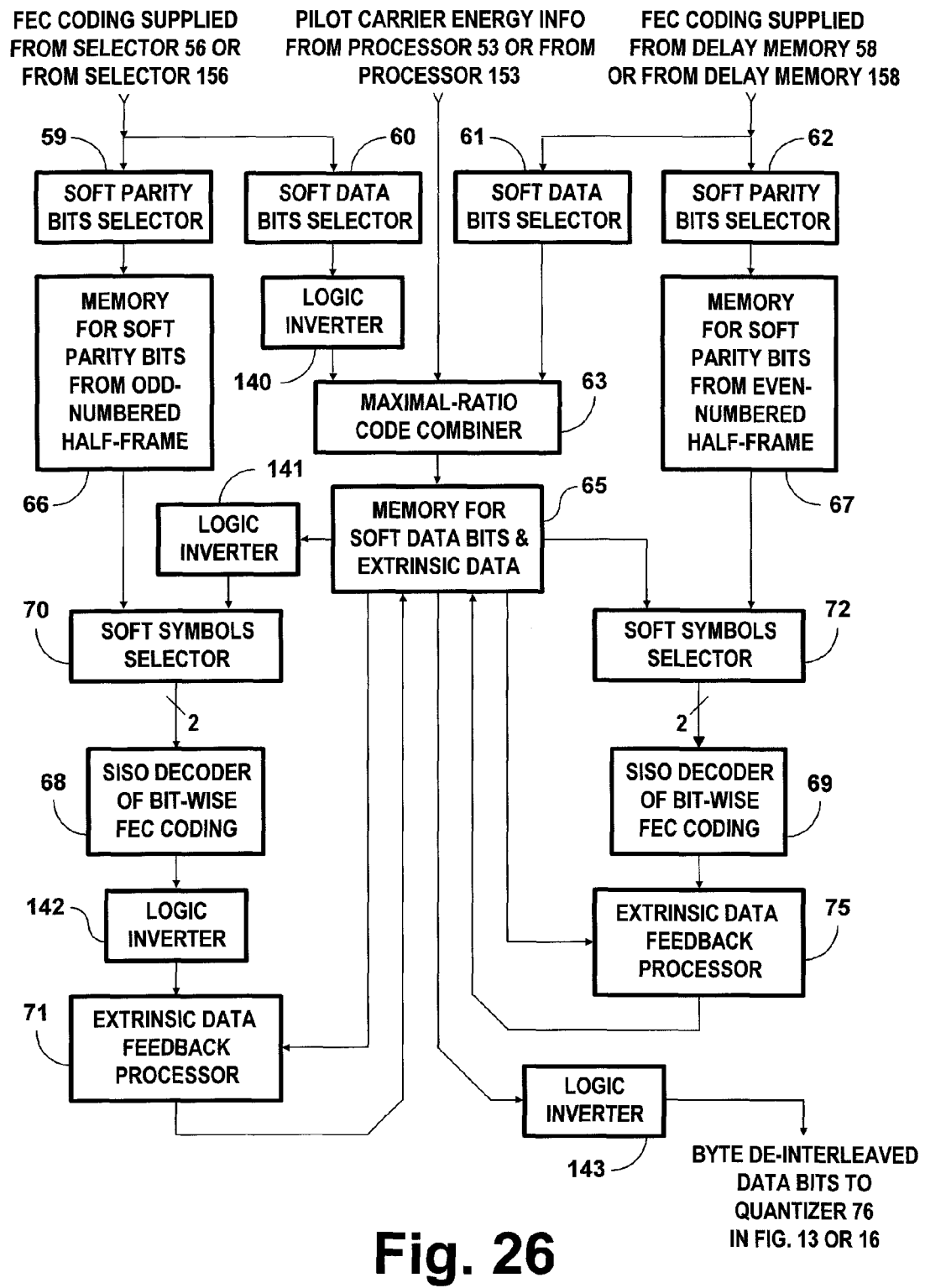

FIG. 26 is a schematic diagram of a turbo decoder that can replace either of the turbo decoders shown in FIGS. 12 and 15.

Figure 27:
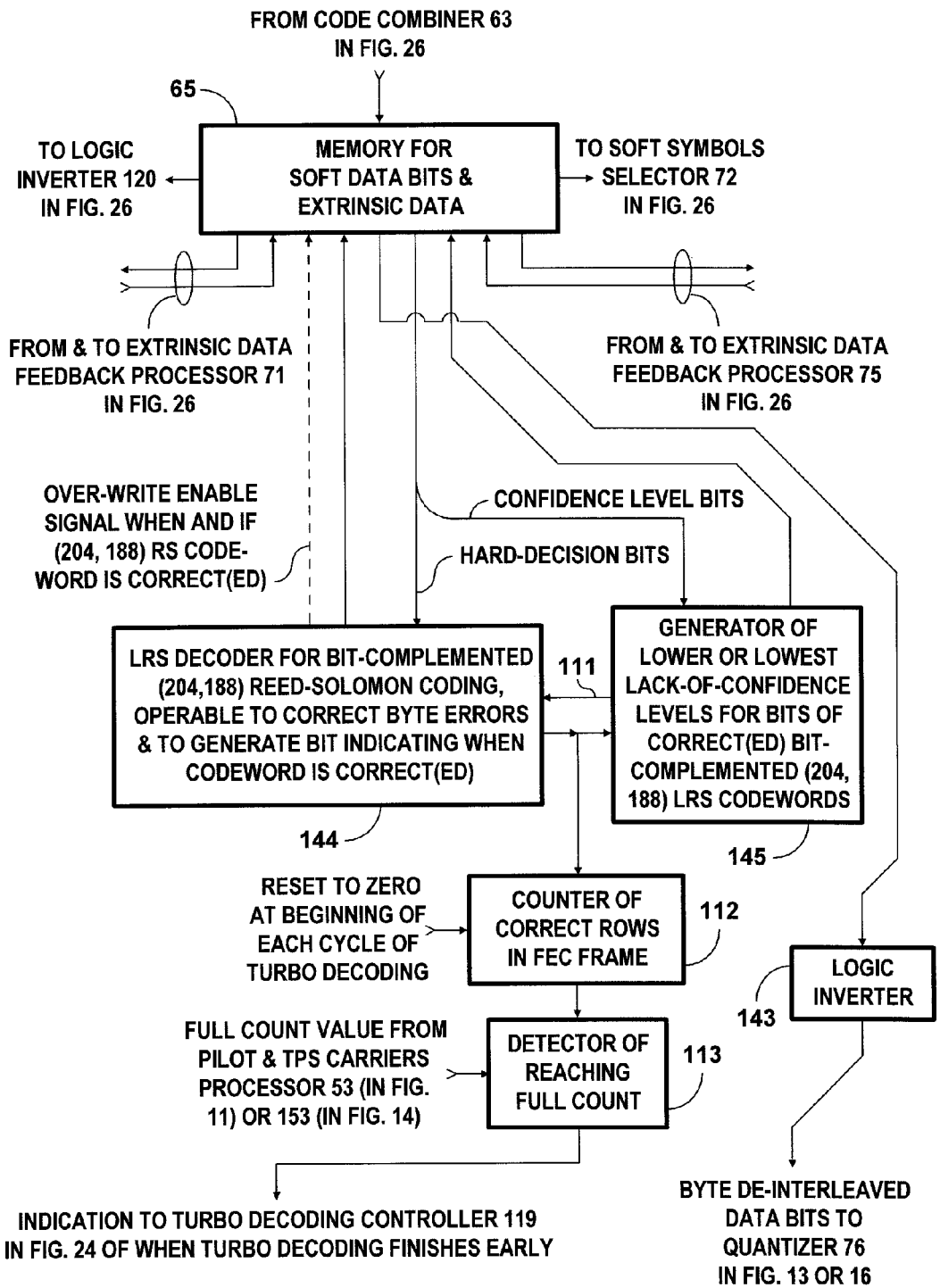

FIG. 27 is a detailed schematic diagram of a modification of the FIG. 26 turbo decoder, in which modification a decoder for bit-complemented (204, 188) Reed-Solomon coding is used to decrease the lack-of-confidence levels of data bits of correct bit-complemented (204, 188) Reed-Solomon codewords as an aid to turbo decoding procedures.

Figure 16:
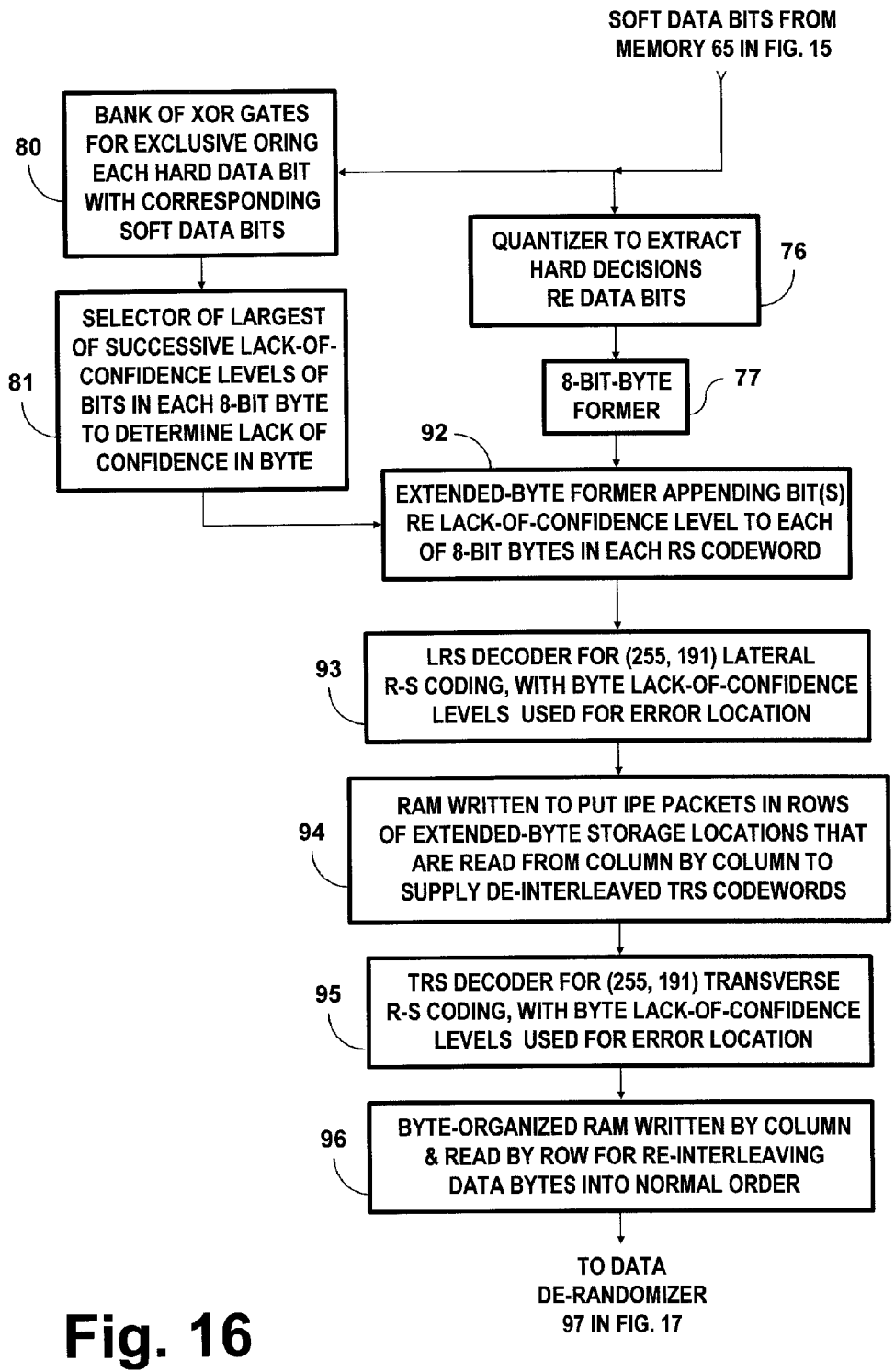
Figure 28:
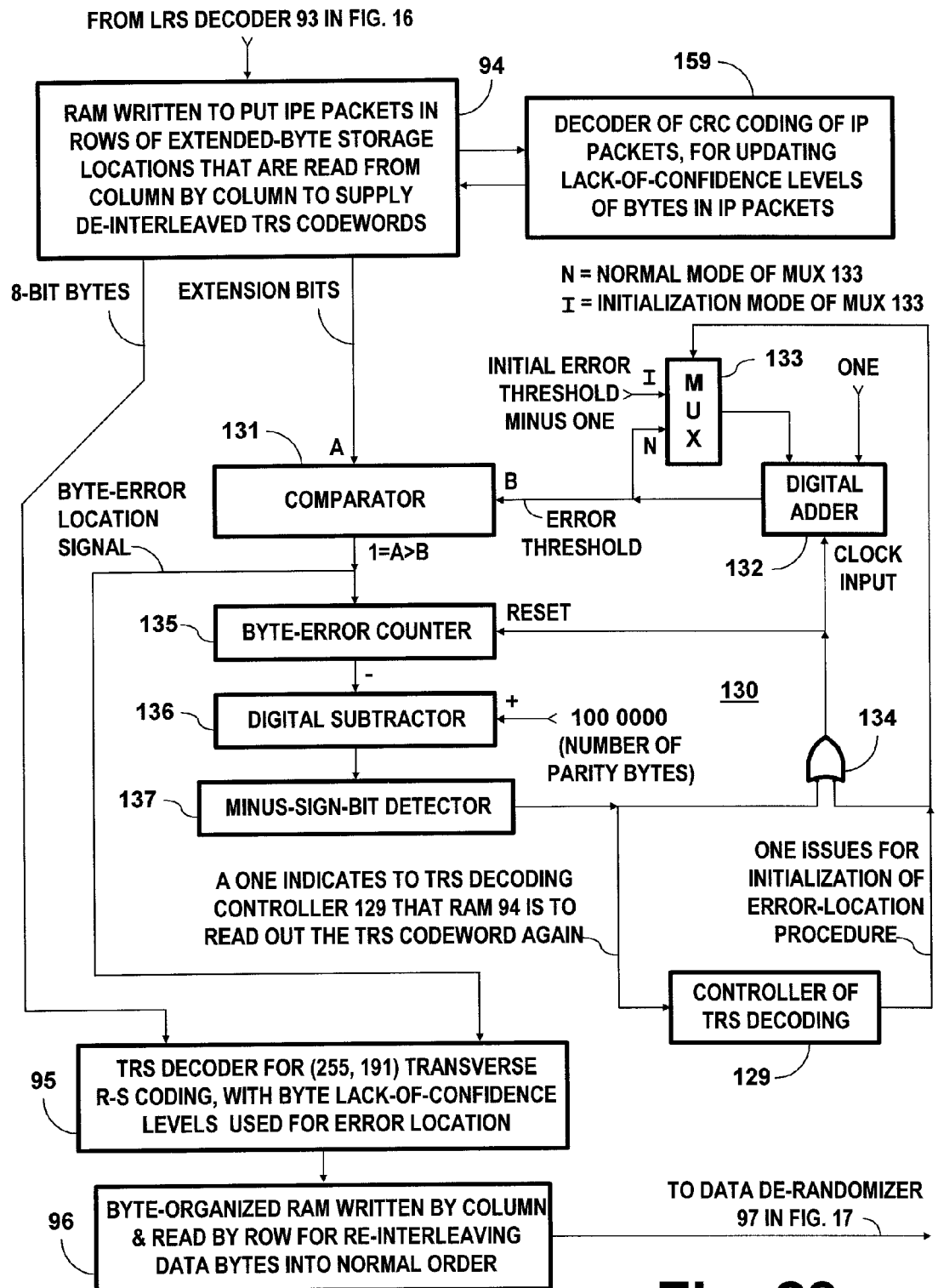

FIG. 28 is a schematic diagram of a portion of the circuitry shown in FIG. 16 showing in more detail how the decoder for (255, 191) transverse Reed-Solomon coding of FEC frames is provided with indications of byte errors.

Figure 29:
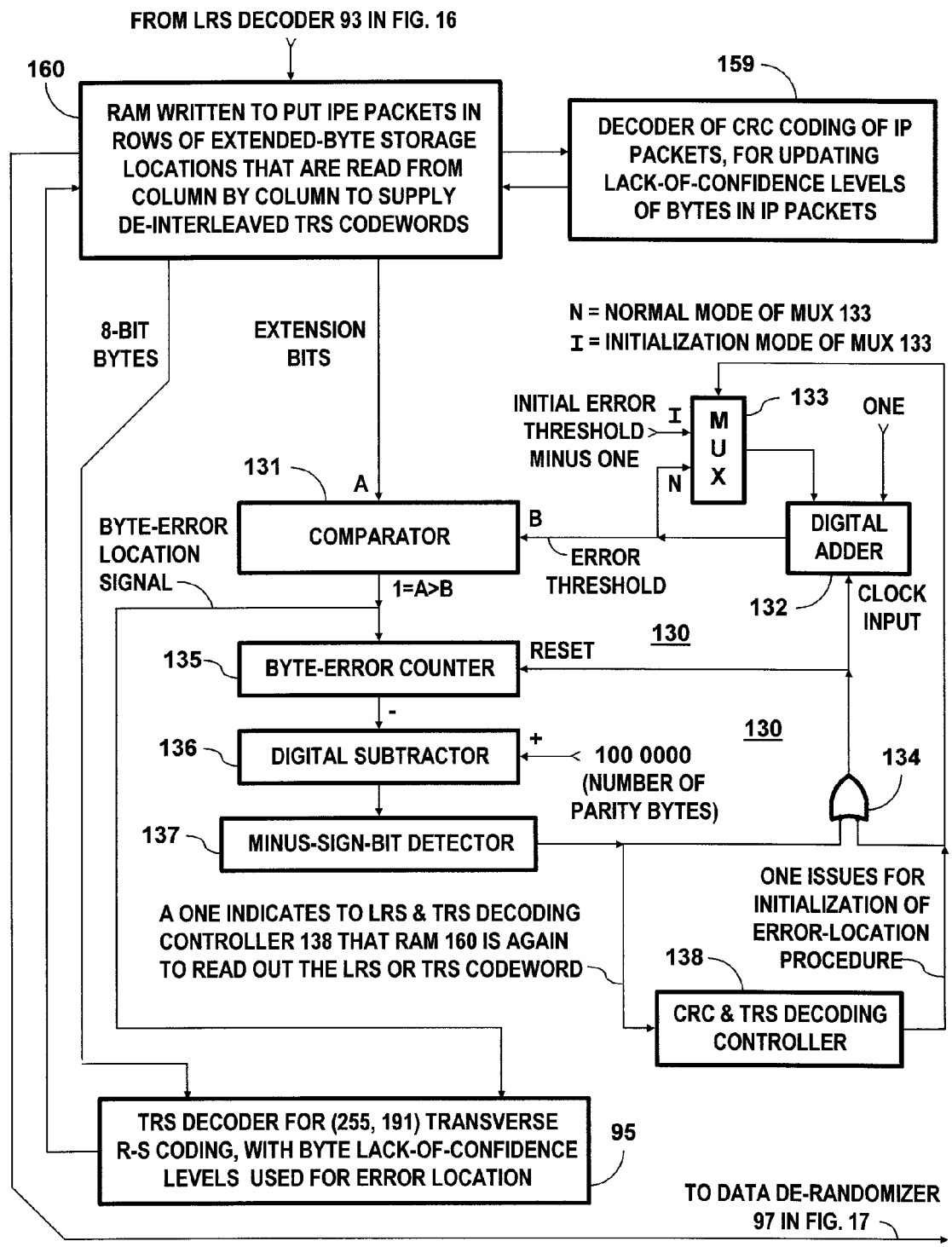

FIG. 29 is a schematic diagram of an alternative configuration of the decoders for (204, 188) Reed-Solomon coding and for (255, 191) transverse Reed-Solomon coding shown in FIG. 16, which configuration facilitates interactive two-dimensional Reed-Solomon decoding.

Figure 30:
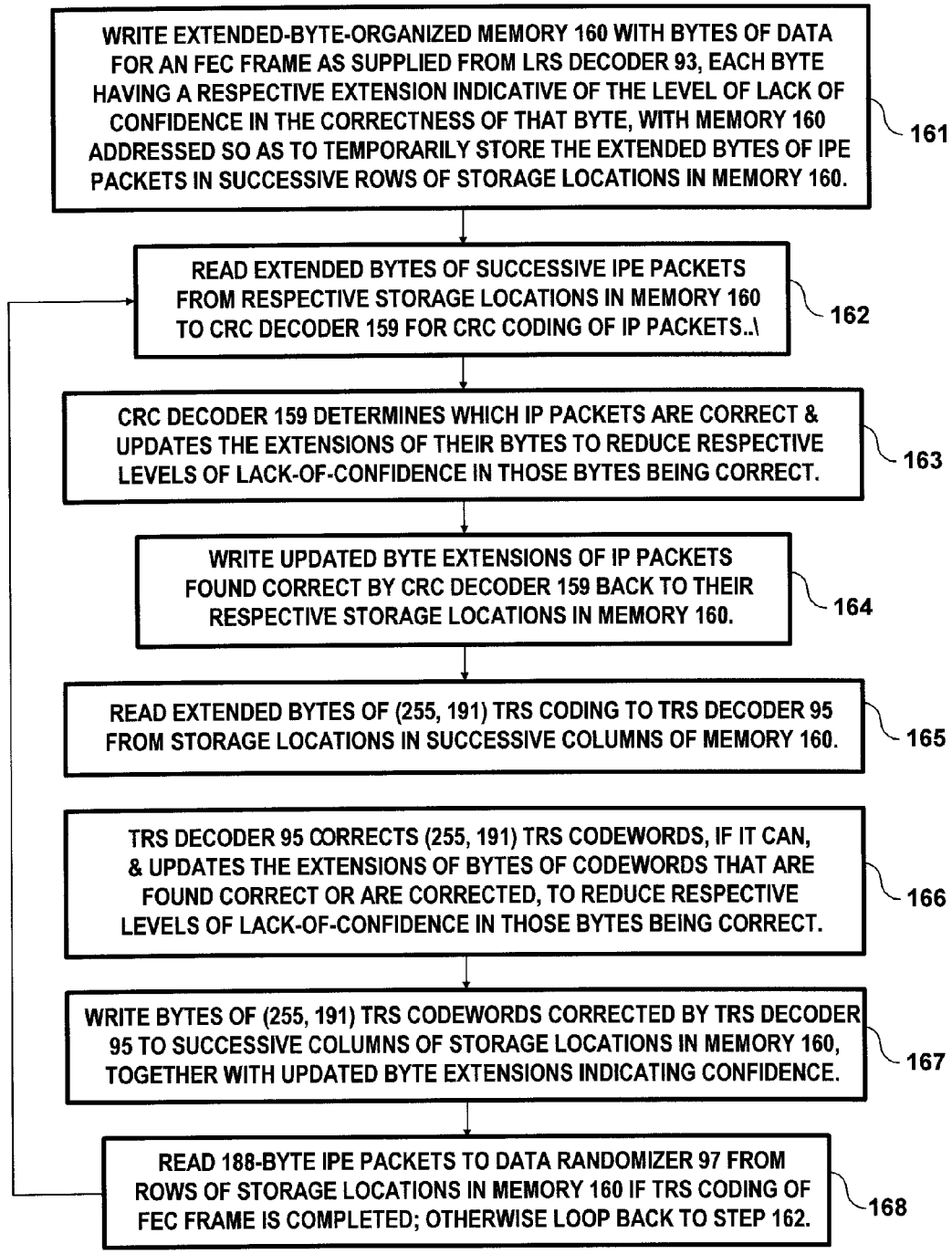

FIG. 30 is an informal flow chart illustrating the method of two-dimensional Reed-Solomon decoding performed by the decoders for (204, 188) Reed-Solomon coding and for (255, 191) transverse Reed-Solomon coding, as connected per FIG. 29.

Figure 31:
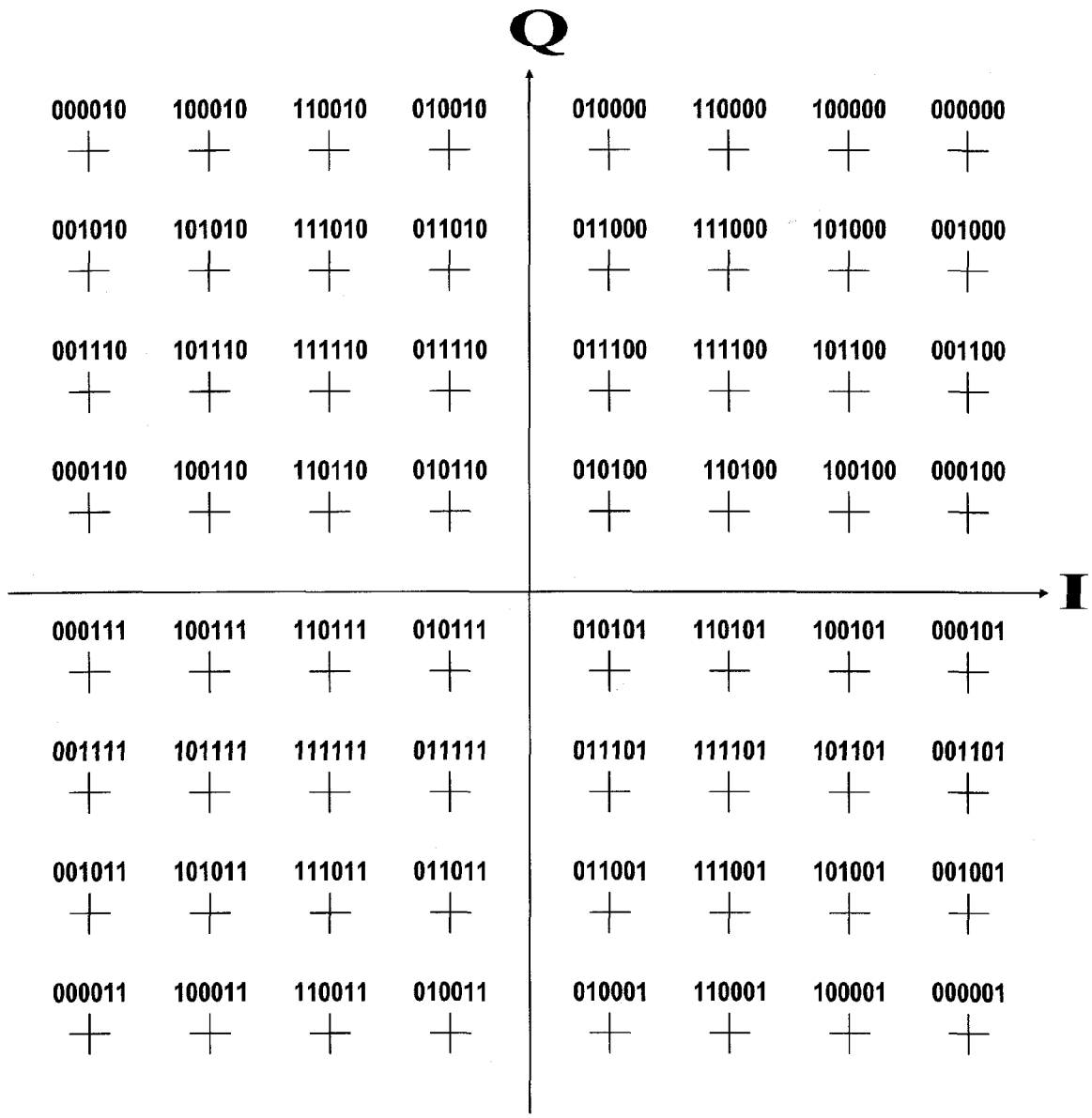

FIG. 31 is a point-lattice depiction of a square 64 QAM symbol constellation using a novel Gray mapping designed to be used with one-half-rate FEC coding.

FIGS. 32A, 32B, 32C, 32D, 32E and 32F are diagrams showing patterns of the first, second, third, fourth, fifth and sixth bits of each lattice-point label within the square 64 QAM symbol constellation map of FIG. 31.

Figure 33:
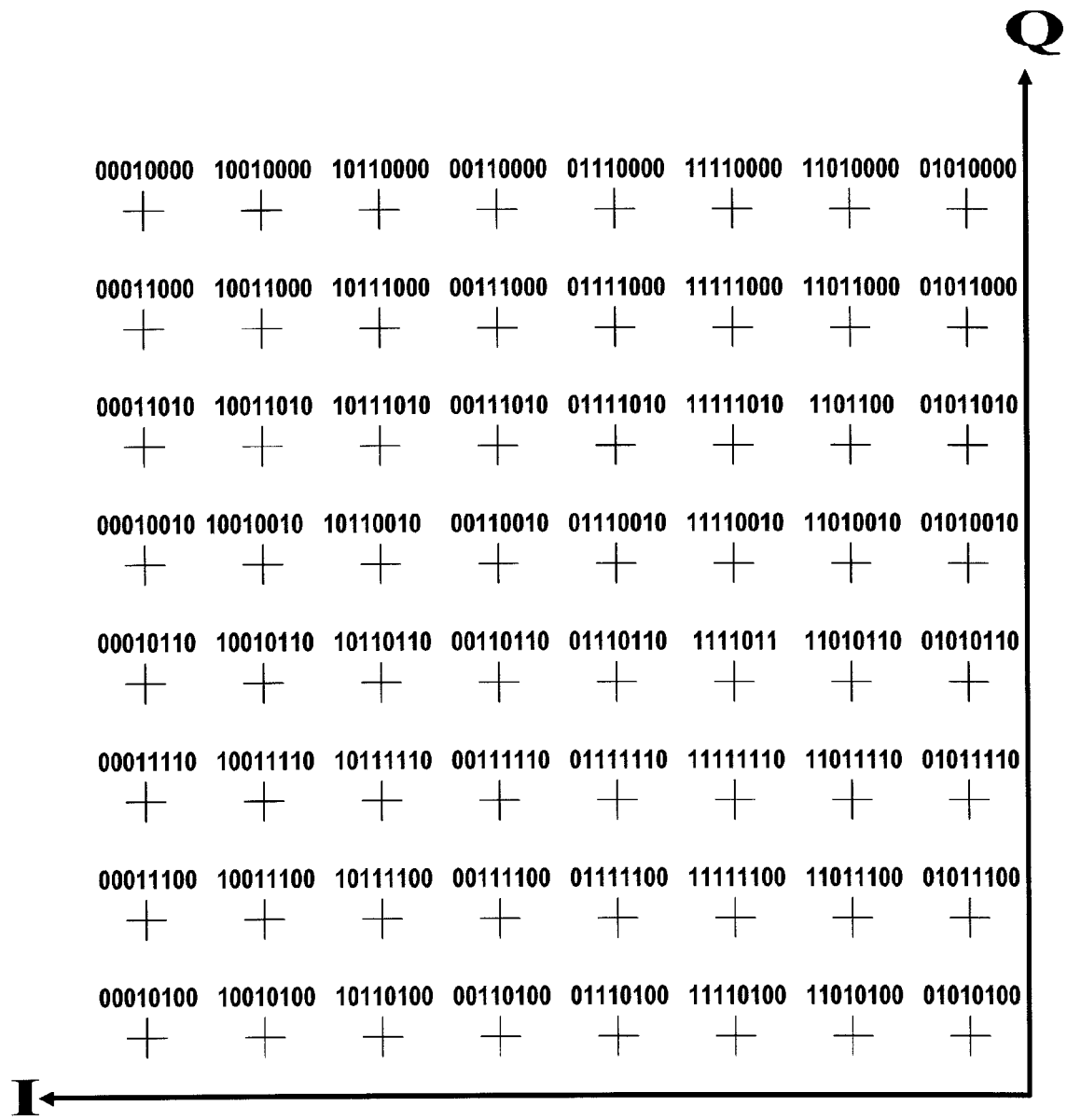

FIG. 33 is a diagram showing the nature of the information in the six bits of turbo coding associated with each of the 64 lattice points in the 64 QAM symbol constellation shown in FIG. 31.

Figure 34:
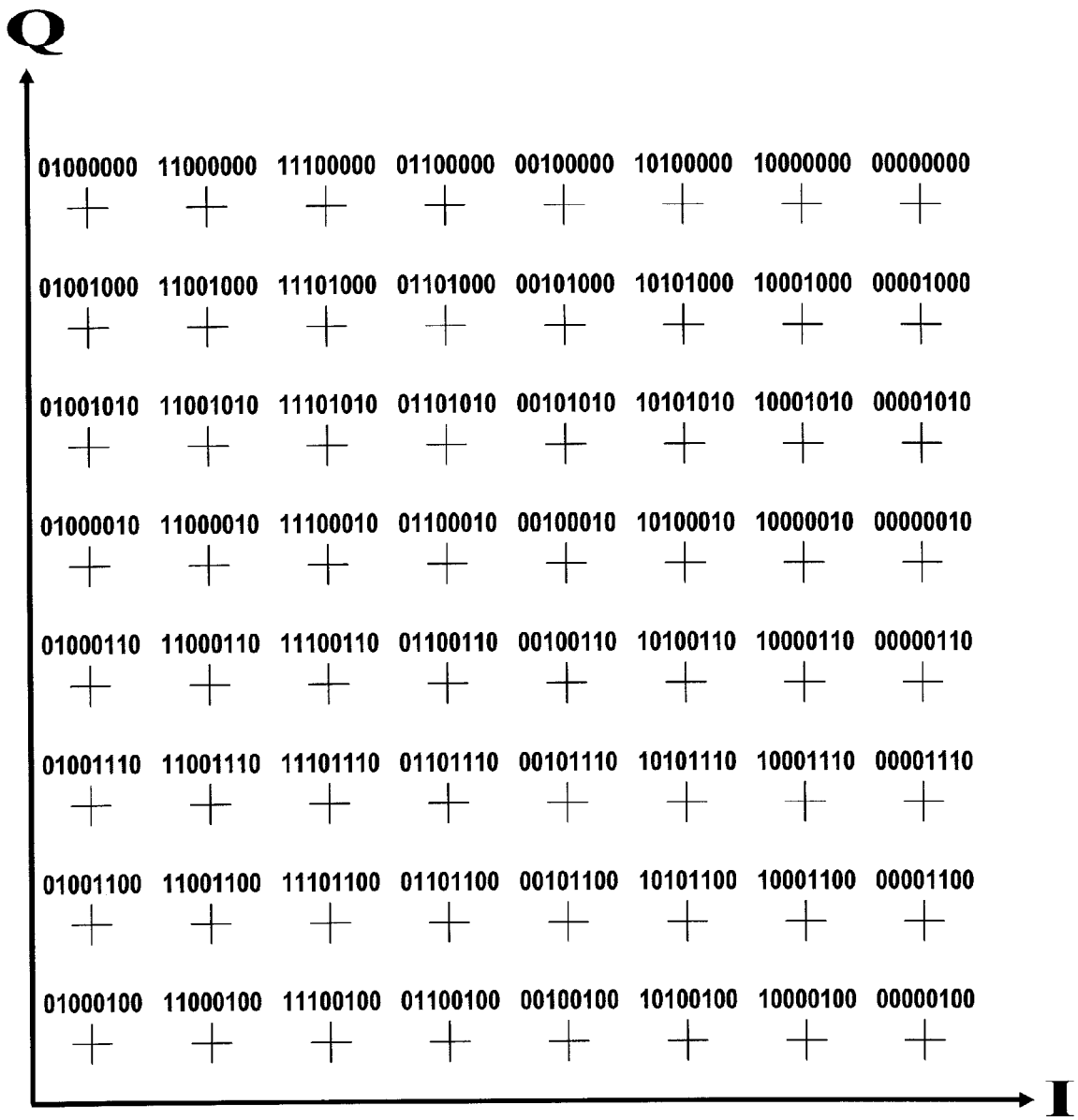

FIG. 34 is a point-lattice depiction of a square 64 QAM symbol constellation using a novel Gray mapping designed to be used with one-third-rate FEC coding.

FIGS. 35A, 35B, 35C, 35D, 35E and 35F are diagrams showing patterns of the first, second, third, fourth, fifth and sixth bits of each lattice-point label within the square 64 QAM symbol constellation map of FIG. 34.

Figure 36:
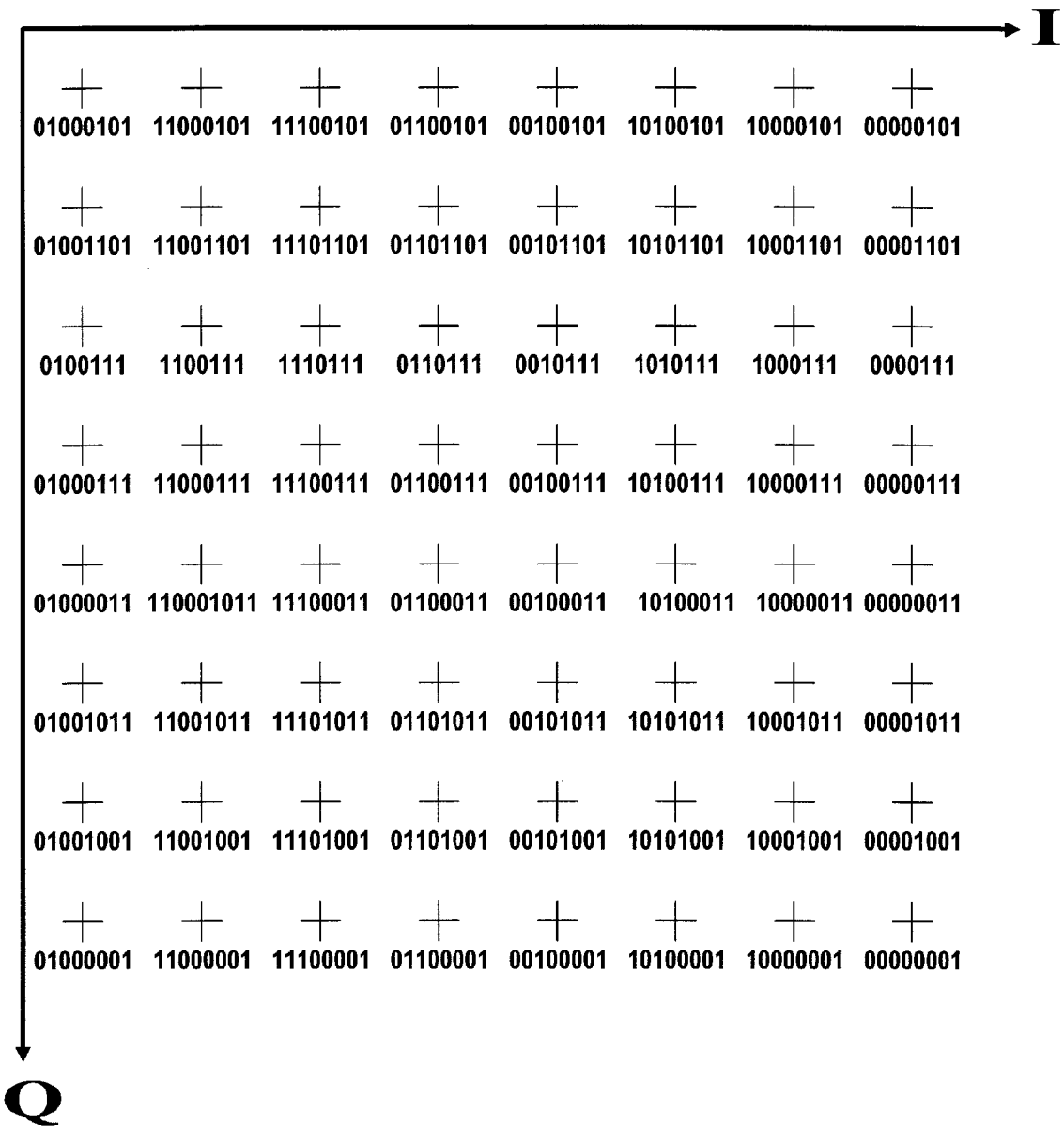
Figure 37:
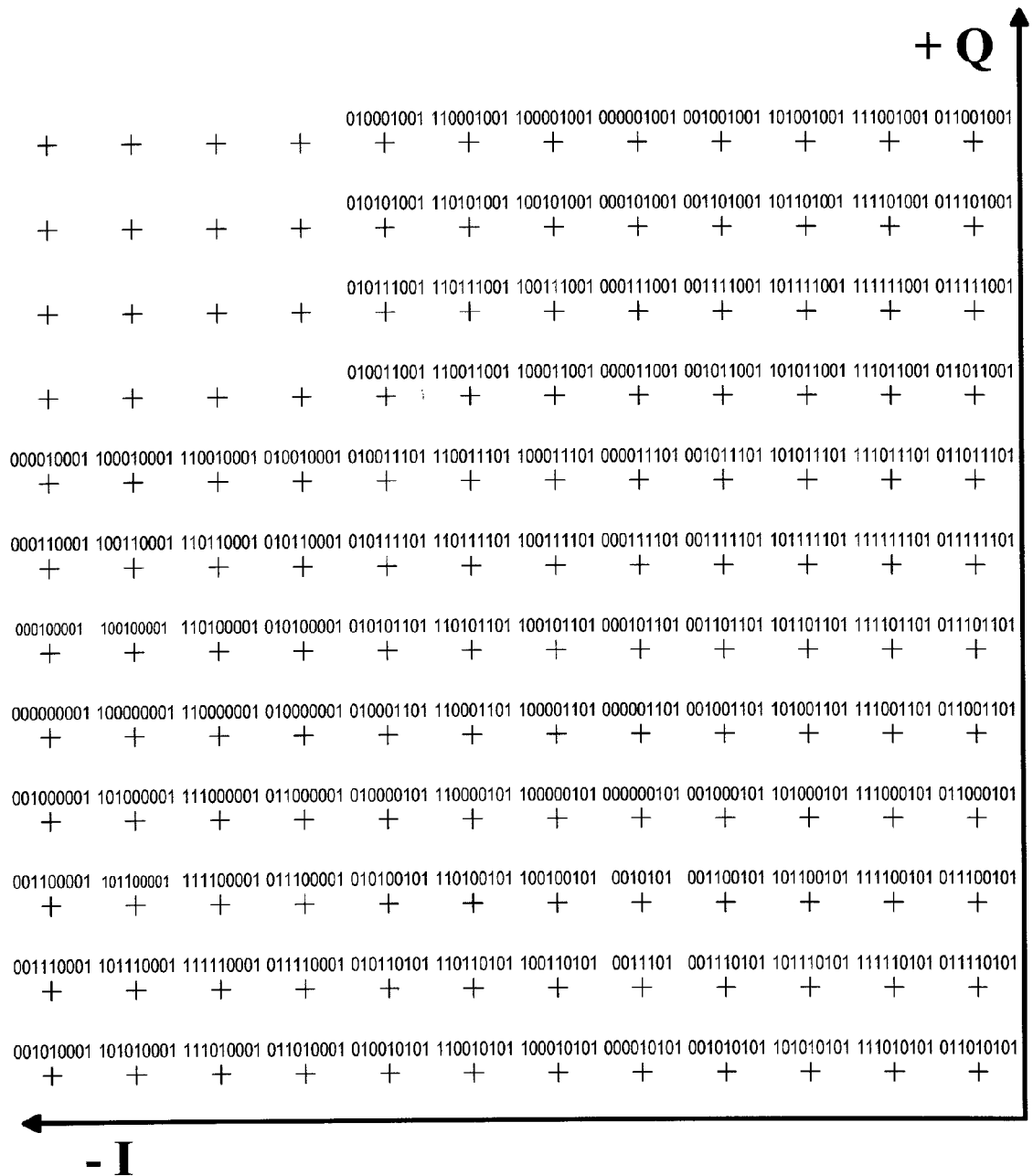

FIG. 36 is a diagram showing the nature of the information in the six bits of turbo coding associated with each of the 64 lattice points in the 64 QAM symbol constellation shown in FIG. 34.

FIGS. 37A, 37B, 37C and 37D are point-lattice depictions of the four quadrants of a representative square 256 QAM symbol constellation map preferably used by the QAM symbol constellation mapper in the portion of a COFDM transmitter shown in FIG. 2.

Figure 38:
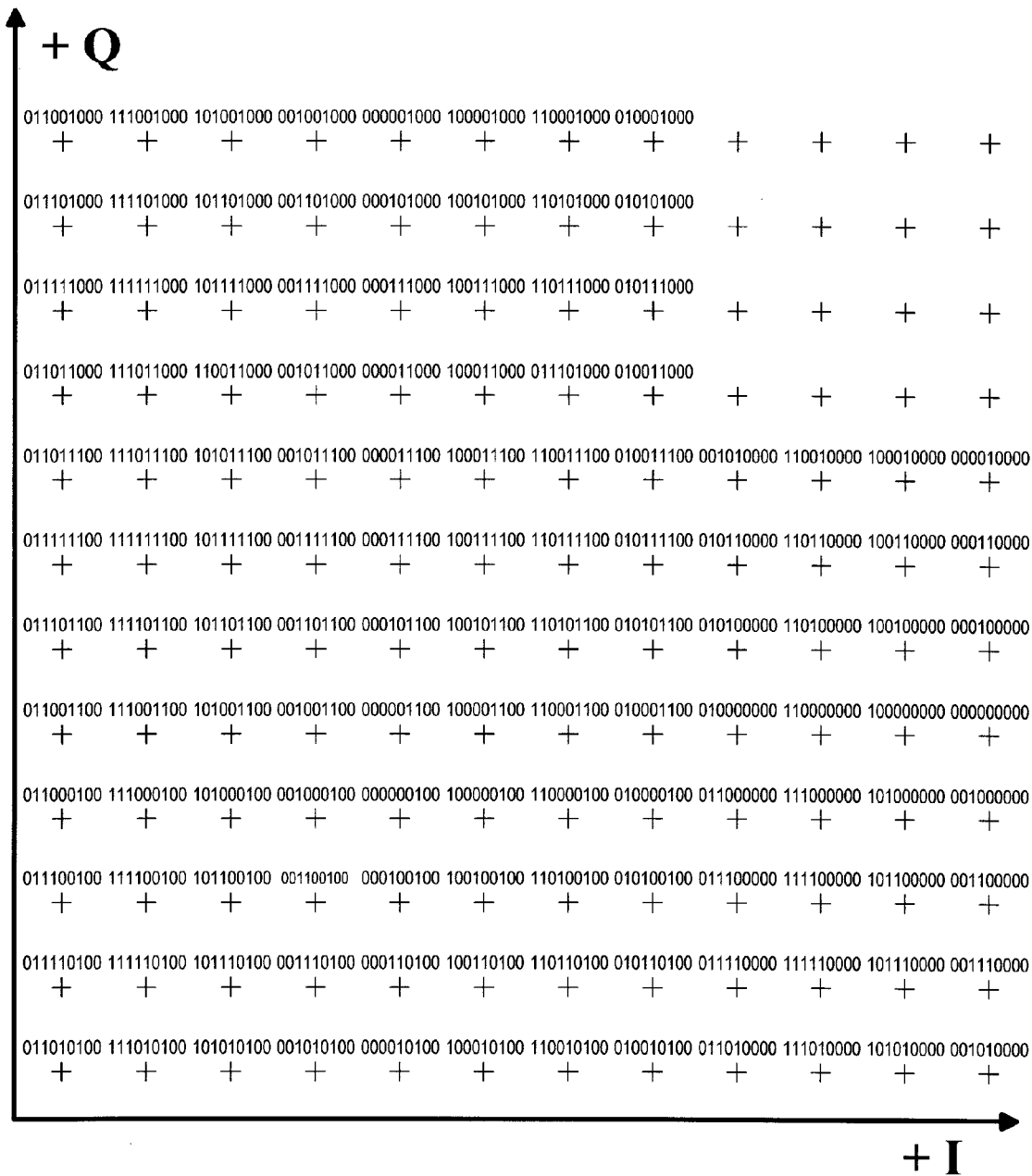

FIG. 38 is a diagram showing the nature of the information in the eight bits of turbo coding associated with each of the 256 lattice points in the square 256 QAM symbol constellation shown in FIGS. 37A, 37B, 37C and 37D.

Figure 39:
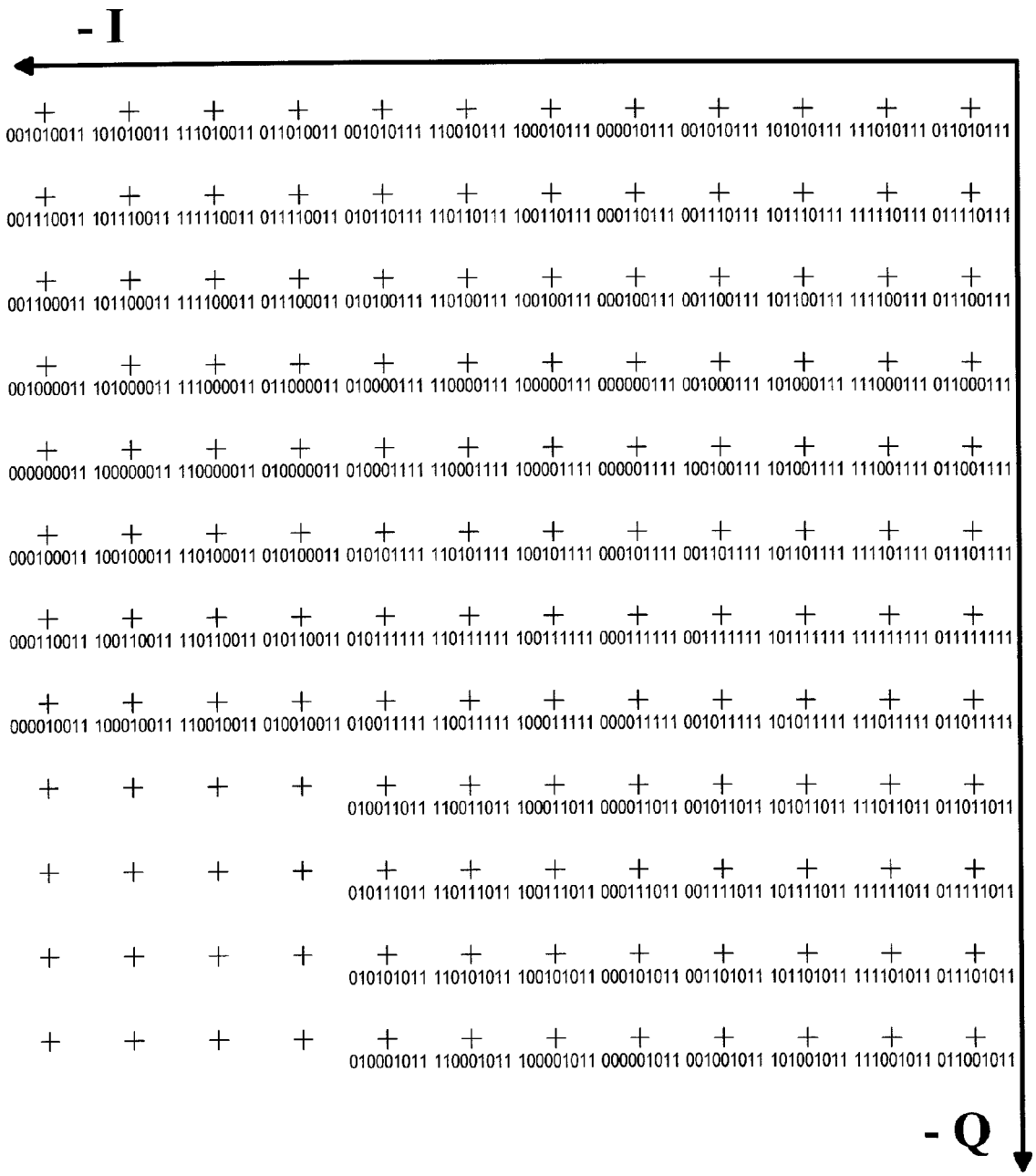
Figure 40:
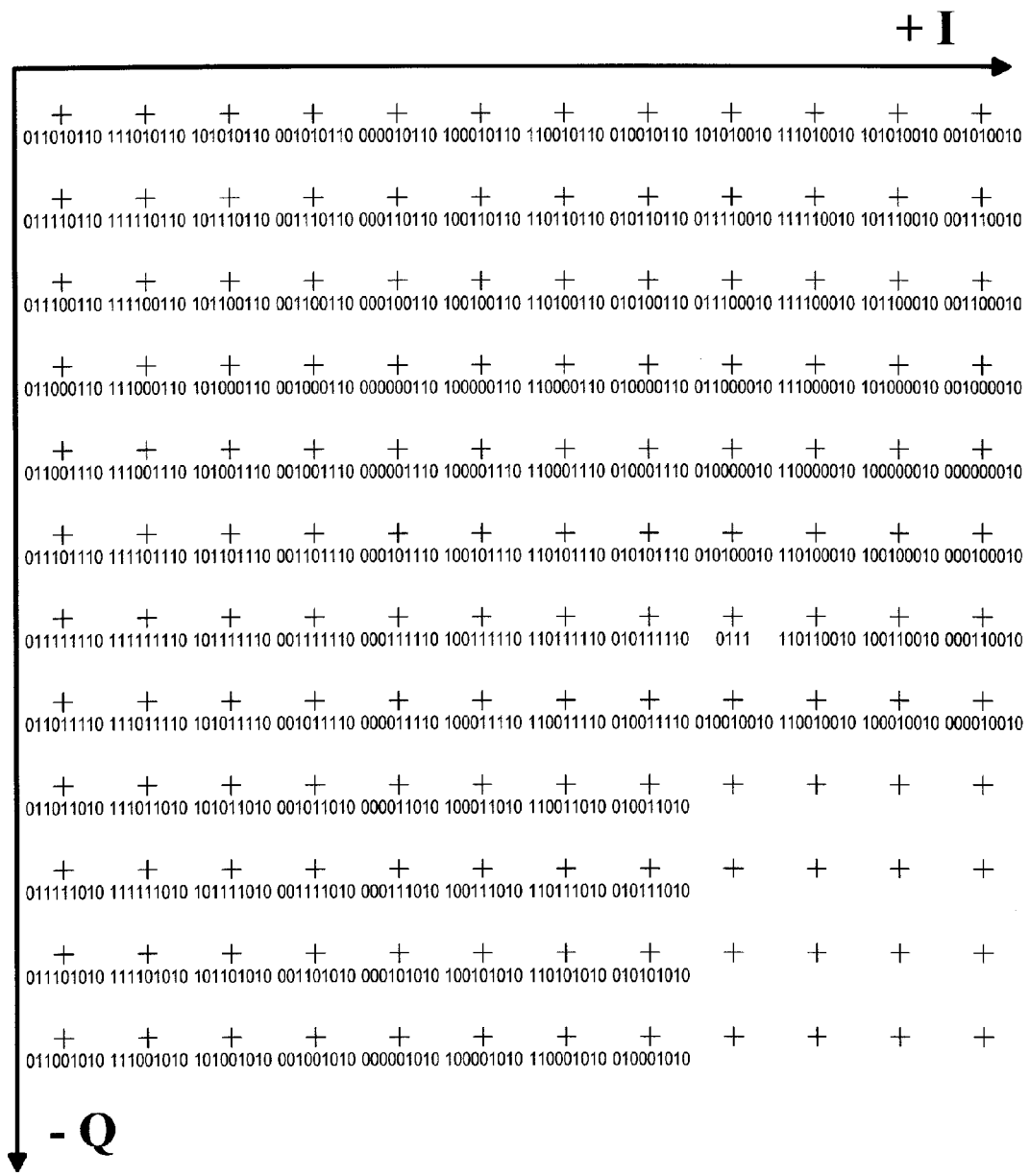

FIG. 39 is a diagram showing the nature of the information in the nine bits of turbo coding associated with each of the 512 lattice points in the cruciform 512 QAM symbol constellation shown in FIGS. 40A, 40B, 40C and 40D.

FIGS. 40A, 40B, 40C and 40D are point-lattice depictions of the four quadrants of representative cruciform 512 QAM symbol constellation maps preferably used by the QAM symbol constellation mapper in the portion of a COFDM transmitter shown in FIG. 4.

Figure 41:
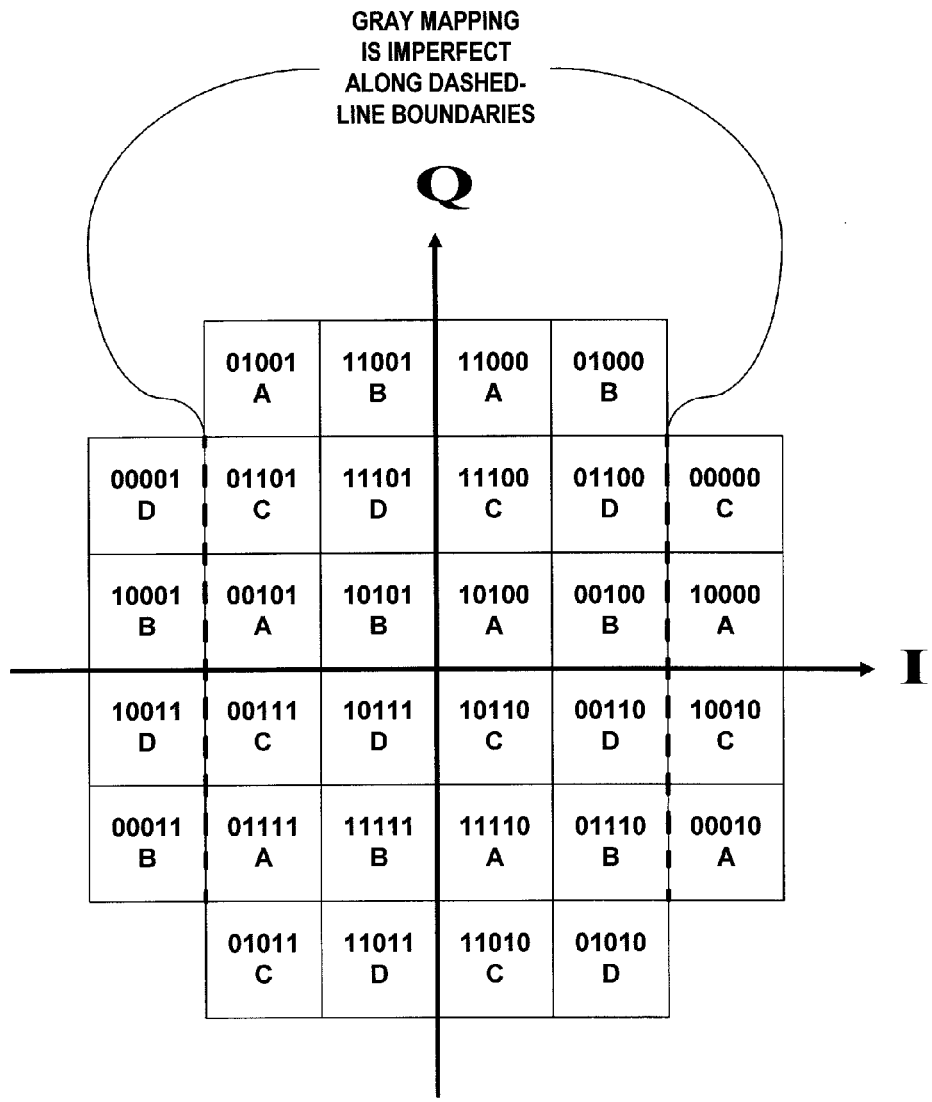

FIG. 41 is an assembly diagram for the 512 QAM symbol constellation map quadrants shown in FIGS. 40A, 40B, 40C and 40D, which diagram maps the regions within the complete cruciform 512 QAM symbol constellation wherein the 9-bit sequences of turbo coding associated with lattice points therein have similar third, sixth, seventh, eighth and ninth bits.

FIGS. 42A, 42B, 42C and 42D are diagrams showing the mapping of first, second, fourth and fifth bits in 9-bit sequences of turbo coding in various arrays of sixteen lattice points within the complete cruciform 512 QAM symbol constellation.

FIGS. 43A, 43B, 43C, 43D, 43E, 43F, 43G, 43H and 43I are diagrams showing patterns of the first, second, third, fourth, fifth, sixth, seventh, eighth and ninth bits within the cruciform 512 QAM symbol constellation.

DETAILED DESCRIPTION

FIGS. 1 and 2 together show a portion of a DTV transmitter generating COFDM signals for reception by stationary DTV receivers. Apparatus for generating bit-wise forward-error-correction (FEC) coding and subsequent COFDM signals is shown in FIG. 2. FIG. 1 depicts apparatus for processing frames of services to be broadcast to stationary DTV receivers for iterative-diversity reception. A time-division multiplexer 1 for interleaving frames of services to be broadcast to stationary DTV receivers is depicted at the middle of FIG. 1. The time-division multiplexer 1 successively selects half-frames of these various services to be reproduced in its response, which is supplied from its output port. FIG. 1 shows the output port of the multiplexer 1 connected to the input port of an internet protocol encapsulator 2, the output port of which IPE 2 connects to the input port of a data randomizer 3.

The internet protocol encapsulator 2 is used only if the services for reception by stationary DTV receivers use internet-protocol (IP) transport-stream (TS) packets, which packets have varying lengths. An internet-protocol encapsulator (IPE) encapsulates incoming IP-datagrams into MPE (MultiProtocol Encapsulation) sections, which MPE sections are subsequently segmented to fit within the final 184 bytes of 188-byte MPEG-transport-stream packets. The IPE further encapsulates the required PSI/SI (Program Specific Information/Service Information) signaling data that accompanies each frame. The services for reception by stationary DTV receivers are apt to employ 188-byte MPEG-2 transport-stream data packets, as defined by the Motion Picture Experts Group (MPEG), instead of IP TS packets. In such case, the IPE 2 is omitted, and the output port of the multiplexer 1 connects directly to the input port of the data randomizer 3.

Data concerning a first of the services to be transmitted twice to enable iterative-diversity reception by stationary DTV receivers are written to a dual-port random-access memory 4 via a random-access port thereof. The RAM 4 is capable of temporarily storing a number at least N+1 of frames of the first service, each half-frame therein to be transmitted twice, one half-frame more than N super-frames apart, to enable iterative-diversity reception by stationary DTV receivers. Typically, there are several super-frames between the two transmissions, N being eight or more. The dual-port RAM 4 has a serial read-output port connected to a first input port of the multiplexer 1 of time-sliced services for iterative-diversity reception by stationary DTV receivers. Successive half-frames of the first service for reception by stationary DTV receivers are read from the RAM 4, one odd-numbered half-frame per super-frame, to support the initial transmissions of that first service. N super-frames thereafter, the successive half-frames of the first service for iterative-diversity reception by stationary DTV receivers are read again from the RAM 4, one even-numbered half-frame per super-frame, to support the final transmissions of that first service.

Data concerning a second of the services to be transmitted twice to enable iterative-diversity reception by stationary DTV receivers are written to a dual-port random-access memory 5 via a random-access port thereof. The RAM 5 is capable of temporarily storing a number at least N+1 of frames of the second service, each half-frame therein to be transmitted twice, one half-frame more than N super-frames apart, to enable iterative-diversity reception by stationary DTV receivers. The dual-port RAM 5 has a serial read-output port connected to a second input port of the multiplexer 1 of time-sliced services for iterative-diversity reception by stationary DTV receivers. Successive half-frames of the second service for reception by stationary DTV receivers are read from the RAM 5, one odd-numbered half-frame per super-frame, to support the initial transmissions of that second service. N super-frames thereafter, the successive half-frames of the second service for iterative-diversity reception by stationary DTV receivers are read again from the RAM 5, one even-numbered half-frame per super-frame, to support the final transmissions of that second service.

Data concerning a third of the services to be transmitted twice to enable iterative-diversity reception by stationary DTV receivers are written to a dual-port random-access memory 6 via a random-access port thereof. The RAM 6 is capable of temporarily storing a number at least N+1 of frames of the third service, each half-frame therein to be transmitted twice, one half-frame more than N super-frames apart, to enable iterative-diversity reception by stationary DTV receivers. The dual-port RAM 6 has a serial read-output port connected to a third input port of the multiplexer 1 of time-sliced services for iterative-diversity reception by stationary DTV receivers. Successive half-frames of the third service for reception by stationary DTV receivers are read from the RAM 6, one odd-numbered half-frame per super-frame, to support the initial transmissions of that third service. N super-frames thereafter, the successive half-frames of the third service for iterative-diversity reception by stationary DTV receivers are read again from the RAM 6, one even-numbered half-frame per super-frame, to support the final transmissions of that third service.

In a first possible composition for super-frames, each super-frame is composed of four consecutive frames, three frames comprising pairs of half-frames from respective ones of the services for reception by stationary DTV receivers and a fourth frame comprising a plurality of respective time-slices from each of the services for reception by M/H receivers. In a second possible composition of super-frames, four frames of each super-frame comprise pairs of half-frames from respective ones of four services to be broadcast for reception by stationary DTV receivers. A fourth dual-port RAM can then temporarily store data concerning that fourth service for reading to a fourth input port of a modified time-division multiplexer 1. In other possible compositions of super-frames, only two of four frames of each super-frame comprise pairs of half-frames from respective ones of two services to be broadcast for reception by stationary DTV receivers. The RAM 6 is accordingly omitted, and a modified time-division multiplexer 1 has only first and second input ports. In still another possible composition of super-frames, only one of four frames of each super-frame comprises pairs of half-frames from a single service to be broadcast for reception by stationary DTV receivers. The RAMs 5 and 6 are accordingly omitted, and the time-division multiplexer 1 is replaced by a direct connection of the serial read-output port of the dual-port RAM 4 to the input port of the IPE 2 if the IPE 2 is used. If the IPE 2 is omitted, the time-division multiplexer 1 is replaced by a direct connection of the serial read-output port of the dual-port RAM 4 to the input port of the data randomizer 3.

Conceptually, the data randomizer 3 essentially consists of an OR gate, receiving successive data bits of a first input signal from the output port of either the multiplexer 1 or the IPE 2, and receiving successive bits of a prescribed pseudo-random binary sequence (PRBS) as second input signal. The response of the OR gate is supplied from the output port of the data randomizer 3. In practice the data randomizer 3 is apt to use a plurality of OR gates for processing the two bitstreams on a polyphase basis—e.g., a byte at a time. The data randomizer is initialized at the beginning of each half-frame of data from any one of the services to be broadcast for reception by stationary DTV receivers. This facilitates a stationary DTV receiver being able to code-combine data from the initial transmissions and final transmissions of similar data for iterative-diversity reception. The customary practice is for the data-randomization process not to randomize the initial synchronization byte in each 188-byte transport-stream packet.

FIG. 1 shows the output port of the data randomizer 3 connected to the input port of an encoder 7 for (204, 188) Reed-Solomon coding 188-byte packets of randomized data. In this specification and its claims, the (204, 188) RS FEC coding is referred to as "lateral Reed-Solomon" FEC coding or "LRS" FEC coding to distinguish it from transverse RS FEC coding or "TRS" coding. The words "lateral" and "transverse" also refer to respective directions in which RS coding is done with respect to IPE packets. The LRS encoder 7 appends a respective sixteen bytes of parity to each of the 188-byte packets of randomized data to generate a respective shortened 255-byte Reed-Solomon codeword, which shortened RS codeword is only 204 bytes long. The other 51 bytes of a full length RS codeword are each presumed to be a 0000 0000 virtual byte that is not actually transmitted. FIG. 1 indicates that the output port of the LRS encoder 7 is connected for supplying its response to a convolutional byte interleaver 8 in FIG. 2.

FIG. 2 shows the input port of the convolutional byte interleaver 8 connected for receiving the response of the LRS encoder 7 in FIG. 1. The byte interleaver can be of the type used in DVB-T2, but preferably is a convolutional byte interleaver having a byte interleaving pattern that wraps around each one-eighth frame. The output port of the byte interleaver 8 is connected for supplying the response therefrom to the input port of a logic inverter 9. The output port of the logic inverter 9 connects to a first of two input ports of a half-frame interleaver 10. The output port of the byte interleaver 8 is also connected for supplying the response therefrom to the second input port of the half-frame interleaver 10. FIG. 2 shows the half-frame interleaver 10 as being constructed from selectors 11 and 12 having respective input ports to which the first and second input ports of the half-frame interleaver 10 respectively connect. The selector 11 selectively responds to the convolutionally byte-interleaved (204, 188) Reed-Solomon codewords of odd-numbered half-frames as bit-complemented by the logic inverter 9, reproducing the logic inverter 9 response in bit-serial form at its output port just during odd-numbered half-frame intervals. The selector 12 selectively responds to the convolutionally byte-interleaved (204, 188) Reed-Solomon codewords of even-numbered half-frames supplied to its input port, reproducing them in bit-serial form at its output port just during even-numbered half-frame intervals. The respective output ports of the selectors 11 and 12, each of which output ports is preceded by tri-state buffering, connect together and to the output port of the half-frame interleaver 10.

The output port of the half-frame interleaver 10 is connected to the input port of an encoder 13 for bit-wise forward error-correction coding of bits, whether they be the negative-logic data bits of odd-numbered FALSE half-frames or the positive-logic data bits of even-numbered TRUE half-frames. The encoder 13 for bit-wise FEC coding may be any one of the sorts shown in FIGS. 6, 7, 8, 9 and 10. The output port of the encoder 13 is connected for supplying bit-wise FEC coding of time-interleaved even-numbered and odd-numbered half-frames to the input port of a QAM symbol constellation mapper 14 for 64 QAM, 256 QAM or 512 QAM. If the encoder 13 supplies one-half-rate bit-wise FEC coding, the mapper 14 will preferably be a square 256 QAM symbol constellation mapper, but may alternatively be a square 64 QAM symbol constellation mapper. If the encoder 13 supplies one-third-rate bit-wise FEC coding, the mapper 14 will preferably be a cruciform 512 QAM symbol constellation mapper, but may alternatively be a square 64 QAM symbol constellation mapper.

The output port of the QAM symbol constellation mapper 14 is connected to the input port of a parser 15 for effective OFDM symbol blocks. The block parser 15 parses a stream of complex samples supplied from the QAM symbol constellation mapper 14 into uniform-length sequences of complex samples, each of which sequences is associated with a respective effective OFDM symbol. The output port of the block parser 15 is connected to a first input port of a pilot and TPS signal insertion unit 16, a second input port of which unit 16 is connected to receive Transmission Parameters Signaling (TPS) bits from a TPS signal generator 17. The pilot and TPS signal insertion unit 18 inserts these TPS bits, which are to be transported by modulated dedicated carriers (TPS Pilots), into each effective OFDM symbol block. The pilot and TPS signal insertion unit 16 inserts other bits descriptive of unmodulated carriers of predetermined amplitude and predetermined phase into each effective OFDM symbol block. An output port of the pilot and TPS signal insertion unit 16 is connected for supplying the effective OFDM symbol blocks, with pilot carriers inserted therein, to the input port of an OFDM modulator 18. The OFDM modulator 18 has 8K carriers capability, suitable for transmissions to stationary DTV receivers.

A transmission signal in an OFDM system is transmitted by a unit of a symbol called an OFDM symbol. This OFDM symbol includes an effective symbol that is a signal period in which I-DFT is performed during transmission and a guard interval in which the waveform of a part of the latter half of this effective symbol is directly copied. This guard interval is provided in the former half of the OFDM symbol. In the OFDM system, such a guard interval is provided to improve performance during multi-path reception. Plural OFDM symbols are collected to form one OFDM transmission frame. For example, in the ISDB-T standard, ten OFDM transmission frames are formed by two hundred four OFDM symbols. Insertion positions of pilot signals are set with this unit of OFDM transmission frames as a reference.

The OFDM modulator 18 includes a serial-to-parallel converter for converting the serially generated complex digital samples of the effective OFDM symbols to parallel complex digital samples for inverse discrete Fourier transformation (I-DFT). The OFDM modulator 18 further includes a parallel-to-serial converter for converting the parallel complex digital samples of the I-DFT results to serial complex digital samples of the I-DFT results, supplied from the output port of the OFDM modulator 18 to the input port of a guard-interval-and-cyclic-prefix insertion unit 19. The output port of the guard-interval-and-cyclic-prefix insertion unit 19 is connected for supplying successive complex digital samples of a COFDM signal to a first input port of an all-services multiplexer 20.

The output port of the all-services multiplexer 20 is connected to the input port of a digital-to-analog converter 21. FIG. 2 shows the output port of the DAC 21 connected for supplying its analog COFDM signal response to the input port of an up-converter 22 for converting baseband-frequency analog COFDM signal to very-high-frequency (VHF) or ultra-high-frequency (UHF) analog COFDM signal. The output port of the up-converter 22 is connected for supplying analog COFDM signal at radio frequencies to the input port of a linear power amplifier 23. FIG. 2 shows the output port of the linear power amplifier 23 connected for driving RF analog COFDM signal power to a transmission antenna 24. FIG. 2 omits showing certain details of the DTV transmitter, such as band-shaping filters for the RF signals.

FIGS. 3 and 4 together show a further portion of the DTV transmitter generating COFDM signals for reception by M/H DTV receivers. Apparatus for generating bit-wise FEC coding and subsequent COFDM signals is shown in FIG. 4. FIG. 3 shows apparatus for processing time-slices for such iterative-diversity reception. A time-division multiplexer 25 for interleaving time-slices of services to be broadcast for reception by mobile and handset (M/H) receivers is near the middle of FIG. 3. The time-sliced services for reception by M/H receivers employ internet-protocol (IP) transport-stream data packets that are of variable length, but no longer than a specified maximum length. The multiplexer 25 successively selects time-slices of various services to be reproduced in its response, which is supplied in bit-serial form from its output port to the input port of a data randomizer 26. The data randomizer 26 is similar in structure and operation to the data randomizer 3 described supra, except for being initialized at the beginning of each time-slice of data from any one of the services to be broadcast for reception by M/H DTV receivers.

Data concerning a first of the services transmitted twice to enable iterative-diversity reception by M/H DTV receivers are written to a dual-port random-access memory 27 via its random-access port. The RAM 27 is capable of temporarily storing a number at least N+1 of time-slices of the first service, each time-slice therein to be transmitted twice, one time-slice more than N super-frames apart, to enable iterative-diversity reception by M/H DTV receivers. Typically, N is eight or more. The dual-port RAM 27 has a serial read-output port connected to a first input port of the multiplexer 25 of time-sliced services for iterative-diversity reception by M/H DTV receivers. Successive time-slices of the first service for reception by M/H DTV receivers are read from the RAM 27, one odd-numbered time-slice per super-frame, to support the initial transmissions of that first service. N super-frames thereafter, the successive time-slices of the first service for iterative-diversity reception by M/H DTV receivers are read again from the RAM 27, one even-numbered time-slice per super-frame, to support the final transmissions of that first service.

Data concerning a second of the services transmitted twice to enable iterative-diversity reception by M/H DTV receivers are written to a dual-port random-access memory 28 via its random-access port. The RAM 28 is capable of temporarily storing a number at least N+1 of time-slices of the second service, each time-slice therein to be transmitted twice, one time-slice more than N super-frames apart, to enable iterative-diversity reception by M/H DTV receivers. The dual-port RAM 28 has a serial read-output port connected to a second input port of the multiplexer 25. Successive time-slices of the second service for reception by M/H DTV receivers are read from the RAM 28, one odd-numbered time-slice per super-frame, to support the initial transmissions of that second service. N super-frames thereafter, the successive time-slices of the second service for iterative-diversity reception by stationary M/H receivers are read again from the RAM 28, one even-numbered time-slice per super-frame, to support the final transmissions of that second service.

Data concerning a third of the services transmitted twice to enable iterative-diversity reception by M/H DTV receivers are written to a dual-port random-access memory 29 via its random-access port. The RAM 29 is capable of temporarily storing a number at least N+1 of time-slices of the third service, each time-slice therein to be transmitted twice, one time-slice more than N super-frames apart, to enable iterative-diversity reception by M/H DTV receivers. The dual-port RAM 29 has a serial read-output port connected to a third input port of the multiplexer 25. Successive time-slices of the third service for reception by M/H DTV receivers are read from the RAM 29, one odd-numbered time-slice per super-frame, to support the initial transmissions of that third service. N super-frames thereafter, the successive time slices of the third service for iterative-diversity reception by M/H DTV receivers are read again from the RAM 29, one even-numbered time-slice per super-frame, to support the final transmissions of that third service.

Data concerning a fourth of the services transmitted twice to enable iterative-diversity reception by M/H DTV receivers are written to a dual-port random-access memory 30 via its random-access port. The RAM 30 is capable of temporarily storing a number at least N+1 of time-slices of the fourth service, each time-slice therein to be transmitted twice, one time-slice more than N super-frames apart, to enable iterative-diversity reception by M/H DTV receivers. The dual-port RAM 30 has a serial read-output port connected to a fourth input port of the multiplexer 25. Successive time-slices of the fourth service for reception by M/H DTV receivers are read from the RAM 30, one odd-numbered time-slice per super-frame, to support the initial transmissions of that fourth service. N super-frames thereafter, the successive time-slices of the fourth service for iterative-diversity reception by M/H DTV receivers are read again from the RAM 30, one even-numbered time-slice per super-frame, to support the final transmissions of that fourth service.

The transmitter shown in part in FIG. 3 uses the first of the possible compositions for super-frames described supra. Each super-frame is composed of four consecutive frames, three frames comprising pairs of half-frames from respective ones of the services for reception by stationary DTV receivers and a fourth frame comprising a plurality of respective time-slices from each of the services for reception by M/H receivers. In another possible composition of super-frames, two of four frames of each super-frame each comprise a respective plurality of respective time-slices from each of the services for iterative-diversity reception by M/H receivers. This accommodates eight, rather than just four, services to be broadcast to M/H DTV receivers for iterative-diversity reception. The dual-port RAMs 27, 28, 29 and 30 for the first, second, third and fourth services for iterative-diversity reception by M/H receivers are supplemented by four additional dual-port RAMs for the fifth, sixth, seventh and eighth services for iterative-diversity reception by M/H receivers. The time-division multiplexer 25 is modified so as to have eight input ports to which the respective serial read-output ports of the eight dual-port RAMs respectively connect. In still another possible composition of super-frames, three of four frames of each super-frame each comprise a respective plurality of respective time-slices from ones of twelve services for iterative-diversity reception by M/H receivers. The dual-port RAMs 27, 28, 29 and 30 are supplemented by eight additional dual-port RAMs for eight additional services for iterative-diversity reception by M/H receivers; and the multiplexer 25 is modified so as to have twelve input ports to which the respective serial read-output ports of the twelve dual-port RAMs respectively connect. Furthermore, all four frames of each super-frame can each comprise a respective plurality of respective time-slices from ones of sixteen services for iterative-diversity reception by M/H receivers. The dual-port RAMs 27, 28, 29 and 30 are supplemented by twelve additional dual-port RAMs for twelve additional services for iterative-diversity reception by M/H receivers; and the multiplexer 25 is modified so as to have sixteen input ports to which the respective serial read-output ports of the sixteen dual-port RAMs respectively connect.

FIG. 3 shows the output port of the data randomizer 26 connecting to the input port of an encoder 31 for (255, 191) transverse Reed-Solomon (TRS) forward-error-correction (FEC) coding. The block interleaving that the TRS encoder 31 uses to implement the (255, 191) TRS coding helps create a specific frame structure, called the "FEC frame", for incorporating the incoming data from the data randomizer 26. The (255, 191) TRS codewords are arranged in respective columns of 8-bit bytes in this FEC frame. This FEC frame is considered as having further columns therein to accommodate IP encapsulation and further FEC coding of rows of bytes in the FEC frame.

FIG. 3 shows the output port of the TRS encoder 31 connected for reading bytes from successive rows of byte-storage locations to the input port of an internet protocol encapsulator 32 that encapsulates those bytes within the final 184 byte epochs of each of a succession of 188-byte IPE packets. FIG. 3 further shows the IPE 32 connected for supplying successive 188-byte IPE packets to the input port of an encoder 33 for (204, 188) Reed-Solomon coding. FIG. 3 indicates that the output port of the LRS encoder 33 is connected for supplying its response to a byte interleaver 34 in FIG. 4.

FIG. 4 shows the input port of the convolutional byte interleaver 34 connected for receiving the response of the LRS encoder 33 in FIG. 1. The byte interleaver can be of the type used in DVB-H, but preferably is a convolutional byte interleaver having a byte interleaving pattern that wraps around each one-eighth frame. The output port of the byte interleaver 34 is connected for supplying the response therefrom to the input port of a logic inverter 35. The output port of the logic inverter 35 connects to a first of two input ports of a time-slice interleaver 36. The output port of the byte interleaver 34 is also connected for supplying the response therefrom to the second input port of the time-slice interleaver 36. FIG. 4 shows the time-slice interleaver 36 as being constructed from selectors 37 and 38 having respective input ports to which the first and second input ports of the time-slice interleaver 36 respectively connect. The selector 37 selectively responds to the convolutionally byte-interleaved (204, 188) Reed-Solomon codewords of odd-numbered time-slices as bit-complemented by the logic inverter 35, reproducing the logic inverter 35 response in bit-serial form at its output port during just odd-numbered time-slice intervals. The selector 38 selectively responds to the convolutionally byte-interleaved (204, 188) Reed-Solomon codewords of even-numbered time-slices supplied to its input port, reproducing them in bit-serial form at its output port during just even-numbered time-slice intervals. The respective output ports of the selectors 37 and 38, each of which output ports is preceded by tri-state buffering, connect together and to the output port of the time-slice interleaver 36.

The output port of the time-slice interleaver 36 is connected to the input port of an encoder 39 for bit-wise forward error-correction coding of bits, whether they be the negative-logic data bits of odd-numbered FALSE time-slices or the positive-logic data bits of even-numbered TRUE time-slices. The encoder 39 for bit-wise FEC coding may be any one of the sorts shown in FIGS. 6, 7, 8, 9 and 10. The output port of the encoder 39 is connected for supplying bit-wise FEC coding of time-interleaved even-numbered and odd-numbered time-slices to the input port of a mapper 40 for 64 QAM symbol constellations.

The output port of the 64 QAM symbol constellation mapper 40 connects to the input port of a parser 41 for effective OFDM symbol blocks. The block parser 41 parses a stream of complex samples supplied from the mapper 40 into uniform-length sequences of complex samples, each of which sequences is associated with a respective effective OFDM symbol. The output port of the block parser 41 connects to a first input port of a pilot and TPS signal insertion unit 42, a second input port of which unit 42 is connected to receive Transmission Parameters Signaling (TPS) bits from a TPS signal generator 43. The pilot and TPS signal insertion unit 42 inserts these TPS bits, which are to be transported by modulated dedicated carriers (TPS Pilots), into each effective OFDM symbol block. The pilot and TPS signal insertion unit 42 inserts other bits descriptive of unmodulated carriers of predetermined amplitude and predetermined phase into each effective OFDM symbol block. An output port of the pilot and TPS signal insertion unit 42 is connected for supplying the effective OFDM symbol blocks, with pilot carriers inserted therein, to the input port of an OFDM modulator 44. The OFDM modulator 44 has 4K carriers capability, suitable for transmissions to M/H DTV receivers.

The OFDM modulator 44 includes a serial-to-parallel converter for converting the serially generated complex digital samples of the effective OFDM symbols to parallel complex digital samples for inverse discrete Fourier transformation (I-DFT). The OFDM modulator 44 further includes a parallel-to-serial converter for converting the parallel complex digital samples of the I-DFT results to serial complex digital samples of the I-DFT results, supplied from the output port of the OFDM modulator 44 to the input port of a guard-interval-and-cyclic-prefix insertion unit 45. The output port of the guard-interval-and-cyclic-prefix insertion unit 45 is connected for supplying successive complex digital samples of a COFDM signal to a second input port of the all-services multiplexer 20.

While FIGS. 2 and 4 show time-division multiplexing of ONEs' complementary serial bitstreams into a single serial bitstream for FEC coding, equivalent operation can be achieved by FEC coding the ONEs' complementary bitstreams individually and combining the FEC coding results to form a single codestream. Also, FEC coding may be done on a multiple-phase basis, rather than on a single-phase basis. Such variations are to be considered equivalents of the structures as specifically shown in FIGS. 2 and 4 and claimed infra.

In transmissions made in accordance with the DVB-H standard, further time-slice signaling information, such as burst duration, is included in the time_slice_fec_identifier_descriptor in the INT (IP/MAC Notification Table). Some of this information is also sent within Transmission Parameters Signaling (TPS) bits that are transported by dedicated carriers (TPS Pilots) in the COFDM (Coded Orthogonal Frequency Division Multiplexing) signal so as to be more quickly and easily available to receivers. This relieves a receiver of the need to decode MPEG2 and PSI/SI information, and similar procedure is advocated for inclusion in a U.S. standard for COFDM broadcasting of DTV.

Figure 5:
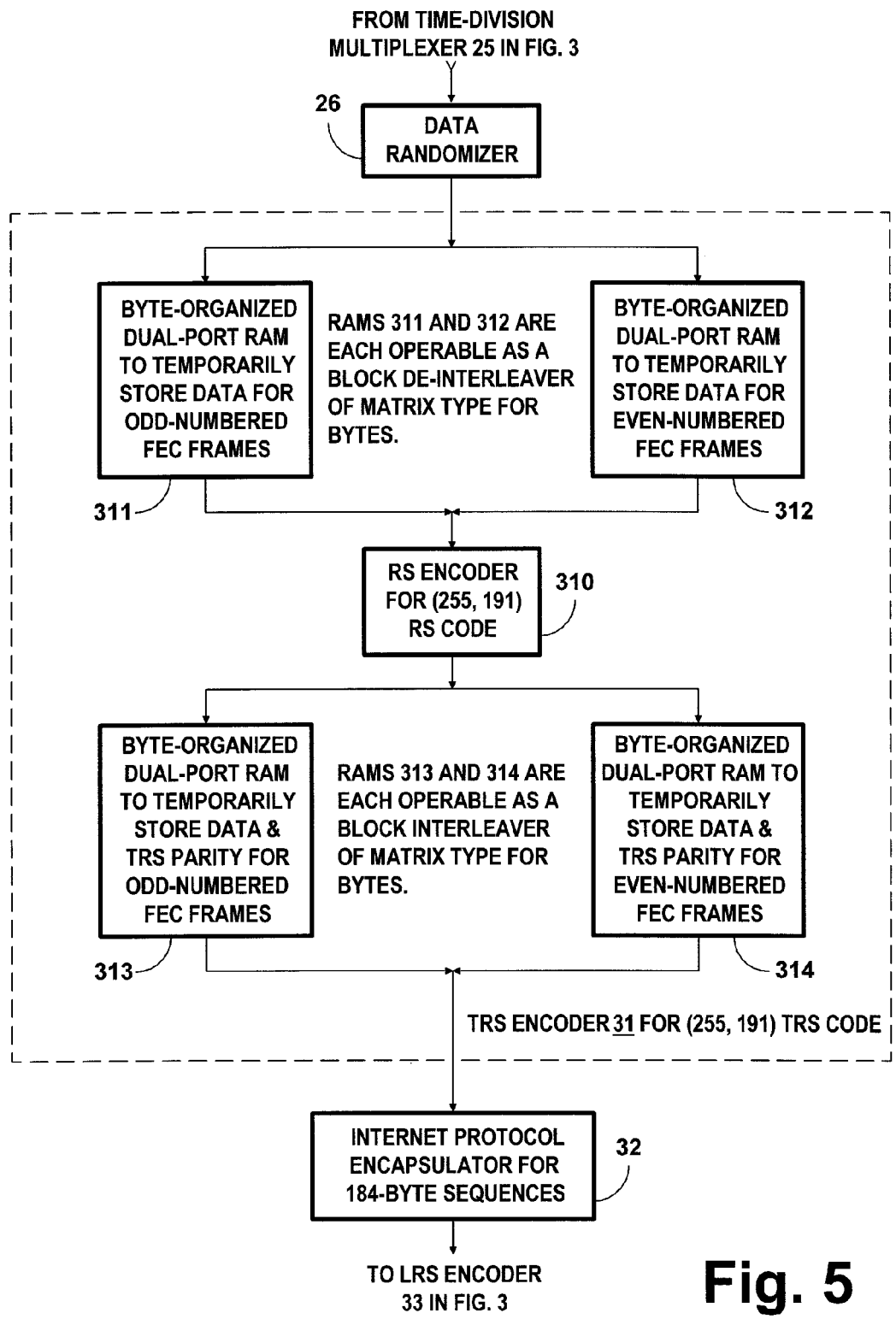
FIG. 5 is a schematic diagram depicting a particular structure for the encoder for transverse (255, 191) Reed-Solomon coding shown in FIG. 3.

FIG. 5 shows in some detail a particular structure for the TRS encoder 31 shown in FIG. 3, which structure comprises an encoder 310 for (255, 191) Reed-Solomon coding and random-access memories 311, 312, 313 and 314. The RAMs 311, 312, 313 and 314 are byte-organized. FIG. 5 shows each of the RAMs 311, 312, 313 and 314 to be dual-ported, which is not necessary but can simplify reading temporarily stored bytes from them.

FIG. 5 shows the output port of the data randomizer 26 connected to the random-access write input ports of the RAMs 311 and 312. The RAM 311 is write-enabled during odd-numbered FEC frames of randomized IP data packets, so successive bytes of those packets can be written row by row into addressable byte storage locations within the RAM 311. The RAM 312 is write-enabled during even-numbered FEC frames of randomized IP data packets, so successive bytes of those packets can be written row by row into addressable byte storage locations within the RAM 312.

The RAMs 311 and 312 are operable as block de-interleavers for bytes supplied to the RS encoder 310 for (255, 191) RS coding. Each of the RAMs 311 and 312 has 191 rows and as many as 1024 columns of addressable byte-storage locations therein. The serial read-output ports of the dual-port RAMs 311 and 312 shown in FIG. 5 are tri-state buffered. This facilitates time-division multiplexing of the read-output signals from the RAMs 311 and 312 to generate input signal supplied to the input port of the encoder 310 for (255, 191) RS coding. While odd-numbered FEC frames of randomized IP data packets are written row by row into addressable byte storage locations within the RAM 311, bytes from the previous even-numbered FEC frame of randomized IP data packets are read column by column from addressable byte storage locations within the RAM 312 to the input port of the RS encoder 310. While even-numbered FEC frames of randomized IP data packets are written row by row into addressable byte storage locations within the RAM 312, bytes from the previous odd-numbered FEC frame of randomized IP data packets are read column by column from addressable byte storage locations within the RAM 311 to the input port of the RS encoder 310.

The RAMs 313 and 314 perform "coded" or "implied" byte interleaving of decoding results supplied from the RS encoder 310 for (255, 191) RS coding. Each of the RAMs 311 and 312 has 255 rows of addressable byte-storage locations therein, arranged in as many columns as the addressable byte-storage locations in the RAMs 311 and 312. The bytes of randomized IP packets reappear in their original order in the results of this "coded" or "implied" byte interleaving performed by the RAMs 313 and 314, which is owing to the earlier byte de-interleaving performed by the RAMs 311 and 312. The serial read-output ports of the dual-port RAMs 313 and 314 shown in FIG. 5 are tri-state buffered. This facilitates time-division multiplexing of the read-output signals from the RAMs 313 and 314 to generate input signal supplied to the input port of the internet protocol encapsulator 32. The byte interleaving performed by the RAMs 313 and 314 is more particularly described in the following two paragraphs.

The RAM 313 is write-enabled when the RS encoder 310 generates (255, 191) RS coding responsive to successive 191-byte segments of randomized IP data packets for odd-numbered FEC frames of randomized IP data, so successive bytes of the resulting (255, 191) RS codewords can be written row by row into addressable byte storage locations within the RAM 313. While (255, 191) RS codewords generated responsive to odd-numbered FEC frames of randomized IP data packets are written row by row into addressable byte storage locations within the RAM 313, bytes from the (255, 191) RS codewords generated responsive to the previous even-numbered FEC frame of randomized IP data packets are read column by column from addressable byte storage locations within the RAM 314 to the input port of the internet protocol encapsulator 32.

The RAM 314 is write-enabled when the RS encoder 310 generates (255, 191) RS coding responsive to successive 191-byte segments of randomized IP data packets for even-numbered FEC frames of randomized IP data, so successive bytes of the resulting (255, 191) RS codewords can be written row by row into addressable byte storage locations within the RAM 314. While (255, 191) RS codewords generated responsive to even-numbered FEC frames of randomized IP data packets are written row by row into addressable byte storage locations within the RAM 314, bytes from the (255, 191) RS codewords generated responsive to the previous odd-numbered FEC frame of randomized IP data packets are read column by column from addressable byte storage locations within the RAM 313 to the input port of the internet protocol encapsulator 32.

Figure 6:
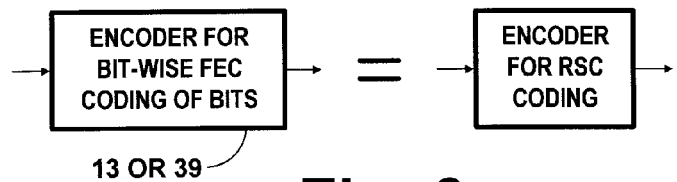
FIGS. 6, 7, 8, 9 and 10 illustrate respective sorts of encoders for various species of bit-wise forward-error-correction coding, any one of which sorts of encoders can be used in the FIG. 2 and FIG. 4 portions of a COFDM transmitter for a DTV system embodying aspects of the invention.

FIG. 6 shows the FIG. 2 encoder 13 for FEC coding or the FIG. 4 encoder 39 for FEC coding as being an encoder for recursive systematic convolutional (RSC) coding. Recursion is used in the convolutional coding, better to maintain an adequate population of ONEs therein.

Figure 7:
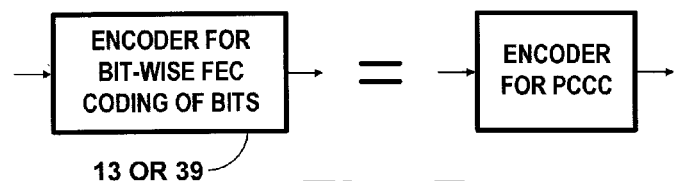

FIG. 7 shows the FIG. 2 encoder 13 for FEC coding or the FIG. 4 encoder 39 for FEC coding as being an encoder for parallel concatenated convolutional coding (PCCC). By way of example, the encoder for PCCC can be as prescribed by the Universal Mobile Telecommunications System (UMTS) specification and standardized by the Third-Generation Partnership Project (3GPP).

Figure 8:
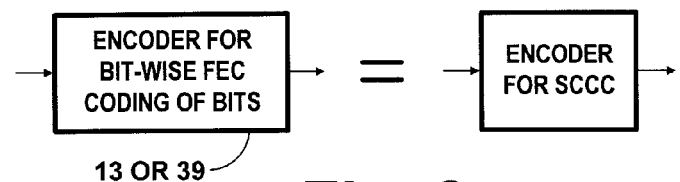
Figure 9:
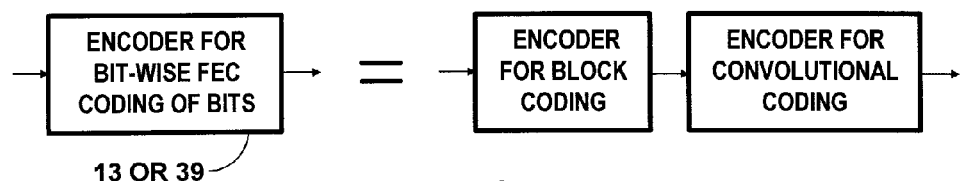
Figure 10:
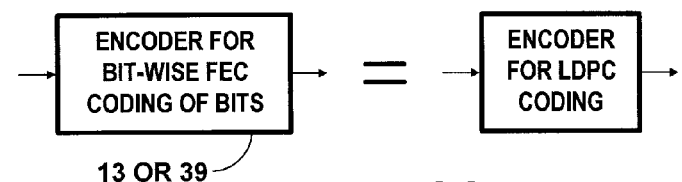

FIG. 8 shows the FIG. 2 encoder 13 for FEC coding or the FIG. 4 encoder 39 for FEC coding as being an encoder for serial concatenated convolutional coding (SCCC). FIG. 9 shows the FIG. 2 encoder 13 or the FIG. 4 encoder 39 as being an encoder for product coding, which encoder is composed of an encoder for block coding followed by an encoder for convolutional coding connected in cascade thereafter. FIG. 10 shows the FIG. 2 encoder 13 or the FIG. 4 encoder 39 as being an encoder for low-density parity-check (LDPC) coding.

FIG. 11 shows the initial portion of a receiver designed for iterative-diversity stationary reception of COFDM signals as transmitted at VHF or UHF by a DTV transmitter such as the one depicted in FIGS. 1 through 4. A reception antenna 46 captures the radio-frequency COFDM signal for application as input signal to a front-end tuner 47 of the receiver. The front-end tuner 47 can be of a double-conversion type composed of initial single-conversion super-heterodyne receiver circuitry for converting radio-frequency (RF) COFDM signal to intermediate-frequency (IF) COFDM signal followed by circuitry for performing a final conversion of the IF COFDM signal to baseband COFDM signal. The initial single-conversion receiver circuitry typically comprises a tunable RF amplifier for RF COFDM signal incoming from the reception antenna, a tunable first local oscillator, a first mixer for heterodyning amplified RF COFDM signal with local oscillations from the first local oscillator to obtain the IF COFDM signal, and an intermediate-frequency (IF) amplifier for the IF COFDM signal. Typically, the front-end tuner 47 further includes a synchronous demodulator for performing the final conversion from IF COFDM signal to baseband COFDM signal and an analog-to-digital converter for digitizing the baseband COFDM signal. Synchronous demodulation circuitry typically comprises a final local oscillator with automatic frequency and phase control (AFPC) of its oscillations, a second mixer for synchrodyning amplified IF COFDM signal with local oscillations from the final local oscillator to obtain the baseband COFDM signal, and a low-pass filter for suppressing image signal accompanying the baseband COFDM signal. FIG. 5 shows an AFPC generator 48 for generating the automatic frequency and phase control (AFPC) signal for controlling the final local oscillator within the front-end tuner 47. In some designs of the front-end tuner 47, synchronous demodulation is performed in the analog regime before subsequent analog-to-digital conversion of the resulting complex baseband COFDM signal. In other designs of the front-end tuner 47 analog-to-digital conversion is performed before synchronous demodulation is performed in the digital regime.

Simply stated, the front-end tuner 47 converts radio-frequency COFDM signal received at its input port to digitized samples of baseband COFDM signal supplied from its output port. Typically, the digitized samples of the real component of the baseband COFDM signal are alternated with digitized samples of the imaginary component of the baseband COFDM signal for arranging the complex baseband COFDM signal in a single stream of digital samples.

The output port of the front-end tuner 47 is connected for supplying digitized samples of baseband COFDM signal to the input port of a cyclic prefix detector 49. The cyclic prefix detector 49 differentially combines the digitized samples of baseband COFDM signal with those samples as delayed by the duration of an effective COFDM symbol. Nulls in the difference signal so generated should occur, marking the guard intervals of the baseband COFDM signal. The nulls are processed to reduce any corruption caused by noise and to generate sharply defined indications of the phasing of COFDM symbols. The output port of the cyclic prefix detector 49 is connected to supply these indications to a first of two input ports of timing synchronization apparatus 50.

A first of two output ports of the timing synchronization apparatus 50 is connected for supplying gating control signal to the control input port of a guard-interval-removal unit 51, the signal input port of which is connected for receiving digitized samples of baseband COFDM signal from the output port of the front-end tuner 47. The output port of the guard-interval-removal unit 51 is connected for supplying the input port of an OFDM demodulator 52 with windowed portions of the baseband COFDM signal that contain effective COFDM samples. A second of the output ports of the timing synchronization apparatus 50 is connected for supplying the OFDM demodulator 52 with synchronizing information concerning the effective COFDM samples. OFDM demodulators are customarily designed to be capable of generating complex coordinates of the discrete Fourier transform (DFT) of 2K, 4K or 8K COFDM carriers.

The output port of the front-end tuner 47 is connected for supplying digitized samples of baseband COFDM signal to the signal input port of the guard-interval-removal unit 51. The indications concerning the phasing of COFDM symbols that the cyclic prefix detector 49 supplies to the timing synchronization apparatus 50 is sufficiently accurate for initial windowing of the baseband COFDM signal that the guard-interval-removal unit 51 supplies to the OFDM demodulator 52.

A first output port of the OFDM demodulator 52 is connected for supplying demodulated pilot carrier information to the input port of a pilot and TPS carriers processor 53. The information concerning unmodulated pilot carriers is processed in the processor 53 to support more accurate windowing of the baseband COFDM signal that the guard-interval-removal unit 51 supplies to the OFDM demodulator 52. Such processing can be done similarly to the way described by Nicole Alcouffe in US-20030138060-A1 published 24 Jul. 2003 with the title "COFDM demodulator with an optimal FFT analysis window positioning", for example. A first of four output ports of the pilot and TPS carriers processor 53 is connected for supplying more accurate window positioning information to the second input port of the timing synchronization apparatus 50.

The pilot and TPS carriers processor 53 demodulates the TPS information conveyed by modulated pilot signals. The second output port of the pilot and TPS carriers processor 53 is connected for supplying the TPS information to an SMT-MH processing unit 89 shown in FIG. 13.

The third output port of the pilot and TPS carriers processor 53 is connected for forwarding unmodulated pilot carriers to the input port of the AFPC generator 48. The real components of the unmodulated pilot carriers are multiplied by their respective imaginary components in the AFPC generator 48. The resulting products are summed and low-pass filtered to develop the AFPC signal that the AFPC generator 48 supplies to the front-end tuner 47 for controlling the final local oscillator therein. Other ways of developing AFPC signals for the final local oscillator in the front-end tuner 47 are also known, which can replace or supplement the method described above. One such other way is described in U.S. Pat. No. 5,687,165 titled "Transmission system and receiver for orthogonal frequency-division multiplexing signals, having a frequency-synchronization circuit", which was granted to Flavio Daffara and Ottavio Adami on 11 Nov. 1997. U.S. Pat. No. 5,687,165 describes complex digital samples from the tail of each OFDM symbol being multiplied by the conjugates of corresponding digital samples from the cyclic prefix of the OFDM symbol. The resulting products are summed and low-pass filtered to develop the AFPC signal that the AFPC generator 48 supplies to the front-end tuner 47 for controlling the final local oscillator therein.

The fourth output port of the pilot and TPS carriers processor 53 is connected for supplying information concerning the respective energies of unmodulated pilot carriers. This information is used for maximal-ratio code combining to be performed in the FIG. 12 portion of the receiver. Although not explicitly shown in FIG. 11, the pilot and TPS carriers processor 53 is connected for supplying the OFDM demodulator 52 with control signal for selecting whether to generate complex coordinates of the DFT of 2K, 4K or 8K COFDM carriers, which control signal is generated responsive to TPS information. Ordinarily, the TPS information specifies the DFT with 8K carriers for transmissions intended for reception by stationary DTV receivers.

A second output port of the OFDM demodulator 52 is connected to supply demodulated complex digital samples of 64 QAM (or, alternatively, of 256 QAM) to a first input port of a frequency-domain channel equalizer 54. FIG. 11 shows the frequency-domain channel equalizer 54 having a second input port connected for receiving pilot carriers supplied from the first input port of the OFDM demodulator 52. A simple form of frequency-domain channel equalizer 54 measures the amplitude of the unmodulated pilot carriers to determine basic weighting coefficients for various portions of the frequency spectrum. The carriers conveying convolutional coding in QAM format are then multiplied by respective weighting coefficients determined by interpolation among the basic weighting coefficients determined by measuring the amplitudes of the unmodulated pilot carriers. Various alternative types of frequency-domain channel equalizer are also known. The output port of the channel equalizer 54 is connected for supplying equalized carriers conveying convolutional coding in QAM format to the input port of a de-mapper 55 for 64 QAM symbols (or, alternatively, for 256 QAM symbols or for 512 QAM symbols). The de-mapper 55 is operable for reproducing at an output port thereof the bit-wise FEC coding supplied as response from the encoder 13 in the FIG. 2 portion of the DTV transmitter.

As thusfar described, the FIG. 11 initial portion of a COFDM receiver is quite similar to the initial portions of COFDM receivers used for DVB in Europe. The output port of the de-mapper 55 is connected for supplying bit-wise FEC coding to the input port of a selector 56 for reproducing at its output port just those transmissions that are not repeated and the final ones of those transmissions that are repeated for iterative-diversity reception. The output port of the de-mapper 55 is further connected for supplying bit-wise FEC coding to the input port of a selector 57 for reproducing at its output port just the initial ones of those transmissions subsequently repeated for iterative-diversity reception. The output port of the selector 57 is connected for writing to the input port of a delay memory 58 which memory is employed to delay the bit-wise FEC coding of the initial transmissions subsequently once-repeated for iterative-diversity reception. The delay can be prescribed fixed delay or, alternatively, can be programmable responsive to delay specified by bits of TPS coding. In either case, the delay is such that the transmissions subsequently repeated for iterative-diversity reception are supplied from the output port of the delay memory 58 concurrently with the corresponding final transmissions as repeated for iterative-diversity reception that are supplied from the output port of the selector 56. The output port of the selector 56 connects to the input ports of selectors 59 and 60 shown in FIG. 12. The read output port of the delay memory 58 connects to the input ports of selectors 61 and 62 shown in FIG. 12.

FIG. 12 shows the selector 59 connected for selectively reproducing at its output port just the soft data bits from the bit-wise FEC coding of the final components of iterative-diversity transmissions, as supplied to its input port from the output port of the selector 56. The selector 59 is further connected for supplying those reproduced soft data bits to a first input port of a maximal-ratio code combiner 63.

FIG. 12 shows the selector 61 connected for selectively reproducing at its output port just the soft data bits from the delayed bit-wise FEC coding of the initial components of iterative-diversity transmissions, as supplied to its input port from the output port of the delay memory 58. The selector 61 is further connected for supplying those reproduced soft data bits to the input port of a logic inverter 64, which complements all the component bits of those reproduced soft data bits in its response. The logic inverter 64 is further connected for supplying its response to a second input port of the maximal-ratio code combiner 63.

The output port of the code combiner 63 is connected for supplying as its response best soft estimates of the data bits of the bit-wise FEC coding as write input signal to a memory 65 for soft data bits and extrinsic data, which memory 65 temporarily stores those best soft estimates of the soft data bits for subsequent use during turbo decoding of a concurrently considered pair of time-slices. The response of the code combiner 63 combines the soft data bits received at its first and second input ports in a ratio responsive to pilot energy information regarding the initial and final components of iterative-diversity transmissions, as supplied from the pilot and TPS carriers processor 53.

The memory 65 also temporarily stores soft extrinsic data bits determined during the subsequent turbo decoding procedures. Soft data bits are read from the memory 65 without being combined with corresponding soft extrinsic data bits during the initial half cycle of an iterative turbo decoding procedure. Thereafter, when soft data bits are read from the memory 65 during subsequent half cycles of the iterative turbo decoding procedure, the soft data bits have respectively corresponding soft extrinsic data bits additively combined therewith. The soft extrinsic data bits temporarily stored in the memory 65 are updated responsive to the results of decoding CC each half cycle of the iterative turbo decoding procedure.

FIG. 12 shows the selector 60 connected for selectively reproducing at its output port just the soft parity bits from the bit-wise FEC coding supplied to its input port from the output port of the selector 56. The output port of the soft-parity-bits selector 59 is connected to supply these selectively reproduced soft parity bits as write input signal to a memory 66 for temporarily storing the soft parity bits of the bit-wise FEC coding for each successive even-numbered time-slice.

FIG. 12 shows the selector 62 connected for selectively reproducing at its output port just the soft parity bits from the bit-wise FEC coding read to its input port from a read-output port of the delay memory 58. The output port of the soft-parity-bits selector 62 is connected to supply these selectively reproduced soft parity bits as write input signal to a memory 67 for temporarily storing the soft parity bits of the bit-wise FEC coding for each successive odd-numbered time-slice.

The memories 65, 66 and 67 together temporarily store all the components of the PCCC for a given service to be received by the stationary DTV receiver depicted in FIGS. 11, 12 and 13. The PCCC is turbo decoded by soft-input/soft-output decoders 68 and 69 in FIG. 12, which preferably employ the sliding-window log-MAP algorithm. The term "log-MAP" is short for "logarithmic maximum a posteriori". During the initial half of each cycle of turbo decoding, the SISO decoder 68 decodes bit-wise FEC coding that includes soft parity bits from an even-numbered time-slice of the service being received. During the final half of each cycle of turbo decoding, the SISO decoder 69 decodes bit-wise FEC coding that includes soft parity bits from an odd-numbered time-slice of the service being received.

FIG. 12 shows a soft-symbols selector 70 that selects soft data bits and soft parity bits to be supplied from first and second output ports thereof, respectively, to first and second input ports of the SISO decoder 68 during the initial half of each cycle of turbo decoding. The soft-symbols selector 70 relays soft data bits additively combined with soft extrinsic data bits, if any, as read to a first input port thereof from the memory 65, thus to generate the soft data bits supplied to the first input port of the SISO decoder 68. The soft-symbols selector 70 reproduces the soft parity bits read to a second input port thereof from the memory 66, thus generating the soft parity bits supplied to the second input port of the SISO decoder 68. In actual practice, the soft-symbols selector 70 will usually be incorporated into the structures of the memories 65 and 66.

The soft data bits supplied from the output port of the SISO decoder 68 as decoding results during the initial half of each cycle of turbo decoding are supplied to a first of two input ports of an extrinsic-data-feedback processor 71. The processor 71 differentially combines soft data bits read from the memory 65 with corresponding soft data bits of the SISO decoder 68 decoding results to generate extrinsic data feedback written into the memory 65 to update the soft extrinsic data bits temporarily stored therein.

FIG. 12 shows a soft-symbols selector 72 that selects soft data bits and soft parity bits to be supplied from first and second output ports thereof, respectively, to first and second input ports of the SISO decoder 69 during the final half of each cycle of turbo decoding. A logic inverter 73 is connected for receiving at the input port thereof soft data bits additively combined with soft extrinsic data bits, if any, as read thereto from the memory 65. The logic inverter 73 inverts the soft data bits read to its input port to generate ONEs' complemented soft data bits supplied from its output port to a first input port of the soft-symbols selector 72. The soft symbols selector 72 relays these ONEs' complemented soft data bits to the first input port of the SISO decoder 69. The soft-symbols selector 72 reproduces the soft parity bits read to a second input port thereof from the memory 67, thereby generating the soft parity bits supplied to the second input port of the SISO decoder 69.

The soft data bits supplied from the output port of the SISO decoder 69 as decoding results during the final half of each cycle of turbo decoding are supplied to the input port of a logic inverter 74 in FIG. 12. FIG. 12 shows the output port of the logic inverter 74 connected to a first of two input ports of an extrinsic data feedback processor 75. The processor 75 differentially combines soft data bits read from the memory 65 with corresponding soft data bits of the logic inverter 74 response to generate extrinsic data feedback written into the memory 65 to update the soft extrinsic data bits temporarily stored therein.

In an alternative configuration that provides equivalent interaction between the SISO decoder 69 and the memory 65, the output port of the SISO decoder 69 connects directly to the first input port of the extrinsic data processor 75. The second input port of the extrinsic data processor 75 logic inverter is connected for receiving the response of a logic inverter that responds to soft data bits read from the memory 65. The memory 65 is connected for receiving soft bits of extrinsic data from the response of another logic inverter receiving its input signal from the output port of the extrinsic data processor 75.

In actual practice, the soft-symbols selector 72 can be incorporated into the structures of the memories 65 and 67. However, the logic inverter 73 must still be connected to provide the route for data bits from the read-output port of the memory 65 to the input port the SISO decoder 69.

After the last half cycle of the iterative turbo decoding procedure, soft data bits as additively combined with respectively corresponding soft extrinsic data bits are read from the memory 65 to the input port of a quantizer 76 depicted in FIG. 13. The addressing of the memory during this read-out is such as to de-interleave the convolutional byte interleaving of the soft bits of the (204, 188) RS codewords in this read-out. The output port of the quantizer 76 is connected for supplying hard decisions concerning de-interleaved soft data bits to the input port of an 8-bit-byte former 77. The 8-bit-byte former 77 responds, to supply successive 204-byte codewords from an output port thereof to the input port of an LRS decoder 78 for (204, 188) lateral Reed-Soomon (LRS) coding. The output port of the LRS decoder 78 is connected for supplying 188-byte packets to the input port of a data de-randomizer 79, which de-randomizes the final 187 bytes of each of those packets to recover a succession of MPEG-2 transport-stream packets.

The foregoing description of turbo decoding describes each cycle as beginning with decoding of an even-numbered time-slice and concluding with the decoding of an odd-numbered time-slice. The order of decoding is arbitrarily chosen, however. Alternatively, turbo decoding can be done with each cycle thereof beginning with decoding of an odd-numbered time-slice and concluding with the decoding of an even-numbered time-slice. Since the operations of the SISO decoders 68 and 69 alternate in time, a single decoder structure can be used for implementing both the SISO decoders 68 and 69 in a modification of the FIG. 12, FIG. 15 or FIG. 26 turbo decoder.

In previous DTV receivers of COFDM signals, the decoders for (204, 188) RS coding used decoding algorithms that located byte errors as well as subsequently correcting them. These decoding algorithms are capable of correcting no more than eight byte errors. If the LRS decoder 78 for (204, 188) RS coding is supplied the locations of byte errors by external means, it can employ a decoding algorithm that is capable of correcting up to sixteen byte errors. The soft data bits read to the quantizer 76 from the memory 65 contain confidence-level information that can be analyzed to locate byte errors for the LRS decoder 78.

FIG. 13 shows a bank 80 of exclusive-OR gates that exclusive-OR the hard data bit of each soft data bit read from the memory 65 with the remaining bits of that soft bit expressive of the level of confidence that the hard data bit is correct. The result of this operation is the generation of a plurality of bits expressing in absolute terms the level of lack of confidence that the hard data bit is correct. A selector 81 selects the largest level of lack of confidence in the bits of each successive 8-bit byte, to express the lack of confidence in the correctness of the byte considered as a whole. An adaptive threshold detector 82 compares the levels of lack of confidence for each byte in each successive (204, 188) RS codeword to a threshold value to generate a respective byte-error indication for each byte having a level of lack of confidence that exceeds the threshold value. The adaptive threshold detector 82 adjusts the threshold value for each (204, 188) RS codeword individually, when necessary, so the number of byte errors in the codeword is no more than sixteen. The adaptive threshold detector 82 then supplies the LRS decoder 78 with indications of the locations of the byte errors in the (204, 188) RS codeword that is to be corrected next.

The data de-randomizer 79 is connected to supply these MPEG-2 packets to a detector 83 of a "well-known" SMT-MH address and to a delay unit 84. The delay unit 84 delays the MPEG-2 transport-stream (TS) packets supplied to a packet selector 85 for selecting SMT-MH packets from other TS packets. The delay unit 84 provides delay of a part of a TS-packet header interval, which delay is long enough for the detector 83 to ascertain whether or not the "well-known" SMT-MH address is detected.

If the detector 83 does not detect the "well-known" SMT-MH address in the TS packet, the detector 83 output response conditions the packet selector 85 to reproduce the TS packet for application to a packet sorter 86 as input signal thereto. The packet sorter 86 sorts out each TS packet in which the transport-error-indication (TEI) bit is ZERO-valued for writing to a cache memory 87 for TS packets. A ZERO-valued TEI bit in the header of each TS packet header will have been toggled to a ONE if it was not successfully decoded by the LRS decoder 78. The cache memory 87 temporarily stores those TS packets in which the TEI bit is ZERO-valued, for possible future reading to the later stages 88 of the receiver.

If the detector 83 does detect the "well-known" SMT-MH address in the TS packet, establishing it as an SMT-MH packet, the detector 83 output response conditions the packet selector 85 to reproduce the SMT-MH packet for application to an SMT-MH processing unit 89, which includes circuitry for generating control signals for the later stages 88 of the M/H receiver. FIG. 13 shows the SMT-MH processing unit 89 connected for receiving Fast Information Channel (FIC) information from the TPS carriers processor 53 in FIG. 11. The SMT-MH processing unit 89 integrates this FIC information with information from SMT-MH packets during the generation of Service Map Data. The Service Map Data generated by the SMT-MH processing unit 89 is written into memory 90 for temporary storage therein and subsequent application to the later stages 88 of the M/H receiver. The SMT-MH processing unit 89 relays those SMT-MH packets that have ZERO-valued TEI bits to a user interface 91, which typically includes an Electronic Service Guide (ESG) and apparatus for selectively displaying the ESG on the viewing screen of the M/H receiver. A patent application filed for A. L. R. Limberg, published 11 Mar. 2010 as US-2010-0061465-A1, and titled "Sub-channel Acquisition in a Digital Television Receiver Designed to Receive Mobile/Handheld Signals" provides more detailed descriptions of the operations of the portion of an M/H receiver as shown in FIG. 13. The description with reference to the drawing FIGS. 12, 13 and 14 of that application describe operations relying on the SMT-MH tables available in A/153.

FIGS. 14, 15, 16 and 17 together provide a generic schematic diagram of a mobile or handset (M/H) DTV receiver adapted for iterative-diversity reception of COFDM signals as broadcast by the portions of the DTV transmitter depicted in FIGS. 3 and 4. COFDM transmissions to M/H DTV receivers are presumed to employ 64 QAM symbol constellations. Rather than 8K carrier waves in the COFDM used in transmissions to stationary DTV receivers, the COFDM used for broadcasting to M/H DTV receivers uses only 4K carrier waves. The portion of the M/H DTV receiver shown in FIG. 14 differs from the portion of the stationary DTV receiver shown in FIG. 11 insofar as to take these differences into account. Usually, the reception antenna 146 of the M/H DTV receiver will differ from the reception antenna 46 of the stationary receiver. Generally, however, elements 146, 147, 148, 149, 150, 151, 152, 153, 154, 155, 156, 157 and 158 shown in FIG. 14 correspond in general function to elements 46, 47, 48, 49, 50, 51, 52, 53, 54, 55, 56, 57 and 58, respectively, shown in FIG. 11.

Figure 14:
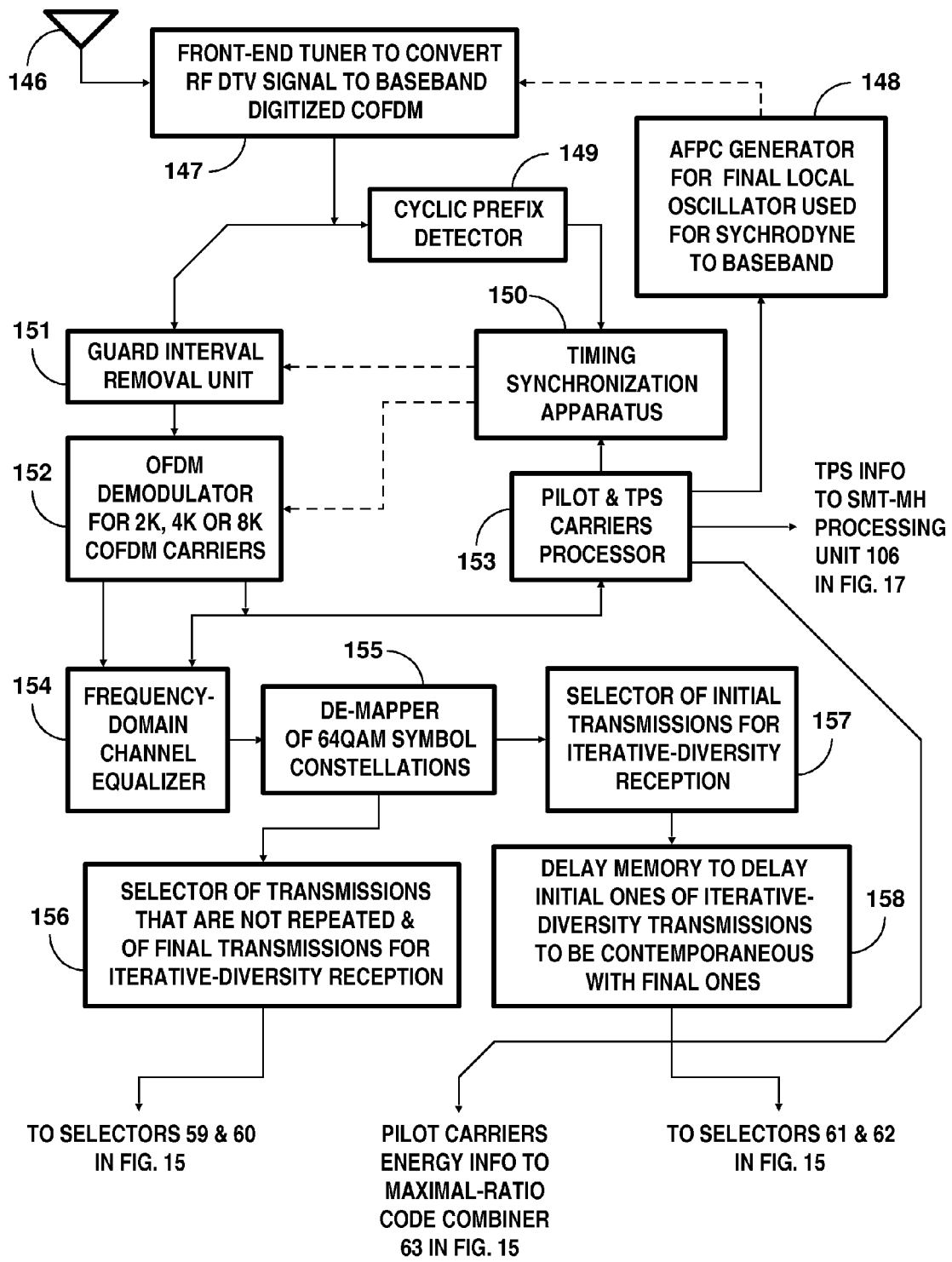

In FIG. 14 an APC generator 148 controls the frequency and phase of oscillations generated by the final local oscillator within the front-end tuner 147 and used for synchrodyning DTV signals to baseband. The output port of the front-end tuner 147 is connected for supplying digitized samples of baseband COFDM signal to the input port of a cyclic prefix detector 149. The output port of the cyclic prefix detector 149 is connected to supply indications of the phasing of COFDM symbols to a first of two input ports of timing synchronization apparatus 150. A first of two output ports of the timing synchronization apparatus 150 is connected for supplying gating control signal to the control input port of a guard-interval-removal unit 151. The signal input port of the guard-interval-removal unit 151 is connected for receiving digitized samples of baseband COFDM signal from the output port of the front-end tuner 147. The input port of an OFDM demodulator 152 for 64 QAM is connected for receiving windowed portions of the baseband COFDM signal that contain effective COFDM samples, as supplied from the output port of the guard-interval-removal unit 151. A second of the output ports of the timing synchronization apparatus 150 is connected for supplying the OFDM demodulator 152 with synchronizing information concerning the effective COFDM samples.

A first output port of the OFDM demodulator 152 is connected for supplying demodulated pilot carrier information to the input port of a pilot and TPS carriers processor 153. A first of four output ports of the pilot and TPS carriers processor 153 is connected for supplying more accurate window positioning information to the second input port of the timing synchronization apparatus 150. The second output port of the pilot and TPS carriers processor 153 is connected for supplying the TPS information to the SMT-MH processing unit 106 shown in FIG. 17. The third output port of the pilot and TPS carriers processor 153 is connected for forwarding unmodulated pilot carriers to the input port of the AFPC generator 148 that supplies AFPC signal to the front-end tuner 147 for controlling the final local oscillator therein. The fourth output port of the pilot and TPS carriers processor 153 is connected for supplying information concerning the respective energies of unmodulated pilot carriers to the maximal-ratio code combiner 63 in the FIG. 15 portion of the receiver. Although not explicitly shown in FIG. 14, the pilot and TPS carriers processor 153 is connected for supplying the OFDM demodulator 152 with control signal for selecting whether to generate complex coordinates of the DFT of 2K, 4K or 8K COFDM carriers, which control signal is generated responsive to TPS information. Ordinarily, the TPS information specifies the DFT with 4K carriers for transmissions intended for reception by M/H DTV receivers.

A second output port of the OFDM demodulator 152 is connected to supply demodulated complex digital samples of 64 QAM to a first input port of a frequency-domain channel equalizer 154. FIG. 8 shows the frequency-domain channel equalizer 154 having a second input port connected for receiving pilot carriers supplied from the first input port of the OFDM demodulator 152. The output port of the channel equalizer 154 is connected for supplying equalized carriers conveying CC in QAM format to the input port of a de-mapper 155 for 64 QAM symbols. The de-mapper 155 is operable for reproducing at an output port thereof the bit-wise FEC coding supplied as response from the encoder 15 in the FIG. 2 portion of the DTV transmitter.

The output port of the de-mapper 155 is connected for supplying bit-wise FEC coding to the input port of a selector 156 for reproducing at its output port just those transmissions that are not repeated and the final ones of those transmissions repeated for iterative-diversity reception. The output port of the de-mapper 155 is further connected for supplying bit-wise FEC coding to the input port of a selector 157 for reproducing at its output port just the initial ones of those transmissions subsequently repeated for iterative-diversity reception. The output port of the selector 57 is connected for writing to the input port of a delay memory 158 that delays the bit-wise FEC coding of the initial transmissions subsequently once-repeated for iterative-diversity reception. The delay is such that the transmissions subsequently repeated for iterative-diversity reception are supplied from the output port of the delay memory 158 concurrently with the corresponding final transmissions as repeated for iterative-diversity reception that are supplied from the output port of the selector 157. The output port of the selector 156 connects to the input ports of selectors 59 and 60 shown in FIG. 15. The output port of the delay memory 158 connects to the input ports of selectors 61 and 62 shown in FIG. 15.

The FIG. 15 portion of the M/H DTV receiver operates substantially the same as the FIG. 12 portion of the stationary DTV receiver. The elements of the FIG. 15 portion of the M/H DTV receiver are identified by the same reference numerals as the elements of the FIG. 12 portion of the stationary DTV receiver that perform similar functions. However, in order to store all the bits in a time-slice the memories 65, 66 and 67 in FIG. 15 are apt not to require as much capacity for storage of bits as the memories 65, 66 and 67 in FIG. 12 require to store all the bits in a frame. This is even more so the case if the M/H DTV receiver is designed to recover 64 QAM symbol constellations, but the stationary DTV receiver is designed to recover 256 QAM or 512 QAM symbol constellations rather than 64 QAM symbol constellations. The soft data bits of the turbo decoding results read from the memory 65 are supplied to the input port of the quantizer 76 shown in FIG. 16.

FIG. 16 shows an 8-bit-byte former 77 connected for forming the serial-bit response of the quantizer 76 into eight-bit bytes. An extended-byte former 92 is connected for receiving the 8-bit bytes formed by the 8-bit-byte former 77 and appending to each of those bytes a number of bits indicative of the likelihood that that byte is in error. These bits indicative of the level of lack of confidence that a byte is correct are generated in the following way. A bank 80 of XOR gates is connected for exclusive-ORing the hard bit of each successive soft data bit in the turbo decoding results read from the memory 65 with each of the soft bits descriptive of the level of confidence that that hard bit is correct. The bank 80 of XOR gates thus generates a respective set of bits indicative of the level of lack of confidence that each successive hard bit is correct. A selector 81 selects the largest of the successive lack-of-confidence levels regarding the eight bits in each 8-bit-byte, to determine a level of lack of confidence that the byte is correct. The selector 81 provides the extended-byte former 92 with bits indicative of the level of lack of confidence that the byte is correct, which bits are appended to the byte to generate an extended-byte. Typically, there are four to eight bits in the byte extensions. The output port of the extended-byte former 92 is connected for supplying successive extended-bytes to the input port of an LRS decoder 93 for (204, 188) lateral Reed-Solomon (LRS) coding.

The LRS decoder 93 is preferably of a sort that employs an erasure decoding algorithm for correcting up to sixteen byte errors in each (204, 188) Reed-Solomon codeword. Such an algorithm requires that byte errors be located and replaced by erasures before that decoding algorithm can be employed. Accordingly, the LRS decoder 93 can include a threshold detector that compares the levels of lack of confidence for each byte in each successive (204, 188) RS codeword to a threshold value. This threshold detector generates a byte error indication for each byte having a level of lack of confidence that exceeds the threshold value. The threshold detector then provides the LRS decoder 93 with indications of the locations of the byte errors in the (204, 188) LRS codeword next to be corrected. The LRS decoder 93 is also provided capability for adjusting the extension of each byte in the 188-byte IPE packets in the decoding results therefrom. The output port of the LRS decoder 93 supplies 188-byte IPE packets with each byte accompanied by a byte extension indicative of the level of lack of confidence in that byte being correct. If the LRS decoder 93 was capable of correcting the IPE packet, the byte extensions are zero-valued. If the LRS decoder 93 was incapable of correcting the IPE packet, the byte extensions retain the values they had upon entry into the LRS decoder 93.

The extended bytes of each IPE packet are written into a successive respective row of extended-byte storage locations in a random-access memory 94 operated to perform the matrix-type block de-interleaving procedure that is a first step of the TRS decoding routine. The RAM 94 is subsequently read one column of extended bytes at a time to a decoder 95 of (255, 191) Reed-Solomon code. The extension bits accompanying the 8-bit bytes of the TRS code are used to help locate byte errors for the TRS code, as will be described in further detail infra with reference to FIG. 20. Such previous location of byte errors facilitates successful use of a Reed-Solomon algorithm capable of correcting more byte errors than an algorithm that must locate byte errors as well as correct them. The 8-bit data bytes that have been corrected insofar as possible by the RS decoder 95 are written, column by column, into respective columns of byte-storage locations of a random-access memory 96. The RAM 96 is operated to perform the matrix-type block re-interleaving procedure for data in further steps of the TRS decoding routine. In a final step of the TRS decoding routine, the byte-storage locations in the RAM 96 are read from row by row for supplying reproduced randomized M/H data to the input port of a data de-randomizer 97 in the FIG. 17 portion of the M/H receiver.

Figure 17:
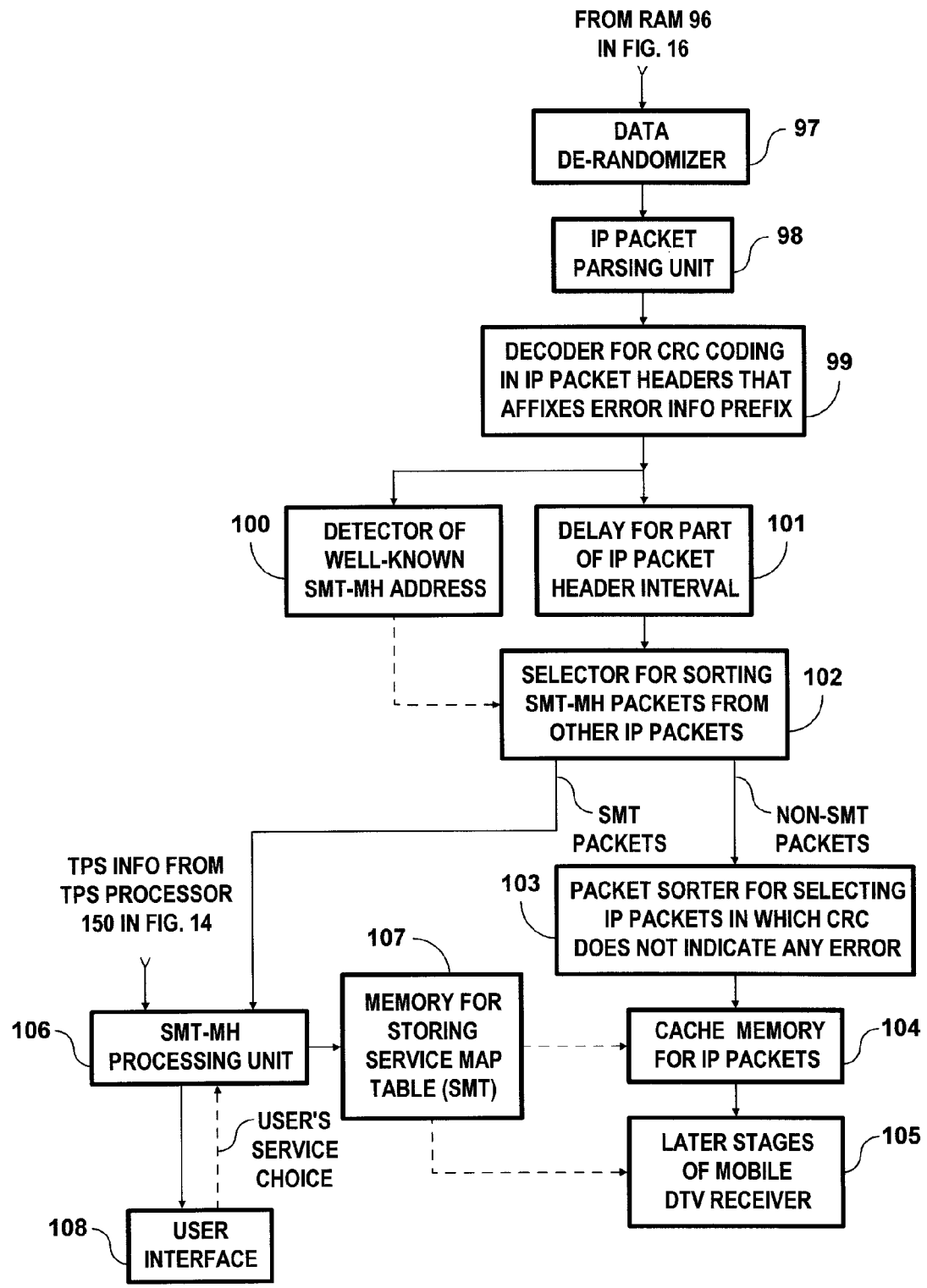

Referring now to FIG. 17, the data de-randomizer 97 is connected for receiving the output signal read from the byte-organized RAM 96 in FIG. 16. The data de-randomizer 97 de-randomizes the bytes of that signal by converting them to serial-bit form and exclusive-ORing the bits with the pseudo-random binary sequence (PRBS) prescribed for data randomization. The data de-randomizer 97 then converts the de-randomized bits into bytes of IP data. From this point on, the receiver resembles a mobile/handheld (M/H) receiver for M/H transmissions made using 8VSB specified by the standard directed to broadcasting digital television and digital data to mobile receivers adopted by ATSC on 15 Oct. 2009. The IP data essentially correspond to the IP data that an M/H receiver recovers from M/H transmissions made using 8VSB.

The input port of a parsing unit 98 for parsing the data stream into internet-protocol (IP) packets is connected for receiving bytes of M/H data from the output port of the data de-randomizer 101. The IP-packet parsing unit 98 performs this parsing responsive to two-byte row headers respectively transmitted at the beginning of each row of IP data in the FEC frame. This row header indicates where the earliest start of an IP packet occurs within the row of IP data bytes from the FEC frame. If a short IP packet is completely contained within a row of bytes within the FEC frame, the IP-packet parsing unit 98 calculates the start of a later IP packet proceeding from the packet length information contained in the earlier IP packet from that same row of bytes within the FEC frame.

The IP-packet parsing unit 98 is connected for supplying IP packets to a decoder 99 for cyclic-redundancy-check coding in IP packets. Each IP packet begins with a nine-byte header and concludes with a four-byte, 32-bit checksum for CRC coding of that IP packet. The decoder 99 is constructed to preface each IP packet that it reproduces with a prefix bit indicating whether or not error has been detected in that IP packet. The decoder 99 is connected to supply these IP packets as so prefaced to a detector 100 of a "well-known" SMT-MH address and to a delay unit 101. The delay unit 101 delays the IP packets supplied to a packet selector 102 for selecting SMT-MH packets from other IP packets. The delay unit 101 provides delay of a part of an IP packet header interval, which delay is long enough for the detector 100 to ascertain whether or not the "well-known" SMT-MH address is detected.

If the detector 100 does not detect the "well-known" SMT-MH address in the IP packet, the detector 100 output response conditions the packet selector 102 to reproduce the IP packet for application to a packet sorter 103 as input signal thereto. The packet sorter 103 sorts out those IP packets in which the preface provides no indication of CRC coding error for writing to a cache memory 104 for IP packets. The prefatory prefix bit before each of the IP packets that indicates whether there is CRC code error in its respective bytes is omitted when writing the cache memory 104. The cache memory 104 temporarily stores at least those IP packets not determined to contain CRC code error for possible future reading to the later stages 105 of the M/H receiver.

If the detector 100 does detect the "well-known" SMT-MH address in the IP packet, establishing it as an SMT-MH packet, the detector 100 output response conditions the packet selector 102 to reproduce the SMT-MH packet for application to an SMT-MH processing unit 106, which includes circuitry for generating control signals for the later stages 105 of the mobile receiver. FIG. 11 shows the SMT-MH processing unit 106 connected for receiving FIC information from the TPS carriers processor 153 in FIG. 14. The SMT-MH processing unit 106 integrates this information with information from SMT-MH packets during the generation of Service Map Data. The Service Map Data generated by the SMT-MH processing unit 106 is written into memory 107 for temporary storage therein and subsequent application to the later stages 105 of the mobile receiver. The SMT-MH processing unit 106 relays those SMT-MH packets that have bit prefixes that do not indicate error in the packets to a user interface 108, which includes an Electronic Service Guide (ESG) and apparatus for selectively displaying the ESG on the viewing screen of the mobile receiver.

Figure 18:
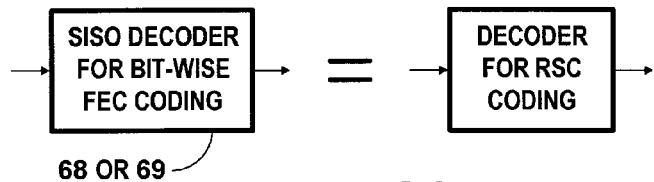

FIG. 18 shows the SISO decoder 68 or the SISO decoder 69 being a decoder for recursive systematic convolutional (RSC) coding. Such decoders 68 and 69 are used in FIG. 12 portions of stationary DTV receivers when the encoder 13 for FEC coding bits in the transmitter shown in FIGS. 1 and 2 is per FIG. 6 an encoder for RSC coding. Such decoders 68 and 69 are used in FIG. 15 portions of M/H receivers when the encoder 39 for FEC coding bits in the transmitter shown in FIGS. 3 and 4 is per FIG. 6 an encoder for RSC coding.

Figure 19:
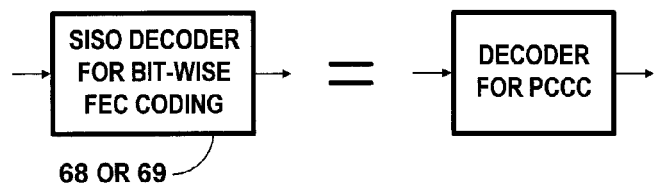

FIG. 19 shows the SISO decoder 68 or the SISO decoder 69 being a decoder for parallel concatenated convolutional coding (PCCC). Such decoders 68 and 69 are used in FIG. 12 portions of stationary DTV receivers when the encoder 13 for FEC coding bits in the transmitter shown in FIGS. 1 and 2 is per FIG. 7 an encoder for PCCC. Such decoders 68 and 69 are used in FIG. 15 portions of M/H receivers when the encoder 39 for FEC coding bits in the transmitter shown in FIGS. 3 and 4 is per FIG. 7 an encoder for PCCC.

Figure 20:
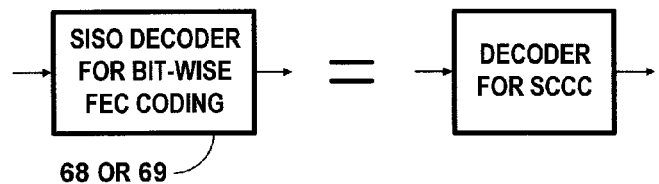

FIG. 20 shows the SISO decoder 68 or the SISO decoder 69 being a decoder for serial concatenated convolutional coding (SCCC). Such decoders 68 and 69 are used in FIG. 12 portions of stationary DTV receivers when the encoder 13 for FEC coding bits in the transmitter shown in FIGS. 1 and 2 is per FIG. 8 an encoder for SCCC. Such decoders 68 and 69 are used in FIG. 15 portions of M/H receivers when the encoder 39 for FEC coding bits in the transmitter shown in FIGS. 3 and 4 is per FIG. 8 an encoder for SCCC.

Figure 21:
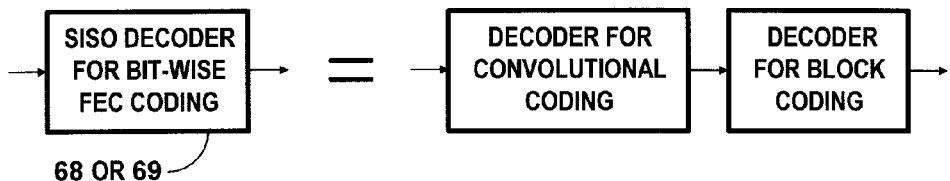

FIG. 21 shows the SISO decoder 68 or the SISO decoder 69 being a cascade connection of a decoder for convolutional coding followed by a decoder for block coding. Such decoders 68 and 69 are used in FIG. 12 portions of stationary DTV receivers when the encoder 13 for FEC coding bits in the transmitter shown in FIGS. 1 and 2 is per FIG. 9 an encoder for product coding. Such decoders 68 and 69 are used in FIG. 15 portions of M/H receivers when the encoder 39 for FEC coding bits in the transmitter shown in FIGS. 3 and 4 is per FIG. 9 an encoder for product coding. The FIG. 21 decoder for product coding is a cascade connection of a decoder for convolutional coding, followed by a decoder for block coding.

Figure 22:
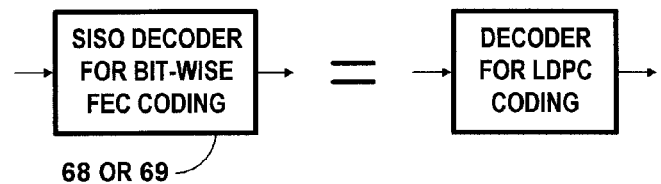

FIG. 22 shows the SISO decoder 68 or the SISO decoder 69 being a decoder for low-density parity-check (LDPC) coding. Such decoders 68 and 69 are used in FIG. 12 portions of stationary DTV receivers when the encoder 13 for FEC coding bits in the transmitter shown in FIGS. 1 and 2 is per FIG. 10 an encoder for LDPC coding. Such decoders 68 and 69 are used in FIG. 15 portions of M/H receivers when the encoder 39 for FEC coding bits in the transmitter shown in FIGS. 3 and 4 is per FIG. 10 an encoder for LDPC coding.

FIG. 23 shows further elements that are included in preferred connections to and from the memory 65 in the turbo decoder embodiments shown in FIGS. 12 and 15. These further elements are operable to decrease lack-of-confidence levels of data bits of correct (204, 188) RS codewords stored temporarily within the memory 65 during the performance of turbo decoding procedures. A third address generator comprising a read-only memory 117 shown in FIG. 24, but not explicitly shown in FIG. 23, is used for addressing the memory 65 so as to de-interleave the convolutional byte interleaving of soft bits of (204, 188) RS codewords read from the memory 65 during a break in a normal cycle of turbo decoding procedure. The respective hard-decision bits of these soft bits are supplied to the input port of an LRS decoder 109 for (204, 188) lateral Reed-Solomon (LRS) coding. The respective further bits of these soft bits expressive of lack-of-confidence levels for their respective hard-decision bits are supplied to an input port of a generator 110 of lower or lowest confidence levels for bits of (204, 188) RS codewords that are correct(ed). That is, of (204, 188) RS codewords that were originally correct or have been corrected by the LRS decoder 109 for (204, 188) LRS coding. The confidence-level generator 110 includes a temporary storage register for the confidence levels of each successive (204, 188) LRS codeword.

The lack-of-confidence level generator 110 can include circuitry responsive to the lack-of-confidence levels of hard-decision bits in each (204, 188) RS codeword to locate byte errors for the LRS decoder 109. This allows the LRS decoder 109 to use a byte-error-correction-only algorithm that can correct sixteen byte errors per (204, 188) LRS codeword, rather than a byte-error-location-and-correction algorithm that can correct only eight byte errors per (204, 188) LRS codeword. FIG. 23 shows a connection 111 for conveying byte-error-location from the lack-of-confidence level generator 110 to the LRS decoder 109.

When the LRS decoder 109 finds a (204, 188) LRS codeword to be correct or is able to correct it, the LRS decoder 109 supplies the memory 65 an over-write enable signal that conditions the memory 65 to accept over-writing of the soft data bits regarding that (204, 188) LRS codeword. The soft data bits used for such over-writing are composed of hard-decision bits supplied by the LRS decoder 109 and accompanying further bits indicative of the lack-of-confidence levels regarding those hard-decision bits, which further bits are supplied by the lack-of-confidence level generator 110. The over-write enable signal conditions the third address generator comprising the ROM 117, used to address the memory 65 during over-writing the soft data bits regarding a (204, 188) RS codeword, so as to convolutionally interleave the bytes of the correct(ed) RS codeword.

When the LRS decoder 109 finds a (204, 188) RS codeword to be correct or is able to correct it, the LRS decoder 109 supplies the lack-of-confidence level generator 110 a pulse indication that this is so. The confidence-level generator 110 responds to this pulse indication to decrease, if possible, the lack-of-confidence levels of the bits of the correct(ed) LRS codeword written back to the memory 65. This can be done, for example, by subtracting a specified increment from the lack-of-confidence level of each soft data bit stored in the temporary storage register and replacing any negative lack-of-confidence level with a zero-valued lack-of-confidence level.

FIG. 23 shows a counter 112, the count input port of which is connected for receiving the pulse indications the LRS decoder 109 supplies responsive to finding (204, 188) RS codewords to be correct(ed). The count supplied from the count output port of the counter 112 is reset to zero at the beginning of each cycle of turbo decoding. The count output port of the counter 112 is connected for supplying the count of correct (204, 188) LRS codewords per time-slice to the input port of a detector 113 of reaching the full count of correct (204, 188) LRS codewords per time-slice. That is, the count of correct (204, 188) LRS codewords per time-slice associated with every one of the (204, 188) LRS codewords in a time-slice being correct. The value for such full count for a time-slice is specified to the detector 113 from the pilot and TPS carriers processor 53 or 153. If the full count of correct (204, 188) LRS codewords per time-slice is reached at the conclusion of a cycle of turbo decoding, the detector 113 supplies an indication of this condition to a turbo decoding control unit 119. The turbo decoding control unit 119, shown in FIG. 24, can respond by concluding turbo decoding of the half-frame or time-slice.

Variants of the confidence-level generator 110 described above simply replace the lack-of-confidence levels of all the soft bits of correct(ed) RS codewords written back to the memory 65 with lack-of-confidence levels of zero or close to zero value. The convolutional byte interleaving of a correct (ed) RS codeword written back to the memory 65 disperses the soft data bits with decreased levels of lack-of-confidence throughout the bit-wise FEC coding presented to the SISO decoders 68 and 69 for decoding. The dispersal of data bits with low lack-of-confidence levels throughout the FEC coding presented to the SISO decoders 68 and 69 facilitates their selecting data bit sequences most likely to be correct as its decoding results.

FIG. 24 depicts apparatus for addressing memories 65, 66 and 67 of either of the turbo decoders shown FIGS. 12 and 15, as modified per FIG. 23. The previous contents of the memories 65, 66 and 67 are erased in bulk before writing parallel concatenated FEC coding of new half-frames or time-slices into those memories. A clocked symbol counter 114 is reset to initial count, ordinarily arithmetic zero for an up-counter, at the beginning of each address scan of the memories 65, 66 and 67. The count from the symbol counter 114 is supplied as read addressing to each of three read-only memories 115, 116 and 117.

The ROM 115 is operable to function as a first address generator. The ROM 115 stores a first list of addresses for the memories 65, 66 and 67. These addresses are supplied in correct order for performing forward-direction passes of log-MAP decoding procedures using the SISO decoders 68 and 69 shown in FIGS. 12 and 15. The memories 65, 66 and 67 as shown in either of FIGS. 12 and 15 are addressed according to this first list when they are written with soft-bit responses from the code combiner 63, from the soft parity bits selector 60 and from the soft parity bits selector 62, respectively. The memories 65 and 66 are addressed according to this first list when they read soft data bits, soft extrinsic-data bits and soft parity bits of FEC coding from even-numbered half-frames or time-slices to be decoded by the SISO decoder 68. The memory 65 is addressed according to this first list when soft extrinsic data bits are updated by the extrinsic data feedback processor 71 responsive to decoding results from the SISO decoder 68. The memories 65 and 67 are addressed according to this first list when they read soft data bits, soft extrinsic-data bits and soft parity bits of FEC coding from odd-numbered half-frames or time-slices to be decoded by the SISO decoder 69. The memory 65 is addressed according to this first list when soft extrinsic data bits are updated by the extrinsic data feedback processor 75 responsive to decoding results from the SISO decoder 69.

The ROM 116 is operable to function as a second address generator. The ROM 116 stores a second list of addresses for the memories 65, 65 and 67. These addresses are supplied in correct order for performing reverse-direction passes of log-MAP decoding procedures using the SISO decoders 68 and 69 as shown in FIGS. 12 and 15. The memories 65 and 66 are addressed according to this second list when they read soft data bits, soft extrinsic-data bits and soft parity bits of FEC coding from even-numbered half-frames or time-slices to be decoded by the SISO decoder 68. The memory 65 is addressed according to this second list when soft extrinsic data bits are updated by the extrinsic data feedback processor 71 responsive to decoding results from the SISO decoder 68. The memories 65 and 67 are addressed according to this second list when they read soft data bits, soft extrinsic-data bits and soft parity bits of FEC coding from odd-numbered half-frames or time-slices to be decoded by the SISO decoder 69. The memory 65 is addressed according to this second list when soft extrinsic data bits are updated by the extrinsic data feedback processor 75 responsive to decoding results from the SISO decoder 69.

The ROM 117, storing a third list of addresses for the memory 65, functions as a third address generator. The memory 65 is addressed according to this third list stored in the ROM 117 when (204, 188) RS codewords are read from the memory 65. Such read addressing provides de-interleaving to counteract the convolutional byte interleaving introduced at the DTV transmitter. The memory 65 is also addressed according to this third list stored in the ROM 117 when writing corrected (204, 188) RS codewords back into the memory 65 together with updated lack-of-confidence levels regarding the hard data bits in those codewords. Such write addressing restores the convolutional byte interleaving introduced at the DTV transmitter.

An addressing selector 118 is operable for reproducing at its output port the read output response from a selected one of the ROMs 115, 116 and 117 connected for supplying their respective read output responses to respective ones of first, second and third input ports of the addressing selector 118. The turbo decoding controller 119 is connected for supplying a dual-bit control signal to the addressing selector 118 to control selection of the appropriate one of the addressing scans read from the ROMs 115, 116 and 117. Although not explicitly shown in FIG. 24, the turbo decoding controller 119 supplies read-control signals and write-control signals to the memories 65, 66 and 67 for controlling their use of the addresses furnished from the ROMs 115, 116 and 117.

The FIG. 24 configuration is presented as an aid for understanding the concepts involved in addressing the memories 65, 66 and 67. In actual practice, the symbol counter 114 is apt to be constructed so as to generate the first list of sequential addresses directly from its upward counting, with no intervening ROM 115 being used. The symbol counter 114 is apt to be constructed so as to generate the second list of sequential addresses directly from its complementary downward counting, with no intervening ROM 116 being used.

FIG. 25 is an informal flow chart illustrating the improved method of turbo decoding employed by the turbo decoders shown in FIGS. 12 and 15 as modified to include the further elements shown in FIG. 23. In an initial step 121 of the method, soft bits of the response of code combiner 63 to a pair of concurrent time-slices are loaded into the memory 65.

FIG. 25 shows a next step 122 of the improved turbo decoding method, wherein the contents of the addressed storage locations within the memory 65 are read using addressing that de-interleaves the convolutional byte interleaving of the (204, 188) LRS codewords temporarily stored within the memory 65. The step 122 supplies the LRS decoder 109 shown in FIG. 23 with the (204, 188) LRS codewords of a time-slice.

FIG. 25 shows a next step 123 of the improved turbo decoding method, wherein each of the (204, 188) LRS codewords is decoded and byte errors are corrected insofar as possible. In the portion of the turbo decoder shown in FIG. 23, the LRS decoder 109 performs this part of the step 123. The step 123 is a compound step in which indications are generated as to whether or not each byte of the (204, 188) LRS codewords is correct at the conclusion of the step 123. In this part of the step 123, the LRS decoder 109 generates a respective bit indicating whether or not each LRS codeword it has processed will be correct at the conclusion of the step 123.

FIG. 25 shows a next step 124 of the improved turbo decoding method, wherein the bytes of (204, 188) LRS codewords are re-interleaved while being written back to the memory 65 after decoding and possible correction. The re-interleaved bytes, together with appended indications as to whether each byte is correct supplied by the generator 110 shown in FIG. 23, update the temporarily stored contents of the turbo decoding memory in step 125 of the improved turbo decoding method.

The steps 122, 123 and 124 provide the crux of the improvement in the FIG. 25 method of turbo decoding. FIG. 25 shows these steps being carried out successively, processing consecutive (204, 188) LRS codewords from each time-slice as a group, rather than individually. This facilitates understanding the general concept of what the improvement is in the turbo decoding method. However, processing the consecutive (204, 188) LRS codewords of each time-slice as a group, rather than individually, requires the LRS decoder 109 to have a considerable amount of memory of its own. This memory is needed to temporarily store each RS codeword as it is corrected until such time as the group of corrected LRS codewords is written back to turbo decoding memory to update the contents temporarily stored therein. Preferably, the steps 122, 123 and 124 are performed sequentially for each (204, 188) RS codeword read from a turbo decoding memory. In the turbo decoding circuitry, such procedure substantially reduces the requirement for memory in the LRS decoder 109 shown in FIG. 23. Such procedure moves to the memory 65 the temporary storage of (204, 188) LRS codewords required after their correction insofar as possible by the LRS decoder 109. The temporary storage of the (204, 188) LRS codewords after processing by the LRS decoder 109 updates addressed storage locations in the memory 65, without requiring additional byte-storage capability.

After the steps 122, 123, 124 and 125 are carried out for all (204, 188) RS codewords from a time-slice, one cycle of decoding parallel concatenated FEC coding is performed in step 126 of the improved method of turbo decoding shown in FIG. 25. If the cycle of decoding performed in step 126 is not the sole one nor the final iteration of a series of such decoding cycles in a turbo decoding procedure, the results from this cycle of decoding parallel concatenated FEC coding provide turbo feedback for a subsequent step 127. In the step 127 the extrinsic data concerning soft data bits that are temporarily stored in the memory 65 are updated dependent on the turbo feedback provided by the immediately preceding step 126.

The step 127 concludes one cycle of turbo decoding and begins the next cycle of turbo decoding in which the step 127 is followed by repeated steps 122, 123 and 124.

The step 126 is followed by a step 128 if the cycle of decoding parallel concatenated FEC coding performed in step 126 is the sole one or is the final iteration of a series of decoding cycles in a turbo decoding procedure. In the step 128 the soft data bits of the ultimate turbo decoding results are forwarded to the quantizer 76 as shown in FIG. 13 or in FIG. 16.

FIG. 26 shows a turbo decoding portion of a DTV receiver alternative to either of the turbo decoding portions of DTV receivers depicted in FIG. 12 or FIG. 15. Rather than the output port of the soft data bits selector 60 connecting directly to the first input port of the maximal-ratio code combiner 63, it connects to the input port of a logic inverter 140 the output port of which connects to the first input port of the code combiner 63. The output port of the soft data bits selector 61 connects directly to the second input port of the code combiner 63, rather than connecting to the input port of a logic inverter 64 the output port of which connects to the second input port of the code combiner 63. Accordingly, the output port of the code combiner 63 supplies soft data bits of bit-complemented (204, 188) LRS codewords for writing to the memory 65 for soft data bits and extrinsic data. That is, the memory 65 temporarily stores soft bits of FALSE (204, 188) LRS codewords, rather than soft bits of TRUE (204, 188) LRS codewords.

The soft-symbols selector 70 selects soft data bits and soft parity bits to be supplied from first and second output ports thereof, respectively, to first and second input ports of the SISO decoder 68 during the initial half of each cycle of turbo decoding. The input port of a logic inverter 141 is connected to receive soft bits of bit-complemented (204, 188) LRS codewords read from the memory 65 during the initial half of each cycle of turbo decoding. The logic inverter 141 responds to them to supply soft bits of TRUE (204, 188) LRS codewords from its output port. These soft bits of TRUE (204, 188) LRS codewords are supplied as soft data bits to the first input port of the soft symbols selector 70. Soft parity bits read from the memory 66 are supplied to the second input port of the soft symbols selector 70.

Decoding results from the decoder 68 are supplied to the input port of a logic inverter 142. The output port of the logic inverter 142 is connected for supplying bit-complemented SISO decoder 68 decoding results to the extrinsic-data-feedback processor 71. The processor 71 differentially combines soft data bits read from the memory 65 with corresponding soft data bits of the bit-complemented SISO decoder 68 decoding results to generate extrinsic data feedback written into the memory 65 to update the soft extrinsic data bits temporarily stored therein.

The soft-symbols selector 72 selects soft data bits and soft parity bits to be supplied from first and second output ports thereof, respectively, to first and second input ports of the SISO decoder 69 during the final half of each cycle of turbo decoding. Soft data bits additively combined with soft extrinsic data bits, if any, as read from the memory 65 to the first input port of the soft-symbols selector 72. The soft symbols selector 72 relays these soft data bits descriptive of bit-complemented (204, 188) RS codewords to the first input port of the SISO decoder 69. The soft-symbols selector 72 reproduces the soft parity bits read to a second input port thereof from the memory 67, thereby generating the soft parity bits supplied to the second input port of the SISO decoder 69.

The soft data bits supplied from the output port of the SISO decoder 69 as decoding results during the final half of each cycle of turbo decoding are supplied directly to a first of two input ports of an extrinsic data feedback processor 75. That is, in FIG. 26 a direct connection from the output port of the SISO decoder 69 to the first input port of the extrinsic data feedback processor 75 replaces the logic inverter 74 shown in each of the FIGS. 12 and 15. The processor 75 differentially combines soft data bits read to its second input port from the memory 65 with corresponding soft data bits of the SISO decoder 69 decoding results to generate extrinsic data feedback written into the memory 65 to update the soft extrinsic data bits temporarily stored therein.

After the last half cycle of the iterative turbo decoding procedure, soft data bits as additively combined with respectively corresponding soft extrinsic data bits are read from the memory 65 to the input port of a logic inverter 143. The addressing of the memory during this read-out is such as to de-interleave the convolutional byte interleaving of the soft bits of the bit-complemented (204, 188) LRS codewords in this read-out. Responsive to the soft bits of the bit-complemented (204, 188) LRS codewords received at its input port, the logic inverter 143 supplies soft bits of TRUE (204, 188) LRS codewords from its output port to the input port of the quantizer 76 shown in one of FIGS. 13 and 16.

The SISO decoders 68 and 69 shown in FIGS. 12, 15 and 26 perform their respective decoding procedures in different halves of each turbo decoding cycle. Accordingly, with appropriate switching, the same physical structural elements can be used for performing the functions of the SISO decoder 69 and the extrinsic-data feedback processor 75 as used for performing the functions of the SISO decoder 68 and the extrinsic-data feedback processor 71. Receiver apparatuses so constructed are to be considered equivalents of those shown in FIGS. 12, 15 and 26.

FIG. 27 shows a modification of the FIG. 23 portion of a DTV receiver used when the DTV receiver includes a turbo decoding portion as depicted in FIG. 26. The memory 65 for soft bits and extrinsic data in the FIG. 27 turbo decoding portion of a DTV receiver temporarily stores bit-complemented (204, 188) LRS codewords, rather than TRUE (204, 188) LRS codewords. The LRS decoder 109 shown in FIG. 23 precedes each (204, 188) LRS codeword with 51 all-ZEROes bytes in an attempt to generate a full-length 255-byte RS codeword for subsequent decoding. Preceding each bit-complemented (204, 188) LRS codeword with 51 all-ZEROes bytes does not result in a full-length 255-byte RS codeword that can be successfully decoded. FIG. 27 shows the LRS decoder 109 for (204, 188) LRS coding replaced by an LRS decoder 144 for bit-complemented (204, 188) LRS coding. The LRS decoder 144 precedes each bit-complemented (204, 188) LRS codeword with 51 all-ONEs bytes. Preceding each bit-complemented (204, 188) LRS codeword with 51 all-ONEs bytes results in a full-length 255-byte RS codeword that can be successfully decoded if it is not too much corrupted by noise. This is owing to the fact that complementing all the bits of a full-length Reed-Solomon codeword results in another full-length Reed-Solomon codeword, a property called "transparency" that shortened Reed-Solomon codewords do not have.

FIG. 27 shows a generator 145 of lower or lowest lack-of-confidence levels for bits of bit-complemented (204, 188) LRS codewords found to be correct or corrected by the LRS decoder 144 for bit-complemented (204, 188) LRS coding. The structure of the generator 145 is essentially the same as the structure of the generator 110 shown in FIG. 23. The generator 145 differs from the generator 110 in that it responds to indications of the correctness of bit-complemented (204, 188) LRS codewords received from the LRS decoder 144, rather than to indications of the correctness of (204, 188) LRS codewords received from the LRS decoder 109. Also, the generator 145 supplies confidence levels to the LRS decoder 144 via the connection 111, rather than the LRS decoder 109 doing so. Preferably, the LRS decoder 144 uses these confidence levels to locate errors for erasure decoding that can correct as many as sixteen erroneous byte errors if needed.

FIG. 28 shows in more detail how the decoder for (255, 191) transverse Reed-Solomon coding of FEC frames can be provided with indications of byte errors, so that subsequent erasure decoding can correct up to sixty-four erroneous bytes in each (255, 191) codeword of TRS coding. FIG. 28 explicitly shows a TRS decoding controller 129 that controls the procedures for decoding (255, 191) TRS coding in the M/H receiver shown in FIGS. 14, 15, 16 and 17. FIG. 28 does not explicitly show the connections of the TRS decoding controller 129 to the RAMS 94 and 96 for controlling their respective writing and reading operations. FIG. 28 does not explicitly show the connections of the TRS decoding controller 129 to the decoder 95 for controlling its decoding of (255, 191) TRS coding, nor does FIG. 28 explicitly show the connections from the TRS decoding controller 129 to the RAMs 94 and 96 for controlling the reading and writing operations of each of them. FIG. 28 shows in detail an arrangement 130 of elements 131-137 that locates byte errors for the TRS decoder 95 for (255, 191) transverse Reed-Solomon coding, which TRS decoder 95 appears in FIG. 16 of the overall schematic diagram for an M/H receiver.

Extended bytes of 188-byte packets of decoding results from the LRS decoder 93 shown in FIG. 16 are supplied to the random-access write-input port of the RAM 94 shown in FIG. 28. The extended bytes of these packets of decoding results are extended bytes of IPE packets supplied to the write-input port of the RAM 94 in the order that bytes of IPE packets were supplied to the LRS encoder for (204, 188) LRS coding in the DTV transmitter. The write addressing of the RAM 94 is such that extended bytes of IPE packets are written into addressable extended-byte-storage locations thereof, row by row. If DTV transmitters vary from what FIG. 3 shows, in that byte de-interleaving is introduced before the LRS encoder to complement convolutional byte interleaving of (204, 188) LRS codewords after the LRS encoder, the write addressing of the RAM 94 will be such as to re-interleave the byte de-interleaved IPE packets written to the RAM 94 from the LRS decoder 93 shown in FIG. 16. If LRS encoders in DTV transmitters encode IPE packets without modifying the order of bytes therein, as depicted in FIG. 3, the write addressing of the RAM 94 will select extended-byte-storage locations therein row after row for temporarily storing extended bytes of successive IPE packets.

FIG. 28 shows a CRC decoder 159 for decoding the cyclic-redundancy-check (CRC) coding of each IP packet temporarily stored in the extended-byte-storage locations of the RAM 94. Before the TRS decoding of each time-slice, successive IPE packets are read from a first serial read-output port of the RAM 94 to the input port of the CRC decoder 159. The CRC decoder 159 parses the IP packets in this succession of IPE packets and decodes the CRC coding of each IP packet for detecting whether there be error therein. The CRC decoder 159 is provided capability for adjusting the extension of each byte in the IP packets it decodes. An output port of the CRC decoder 159 is connected to a write-input port of the RAM 94 to write the IP packets with each byte accompanied by a byte extension indicative of the level of lack of confidence in that byte being correct to the rows of extended-byte-storage locations so as to over-write the IPE packets previously temporarily stored in those storage locations. If the CRC decoder 159 does not find an IP packet to contain error, the byte extensions indicative of the levels of lack of confidence in each of its bytes being correct are adjusted to be zero-valued. If the CRC decoder 159 does find an IP packet to contain error, the byte extensions indicative of the levels of lack of confidence in each of its bytes being correct retain the values they had upon entry into the CRC decoder 159.

If LRS encoders in the COFDM DTV transmitters encode IPE packets without modifying the order of bytes therein, as depicted in FIG. 3, IPE packets will appear in original byte order in the decoding results from the LRS decoder 93. This accommodates an alternative configuration differing from that shown in FIG. 28 in regard to placement of the CRC decoder 159. In this alternative configuration the CRC decoder 159 is interposed between the LRS decoder 93 and the random-access write-input port of the RAM 94, with the output port of the LRS decoder 93 connected to the input port of the CRC decoder 159 and with the output port of the CRC decoder 159 connected to the write-input port of the RAM 94.

Previous DTV receivers for DVB-H signals have decoded the CRC coding of IP packets recovered from the decoding of (204, 188) LRS codewords to generate indications of which IP packets contain error. These indications of error have then been used to implement subsequent erasure decoding of the (255, 191) TRS codewords, in the attempt to correct those IP packets that decoding CRC coding found to contain error. The problem with this previously known technique is that only as few as a single erroneous bit in an IP packet many bytes in length causes erasure of all the bits from that IP packet. This is apt to affect a large percentage, if not all, the (255, 191) TRS codewords in an FEC frame. Error location is less precise than using error indications from the decoding of (204, 188) LRS codewords, since IP packets are generally contain many more bits than the 188-byte segments resulting from the decoding of (204, 188) LRS codewords. The results of error location from the CRC coding of IP packets can be logically ORed with results of error location from the decoding of (204, 188) LRS codewords to refine error location to a degree. However, error location is still apt to be much, much less precise than locating byte errors based on the confidence levels of soft bits of turbo decoding results.

As specified supra the LRS decoder 93 responds to its finding 188-byte segments that were encoded in (204, 188) codewords of LRS coding to be correct or corrected, for adjusting the lack-of-confidence levels of the bytes of those 188-byte segments to indicate greater confidence that those bytes are correct. This does not reduce the precision of locating byte errors based on the confidence levels of soft bits of turbo decoding results, but rather tends to locate byte errors still more precisely by reducing the number of bytes in which errors are presumably to be found. Decoding results from the decoder 159 for the CRC coding of IP packets are utilized analogously. Some bytes that would not have their lack-of-confidence levels reduced by the LRS decoder 93 may have their lack-of-confidence confidence levels reduced by the decoder 159 for CRC coding.

Decoding of the (255, 191) codewords of TRS coding temporarily stored in the columns of extended-byte-storage locations in the RAM 94 begins after the CRC decoder 159 has updated the lack-of-confidence levels of the extended bytes temporarily stored in the RAM 94. Initially, the decoder 95 is operated so as to attempt to correct a TRS codeword using a byte-error-location-and-correction decoding algorithm. If the TRS codeword has too many byte errors to be corrected by this algorithm, the decoder 95 then resorts to a byte-error-correction-only decoding algorithm. The extension bits accompanying each successive 8-bit byte of a TRS codeword from the RAM 94 are supplied to a comparator 131 used as a threshold detector. The extension bits indicate the likelihood as to whether the 8-bit byte is in error, and comparator 131 compares them to an error threshold. If the likelihood that the 8-bit byte is in error exceeds the error threshold, the comparator 131 responds with a logic ONE indicative that the byte is presumably in error. Otherwise, the comparator 131 responds with a logic ZERO indicative that the byte is presumably correct.

FIG. 28 shows the sum output signal from a clocked digital adder 132 supplied to the comparator 131 as the error threshold. The value of the error threshold is initialized in the following way at the outset of each TRS codeword being read from the RAM 94. A two-input multiplexer 133 is connected to supply its response as a first of two summand signals supplied to the adder 132, the second summand signal being arithmetic one. The sum output signal from the clocked adder 132 is applied as one of two input signals to the multiplexer 133, and an initial error threshold value less one is applied as the other input signal to the multiplexer 133. Just before each TRS codeword is read from the RAM 94 a respective pulsed logic ONE is generated by TRS decoding controller 129. The pulsed logic ONE is applied as control signal to the multiplexer 133, conditioning it to reproduce the initial error threshold value less one in its response supplied to the adder 132 as a summand input signal. The clocked adder 132 receives its clock signal from an OR gate 134 connected to receive the pulsed logic ONE at one of its input connections. The OR gate 134 reproduces the pulsed logic ONE in its response, which clocks an addition by the adder 132. The adder 132 adds its arithmetic one summand input signal to the initial error threshold value less one summand input signal received from the multiplexer 133, generating the initial error threshold value as its sum output signal supplied to the comparator 131.

The pulsed logic ONE also resets to arithmetic zero the output count from a byte-error counter 135 that is connected for counting the number of logic ONEs that the comparator 131 generates during each TRS codeword. This output count is applied as subtrahend input signal to a digital subtractor 136. There is hard-wired application of the binary number 100 0000, equal to the number of parity bytes in each of the (255, 191) TRS codewords, to the digital subtractor 136 as minuend input signal. A minus-sign-bit detector 137 generates a logic ONE if and when the number of byte errors in a TRS codeword counted by the counter 135 exceeds the number of parity bytes in a TRS codeword. This logic ONE is supplied to the TRS decoding controller 129 as an indication that the current TRS codeword is to be read out from the RAM 94 again. This logic ONE is supplied to the OR gate 134 as an input signal thereto. The OR gate 134 responds with a logic ONE that resets the counter 135 to zero output count and that clocks the clocked digital adder 132. Normally, the multiplexer 133 reproduces the error threshold supplied as sum output from the adder 132. This reproduced error threshold is applied to the adder 132 as a summand input signal, connecting the clocked adder 132 for clocked accumulation of arithmetic ones in addition to the previous error threshold. The logic ONE from the OR gate 134 causes the error threshold supplied as sum output from the adder 132 to be incremented by arithmetic one, which tends to reduce the number of erroneous bytes located within the TRS codeword upon its being read again from the RAM 94.

If and when the number of erroneous bytes located in the TRS codeword is fewer than the sixty-four parity bytes that a (255, 191) TRS codeword should have, the TRS decoding controller 129 will cause the next TRS codeword in the RS Frame to be processed if such there be. The TRS decoding controller 129 will initiate reading such next TRS codeword from the RAM 94 to the TRS decoder 95 and writing the TRS decoding results from the just previous TRS codeword into the RAM 96.

FIG. 29 shows a configuration alternative to that in FIG. 28. In FIG. 29 a byte-organized plural-port random-access memory 160 for 8-bit bytes of data plus respective byte extensions concerning the lack of confidence in each of those 8-bit bytes of data replaces the RAMs 94 and 96 shown both in FIG. 16 and in FIG. 28. The FIG. 29 configuration includes the arrangement 130 of elements 131-137 to locate byte errors for the TRS decoder 95 for (255, 191) TRS coding. The FIG. 29 configuration does not include the TRS decoding controller 129. Instead, decoding operations in regard to (255, 191) TRS coding and CRC coding of IP packets are controlled by an CRS and TRS decoding controller 138 in the FIG. 29 configuration.

FIG. 29 does not explicitly show the connections of the CRS and TRS decoding controller 138 to the decoder 95 for controlling its decoding of (255, 191) TRS coding, nor does FIG. 29 explicitly show the connections from the LRS and TRS decoding controller 138 to the RAM 160 for controlling its reading and writing operations. Extended bytes of 188-byte packets of decoding results from the LRS decoder 93 shown in FIG. 16 are supplied to a random-access write-input port of the RAM 160 shown in FIG. 29. The extended bytes of these packets of decoding results are extended bytes of IPE packets supplied to the write-input port of the RAM 160 in the order that bytes of IPE packets were supplied to the LRS encoder for (204, 188) LRS coding in the DTV transmitter. The write addressing of the RAM 160 is such that extended bytes of IPE packets are written into addressable extended-byte-storage locations thereof, row by row.

FIG. 29 shows the CRC decoder 159 connected for decoding the CRC coding of each IP packet temporarily stored in the extended-byte-storage locations of the RAM 160. Before the TRS decoding of each time-slice, successive IPE packets are read from a first serial read-output port of the RAM 160 to the input port of the CRC decoder 159. The CRC decoder 159 parses the IP packets in this succession of IPE packets and decodes the CRC coding of each IP packet for detecting whether there is error therein. The CRC decoder 159 is provided capability for adjusting the extension of each byte in the IP packets it decodes. An output port of the CRC decoder 159 is connected to a write-input port of the RAM 160 to write the IP packets with each byte accompanied by a byte extension indicative of the level of lack of confidence in that byte being correct to the rows of extended-byte-storage locations so as to over-write the IPE packets previously temporarily stored in those storage locations. If the CRC decoder 159 does not find an IP packet to contain error, the byte extensions indicative of the levels of lack of confidence in each of its bytes being correct are adjusted to be zero-valued. If the CRC decoder 159 does find an IP packet to contain error, the byte extensions indicative of the levels of lack of confidence in each of its bytes being correct retain the values they had upon entry into the CRC decoder 159.

Decoding of the (255, 191) codewords of TRS coding temporarily stored in the columns of extended-byte-storage locations in the RAM 106 begins after the CRC decoder 159 has updated the lack-of-confidence levels of the extended bytes temporarily stored in the RAM 94. The extended-byte storage locations in the RAM 160 are read one column at a time from a serial-output port to supply 8-bit data bytes to the TRS decoder 95 during each step of decoding all the (255, 191) TRS codewords in an FEC frame. The accompanying byte-extensions are directed to the arrangement 130 of elements 131-137 that locates byte errors for the decoder 95 for (255, 191) TRS coding in the same way as in the FIG. 28 configuration. Initially, the TRS decoder 95 is operated so as to attempt to correct each TRS codeword using a byte-error-location-and-correction decoding algorithm. If the TRS codeword has too many byte errors to be corrected by this algorithm, the decoder 95 then resorts to a byte-error-correction-only decoding algorithm. This algorithm is performed using the arrangement 130 of elements 131-137 to locate byte errors for the TRS decoder 95 in substantially the same way as described supra in regard to the FIG. 28 configuration. In the FIG. 29 configuration the operation of the elements 131-137 is controlled by the CRC and TRS decoding controller 138, rather than by the TRS decoding controller 129.

The operation of the CRC decoder 159 is also controlled by the CRC and TRS decoding controller 138. The controller 138 includes a counter for counting the number of correct IP packets it finds in a time-slice and further includes a register for temporarily storing the most recent complete count of correct IP packets found in a time-slice.

The CRS and TRS decoding controller 138 also includes a register that keeps account of which of the (255, 191) codewords of TRS coding in an FEC frame are found to be correct. Before the time allotted for decoding the FEC frame expires, this register can fill with indications that all of them have been found to be correct. A decoder composed of a tree of AND gates can detect this condition, presuming the register is written with ONEs representative of correct (255, 191) TRS codewords. If such condition obtains, iterative TRS decoding of the FEC frame is discontinued until the next FEC frame is to be decoded. If some of the (255, 191) TRS codewords in an FEC frame remain in error and there is still enough allotted time left for further decoding of the FEC frame, the TRS decoder 95 begins the next step in the iterative TRS decoding procedure.

Insofar as concerns the reading (255, 191) codewords of TRS coding temporarily stored in the columns of extended-byte-storage locations in the RAM 106 to the TRS decoder 95, the operation of the RAM 160 is similar to the operation of the RAM 94 in the FIG. 28 configuration. The FIG. 29 configuration differs from the FIG. 28 configuration in that there is no byte-organized RAM 96 to which 191-byte segments of decoding results from the TRS decoder 95 are written. Instead, extended bytes of complete (255, 191) codewords of TRS coding with any corrections resulting from decoding by the TRS decoder 95 are written back to the RAM 160 to over-write the extended bytes of those (255, 191) codewords as previously temporarily stored in extended-byte-storage locations within the RAM 160. The TRS decoder 95 in the FIG. 29 configuration differs from the TRS decoder 95 in the FIG. 28 configuration in that it is also provided capability for adjusting the extensions of each byte in the (255, 191) codewords of TRS coding in the decoding results therefrom. The output port of the TRS decoder 95 supplies (255, 191) codewords of TRS coding with each byte accompanied by a byte extension indicative of the level of lack of confidence in that byte being correct. If the TRS decoder 95 was capable of correcting the (255, 191) codeword, the byte extensions are zero-valued. If the TRS decoder 95 was incapable of correcting the (255, 191) codeword, the byte extensions retain the values they had upon entry into the TRS decoder 95.

The over-writing of (255, 191) codewords of TRS coding previously stored in the RAM 160 supports iterative decoding. As noted supra, the CRC and TRS decoding controller 138 includes a register for keeping account of (255, 191) codewords of TRS coding that the TRS decoder 95 corrects or finds already to be correct in an FEC frame. If the time available for decoding of the TRS coding of an FEC frame essentially has run out, or if all the (255, 191) codewords of TRS coding in an FEC frame are correct, decoding of TRS coding in the FEC frame is concluded. The CRC and TRS decoding controller 138 commands the row-by-row reading of IP packets from the extended-byte-storage locations in the RAM 160 to the input port of the data de-randomizer 97 shown in FIG. 17.

If there is ample further time available for decoding of the TRS coding of an FEC frame, and if fewer than all the (255, 191) codewords of TRS coding in a time-slice are accounted for as being correct, the CRC and TRS decoding controller 138 commands the CRC decoder 159 again to decode the CRC coding of each IP packet temporarily stored in the extended-byte-storage locations of the RAM 160. Whether there is ample further time available for decoding of the TRS coding of an FEC frame depends in substantial degree to the number of (255, 191) codewords of TRS coding in an FEC frame still to be corrected. The time required for iterative decoding by the TRS decoder 95 can be shortened by decoding only those (255, 191) codewords of TRS coding not yet corrected, as determined from the register within the CRC and TRS decoding controller 138 for keeping account of which of the (255, 191) codewords of TRS coding in an FEC frame have been found to be correct.

If the number of correct IP packets the CRC decoder 159 currently finds in an FEC frame does not exceed the number of correct IP packets the CRC decoder 159 previously found in that FEC frame, decoding of TRS coding in that FEC frame is concluded. The CRC and TRS decoding controller 138 commands the row-by-row reading of IP packets from the extended-byte-storage locations in the RAM 160 to the input port of the data de-randomizer 97 shown in FIG. 17.

If the number of correct IP packets the CRC decoder 159 currently finds in an FEC frame does exceed the number of correct IP packets the CRC decoder 159 previously found in that FEC frame, decoding of TRS coding in that FEC frame is iterated. The extended bytes of the IP packets of that FEC frame as temporarily stored in the RAM 160 will have been altered by the capability of the CRC decoder 159 for adjusting to zero value the lack-of-confidence indication in the extension of each byte in the IP packets it finds to be correct. The reduction of any larger lack-of-confidence indications in previous byte extensions may allow successful correction of at least one further (255, 191) codewords of TRS coding in an FEC frame.

FIG. 30 is an informal flow chart illustrating a procedure for operating the FIG. 29 configuration. In a first step 161 of this procedure, the extended-byte-organized random-access memory 160 is written by 188-byte packets supplied from the LRS decoder 93, each byte of which has a respective byte extension indicative of the lack of confidence in that particular byte being correct. The RAM 160 is addressed during this writing such that the extended bytes of IPE packets from the LRS decoder 93 response are temporarily stored in successive rows of storage locations within the RAM 160. Supposing that DTV transmitters are like the one shown in FIGS. 3 and 4 in that they do not employ coded convolutional byte interleaving of the (204, 188) LRS codewords, the storage locations in the RAM 160 are addressed row by row during their being written by extended bytes of IPE packets extracted from the LRS decoder 93 decoding results.

DTV transmitters may vary from the one shown in FIGS. 3 and 4 in that the LRS encoder is preceded by a byte de-interleaver complementary to the convolutional byte interleaver succeeding the LRS encoder. This results in coded convolutional byte interleaving of the (204, 188) codewords of LRS coding. Coded convolutional byte interleaving of the (204, 188) codewords requires that the bytes of the 188-byte packets recovered by the LRS decoder in a DTV receiver be re-interleaved in order to recover IPE packets. The write addressing of the RAM 160 can be modified to provide such re-interleaving, so that extended bytes of successive IPE packets are stored in rows of extended-byte-storage locations in the RAM 160.

In a second step 162 of the FIG. 30 method of operating the FIG. 29 configuration, extended bytes of the IPE packets are read from rows of byte-storage locations in the memory 160 to the CRC decoder 159 for decoding the cyclic-redundancy-check (CRC) coding of IP packets. In a subsequent step 163 the CRC decoder 159 determines which IP packets are correct and updates the extensions of the bytes in those correct IP packets to reduce the respective levels of lack-of-confidence in those bytes being correct, possibly to zero value. In a subsequent step 164, the adjusted byte extensions of correct IP packets are written back to update respective rows of storage locations in the memory 160. The method of operating the FIG. 29 configuration, illustrated in FIG. 30, then proceeds to its step 165.

In the step 165 extended bytes of the (255, 191) TRS codewords are read from columns of storage locations in the memory 160 to the decoder 95 for (255, 191) TRS codewords. In a subsequent step 166 the decoder 95 corrects the (255, 191) TRS codewords, if it can, and updates the byte extensions of the bytes in corrected (255, 191) TRS codewords to indicate reduced levels of lack-of-confidence in those bytes being correct. Since the byte extensions indicate levels of lack-of-confidence in associated bytes, these levels are reduced possibly to zero value for bytes in corrected (255, 191) TRS codewords. In a subsequent step 167, bytes of corrected (255, 191) TRS codewords together with their adjusted byte extensions are written back to update respective columns of storage locations in the memory 160. The method of operating the FIG. 29 configuration, illustrated in FIG. 30, then proceeds to its step 168 following the step 167.

In the step 168, when the decoding of the TRS coding of an FEC frame has concluded, IPE packets are read from the rows of storage locations in the memory 160 to the data de-randomizer 97 shown in FIG. 17. Otherwise, if correcting more byte errors in the FEC frame is attempted, operation loops back from the step 169 to the step 163 of the method of operating the FIG. 29 configuration illustrated in FIG. 30 and continues therefrom.

Iterative TRS decoding procedures are possible that make use of the cross-interleaved Reed-Solomon coding (CIRC) provided by the (204, 188) LRS coding and the (255, 191) TRS coding. So-called "sandwich" decoding of two-dimensional Reed-Solomon coding such as CIRC was described by A. L. R. Limberg in a U.S. patent application titled "Robust signal transmissions in digital television broadcasting" and published 25 Nov. 2004 as US-2004-0237024-A1. The error correction that is available from the (204, 188) LRS coding provides for iterative decoding of the TRS coding of an FEC frame that is considerably more powerful in correcting errors than the configuration shown in FIG. 29. However, the DTV receiver must then provide temporary storage for extended parity bytes of the (204, 188) LRS coding to augment the temporary storage for extended bytes of IPE packets that RAM 160 provides.

Providing temporary storage for the extended parity bytes of the (204, 188) LRS coding is a fairly complex matter, unless the number of (255, 191) codewords of TRS coding in an FEC frame is a multiple of 188, the number of bytes in an IPE packet, which results in alignment of the IPE packets in contiguous rows of extended-byte-storage locations in the RAM 160. For example, if the RAM 160 stores 5×188=940 codewords of TRS coding, each row of 940 extended-byte-storage locations stores five consecutive IPE packets in respective alignment with five consecutive IPE packets in each adjacent row of 940 extended-byte-storage locations. The alignment of the IPE packets in contiguous rows of extended-byte-storage locations in the RAM used to support decoding of (255, 191) codewords of TRS coding column-by-column by the TRS decoder 95 allows the following to be done without adverse effect upon such decoding operations. A respective block of sixteen extra columns of extended-byte-storage locations is introduced into the RAM, following each block of 188 columns of extended-byte-storage locations for temporarily storing 255 IPE packets in respective rows of extended-byte-storage locations in that block. These sixteen extra columns of extended-byte-storage locations are used for storing the extended parity bytes of the (204, 188) LRS coding of the 255 IPE packets temporarily stored in respective rows of extended-byte-storage locations in the preceding block of 188 columns of extended-byte-storage locations.

Each time, after all the (255, 191) codewords of TRS coding in an FEC frame have been decoded, updated (204, 188) codewords of LRS coding are read from the RAM with an expanded number of columns of extended-byte-storage locations, provided the following conditions obtain. Ample further time remains for decoding of the TRS coding of an FEC frame, and fewer than all the (255, 191) codewords of TRS coding in a time-slice are accounted for as being correct. These updated (204, 188) codewords of LRS coding are supplied to the input port of a LRS decoder (which can be the LRS decoder 93) to be decoded and, if possible, corrected if not found already to be correct. This LRS decoder is provided capability for adjusting the extension of each byte in the (204, 188) LSR codewords in the decoding results therefrom. The output port of this LRS decoder supplies (204, 188) codewords of LRS coding with each byte accompanied by a byte extension indicative of the level of lack of confidence in that byte being correct. If the LRS decoder was capable of correcting the IPE packet, the byte extensions are zero-valued. If the LRS decoder was incapable of correcting the IPE packet, the byte extensions retain the values they had upon entry into the LRS decoder. The extended bytes of each (204, 188) LSR codeword are written back to extended-byte storage locations in the RAM to over-write their temporarily stored former values.

The operation of a DTV receiver designed for iterative-diversity reception following a change in RF channel or sub-channel is of interest. Following such a change, a DTV receiver as described supra will not have foregoing initial transmissions for iterative-diversity reception stored in its delay memory 58 or 158. Accordingly, the DTV receiver erases the contents of the delay memory 58 or 158 in bulk. The pilot and TPS carriers processor 53 or 153 will not have supplied the maximal-ratio code combiner 63 with information concerning the RMS energy of pilot carriers accompanying the foregoing initial transmissions for iterative-diversity reception. Accordingly, the DTV receiver erases the contents of delay memory within the code combiner 63 that stores such information. This erasure conditions the code combiner 63 for single-transmission reception until the delay memory therein refills with information concerning the RMS energy of pilot carriers that accompany foregoing initial transmissions for iterative-diversity reception. During this delay in the maximal-ratio code combiner 63 beginning iterative-diversity reception, the delay memory 58 fills with initial transmissions for iterative-diversity reception to be supplied with delay to the code combiner 63 when iterative-diversity reception begins.

Frequency-domain equalization, as described supra, is supplemented by adaptive time-domain equalization in some receiver designs. Variants of the specifically described systems that replace the (204, 188) RS coding of MPEG-2 compatible data packets with a slightly different sort of Reed-Solomon coding, such as the (207, 187) RS coding used in 8-VSB DTV broadcasting should be considered as functional equivalents when construing the claims which follow.

Overall system performance is affected by the choice of mapping of QAM symbol constellations in the FIG. 2 mapper 14 and in the FIG. 4 mapper 40. It is customary practice to prefer Gray mapping, in which the real and imaginary dimensions of the point lattice descriptive of a square QAM symbol constellation are defined by reflected binary codes of the type described by Frank Gray. With such Gray labeling of the lattice points, only one bit of the plural-bit labeling changes from one lattice point to the next in the point lattice defining the QAM symbol constellation. This minimizes the effects of small amounts of additive white Gaussian noise (AWGN) on the stream of bits that a DTV receiver recovers by de-mapping QAM symbol constellations. Gray mapping that minimizes the mean energy of QAM symbol constellations has been used previously, too. When log-MAP or other maximum a posteriori (MAP) turbo decoding procedures are used for decoding bitstreams recovered from the de-mapping of QAM symbol constellations, new considerations are preferably applied when choosing the labeling of the lattice points in the point lattice defining the QAM symbol constellation. Data bits are updated during turbo decoding of soft FEC coding using log-MAP or other MAP procedures, but parity bits are not. So, parity bits of the bit-wise FEC coding should be located in the more reliable portions of the 2-dimensional Gray coding.

FIG. 31 shows a point lattice that diagrams a 64 QAM symbol constellation using Gray mapping that provides low mean energy consistent with locating parity bits of bit-wise FEC coding with one-half code rate in the more reliable portions of the 2-dimensional Gray coding. The Gray labeling of the 64 QAM symbol constellation shown in FIG. 31 was designed by A. L. R. Limberg to facilitate decoding of one-half-rate FEC coding by an RSC decoder or LDPC decoder. A receiver for COFDM plural-carrier signals is apt to recover values of complex amplitude modulation that, owing to imperfect reception, depart in some degree from lattice points in the two-dimensional range of complex amplitude modulation. Ongoing departures are caused by Johnson noise arising in the atmosphere and in the receiver elements. Occasional departures are caused by burst noise, often generated by electrical equipment near the receiver. Some departure may arise from imperfect channel equalization filtering. Generally, the further bits of the soft-decision bits associated with the complex amplitude modulation actually received are determined by how far the position defined by that complex amplitude modulation departs from the boundaries of change in the hard-bit values associated with closest lattice point in the two-dimensional range of complex amplitude modulation.

The hard-decision bits in each successive set of decision bits with each lattice point in the two-dimensional range of complex amplitude modulation can be independent of the more significant bits of the in-phase coordinates and quadrature-phase coordinates of the two-dimensional QAM symbol constellation. This allows Gray mapping of QAM constellations, in which mapping procedure the set of decision bits associated with any lattice point differs by only a single bit from the set of decision bits associated with any one of the closest by lattice points in the symbol constellation. Perfect Gray mapping is possible for a square QAM constellation having an even power of two lattice points therein. That is, perfect Gray mapping is possible for 4 PSK, 16QAM, 64 QAM, 256 QAM or 1024 QAM constellations that are square. Consider the number of lattice points between change in each hard-decision bit within successive sets of decision bits sharing the same in-phase coordinates or the same quadrature-phase coordinates in a square two-dimensional QAM symbol constellation. Such numbers vary among the hard-decision bits within each set of decision bits. A. L. R. Limberg observed that the variation in this number for each hard-decision bit exhibits a well-defined pattern, when perfect or almost perfect Gray mapping is used.

Limberg's U.S. provisional patent application Ser. No. 61/626,437 filed on 27 Sep. 2011 and titled "COFDM broadcast systems employing turbo coding" proposed matching this pattern to the particular form of turbo coding of data bits that is used before mapping the FEC coding results to QAM symbol constellations. Iterative decoding in a receiver of QAM symbol constellations transmitted via COFDM plural carrier waves adjusts data bits from the QAM constellations best to conform to parity bits from the QAM constellations. These adjustments are made with the goal of maximizing overall the confidence levels of the bits in estimates that the receiver generates as to the FEC coding actually transmitted. These procedures are facilitated by proper placement of the parity bits of the FEC coding within the sets of information bits associated with respective lattice points in each QAM symbol constellation. The parity bits, which are not adjusted during iterative decoding procedures that use MAP or log-MAP decoding, are placed within each set of information bits in the bit places more likely to have high confidence levels associated with them. The data bits, which are adjusted during iterative decoding procedures that use MAP or log-MAP decoding, are placed within each set of information bits in the bit places less likely to have high confidence levels associated with them.

Figure 32:
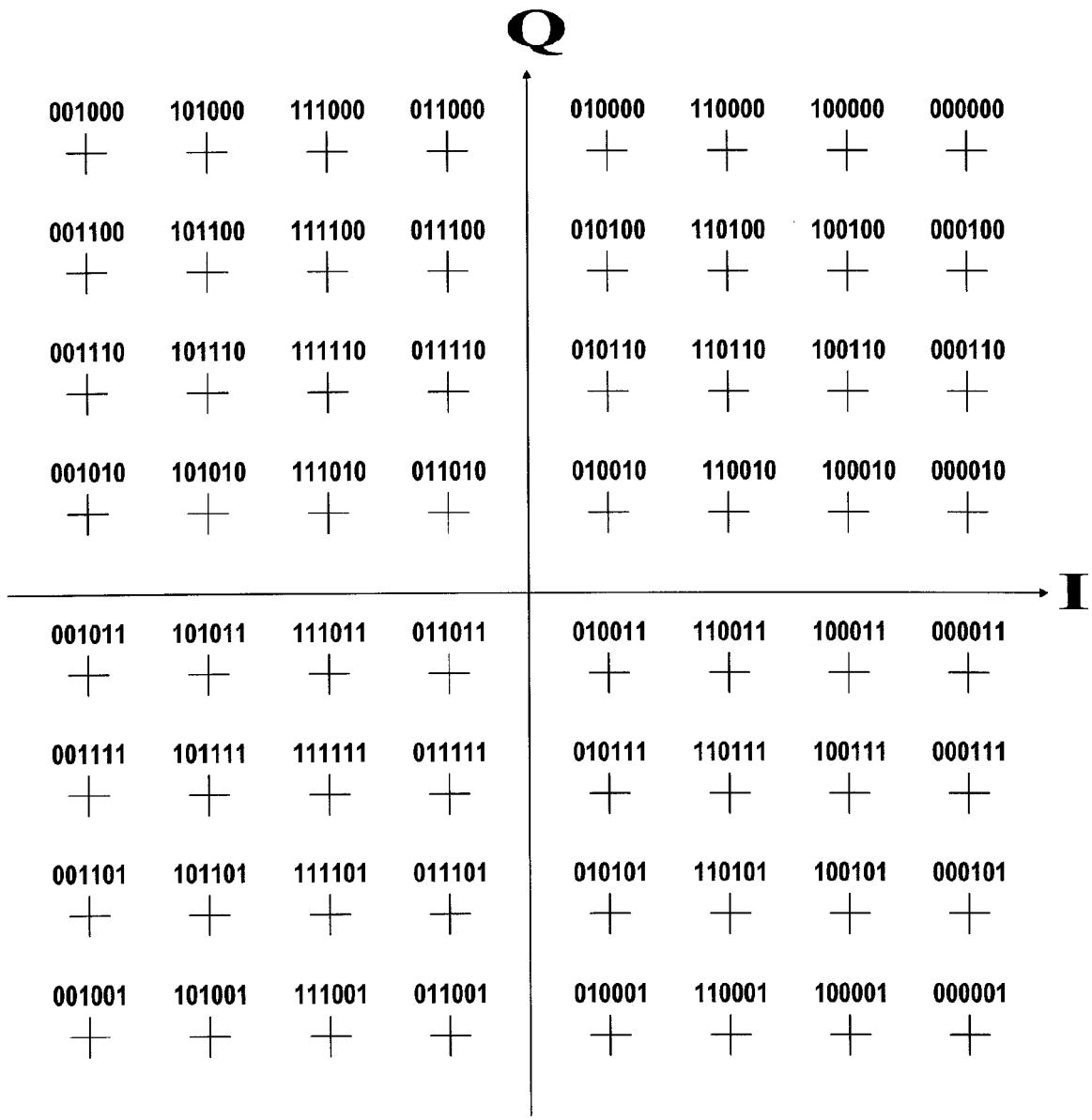

FIG. 32A shows the pattern exhibited by bits in the first bit-places of the 6-bit sequences respectively associated with the square array of sixty-four lattice points in the square 64 QAM symbol constellation map of FIG. 31. The vertical bands of ONEs are each two lattice points wide, and the vertical bands of ZEROes are each two lattice points wide except at left and right edges of the 64 QAM symbol constellation map. FIG. 32B shows the pattern exhibited by bits in the second bit-places of the 6-bit sequences respectively associated with the square array of sixty-four lattice points in the 64 QAM symbol constellation map of FIG. 31. The vertical band of ONEs is four lattice points wide, and the flanking vertical bands of ZEROes are each two lattice points wide. Decision bits in the first bit-places are more likely to be from lattice points adjoining boundaries between ONEs and ZEROes, where confidence levels are reduced, than decision bits in the second bit-places are. So, as shown in FIG. 33, the first and second bit-places are used to convey data bits and parity bits, respectively, of the one-half-rate FEC coding of individual bits.

FIG. 32C shows the pattern exhibited by bits in the third bit-places of the 6-bit sequences respectively associated with the square array of sixty-four lattice points in the 64 QAM symbol constellation map of FIG. 31. The horizontal bands of ONEs are each two lattice points deep, and the horizontal bands of ZEROes are each two lattice points deep except at top and bottom edges of the 64 QAM symbol constellation map. FIG. 32D shows the pattern exhibited by bits in the fourth bit-places of the 6-bit sequences respectively associated with the square array of sixty-four lattice points in the 64 QAM symbol constellation map of FIG. 31. The horizontal band of ONEs is four lattice points deep, and the flanking horizontal bands of ZEROes are each two lattice points deep. Decision bits in the third bit-places are more likely to be from lattice points adjoining boundaries between ONEs and ZEROes, where confidence levels are reduced, than are decision bits in the fourth bit-places. So, as shown in FIG. 33, the third and fourth bit-places are used to convey data bits and parity bits, respectively, of the one-half-rate FEC coding of individual bits.

FIG. 32E shows the pattern exhibited by bits in the fifth bit-places of the 6-bit sequences respectively associated with the square array of sixty-four lattice points in the 64 QAM symbol constellation map of FIG. 31. In this pattern a vertical band of ONEs is four lattice points wide, and a vertical band of ZEROes is also four lattice points wide. FIG. 32F shows the pattern exhibited by bits in the sixth bit-places of the 6-bit sequences respectively associated with the square array of sixty-four lattice points in the 64 QAM symbol constellation map of FIG. 31. In this pattern a horizontal band of ONEs is four lattice points deep, and a horizontal band of ZEROes is also four lattice points deep. FIG. 33 shows that the fifth and sixth bit-places are used to convey data bits and parity bits, respectively, of the one-half-rate FEC coding of individual bits. The selection is arbitrary, and a 64 QAM symbol constellation map in which the bits associated with the fifth and sixth bit places are interchanged is an alternative as good as that shown in FIG. 31.

In variants of the 64 QAM symbol constellation map shown in FIG. 31, parity bits patterned per FIG. 32E are paired with data bits patterned per FIG. 32A, and parity bits patterned per FIG. 32F are paired with data bits patterned per FIG. 32C. If the first and third bits of the Gray labeling are still data bits patterned as shown in FIGS. 34A and 34C respectively, the second and fourth bits are then parity bits patterned as shown in FIGS. 34E and 34F respectively. The fifth bits of the Gray labeling are data bits patterned as shown in one of the FIGS. 34B and 34D, and the sixth bits of the Gray labeling are parity bits patterned as shown in the other of the FIGS. 34B and 34D.

FIG. 34 shows a point lattice that diagrams a square 64 QAM symbol constellation using Gray mapping that provides low mean energy, consistent with locating parity bits of bit-wise FEC coding with one-third code rate in the more reliable portions of the 2-dimensional Gray coding. The Gray labeling of the 64 QAM symbol constellation shown in FIG. 34 was designed by A. L. R. Limberg to facilitate decoding of one-third-rate FEC coding by PCCC decoders, by SCCC decoders, or by decoders for product coding.

Figure 35:
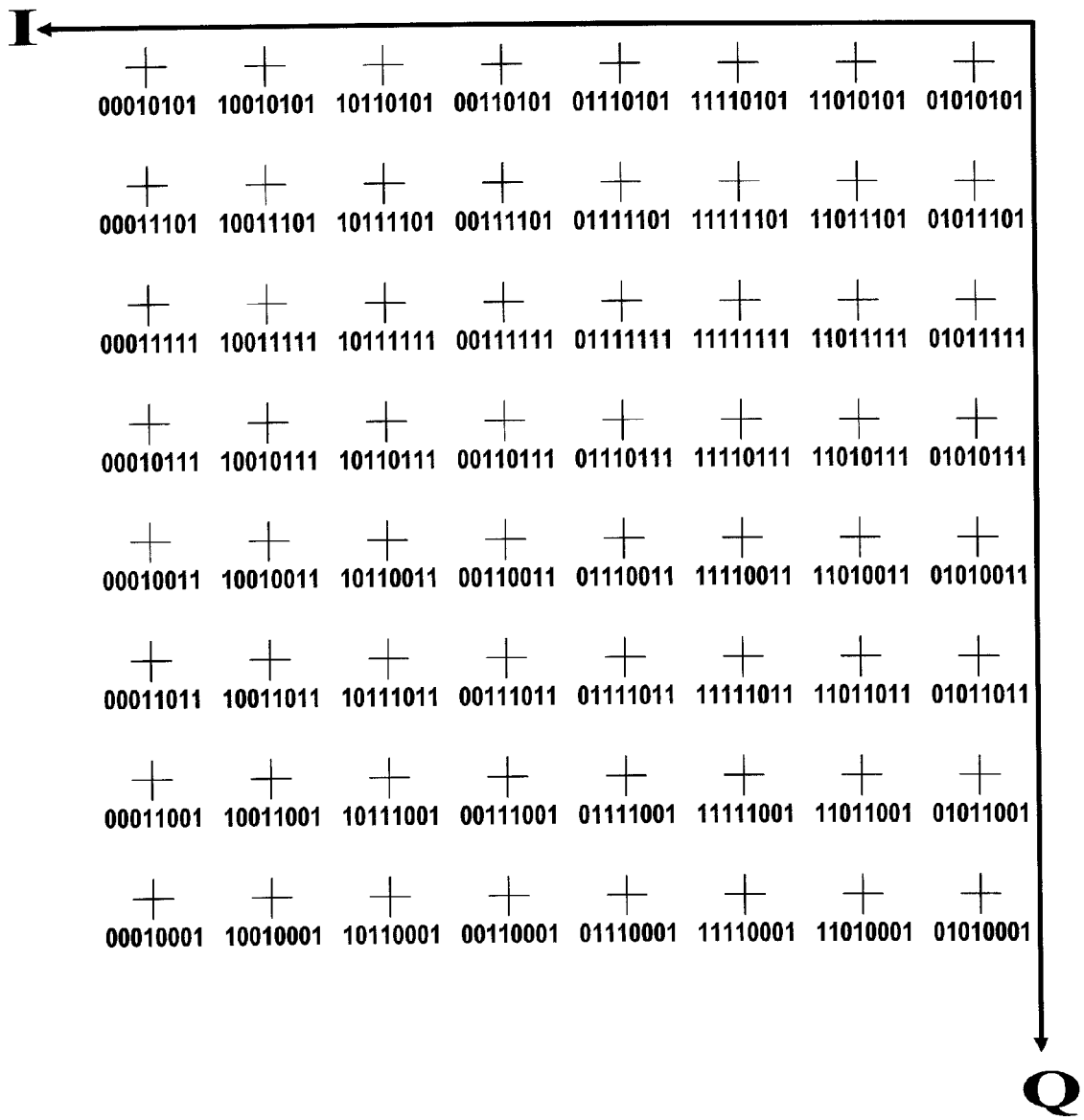

FIG. 35A shows the pattern exhibited by bits in the first bit-places of the 6-bit sequences respectively associated with the square array of sixty-four lattice points in the 64 QAM symbol constellation map of FIG. 34. The vertical bands of ONEs are each two lattice points wide, and the vertical bands of ZEROes are each two lattice points wide except at left and right edges of the 64 QAM symbol constellation map. FIG. 35B shows the pattern exhibited by bits in the second bit-places of the 6-bit sequences respectively associated with the square array of sixty-four lattice points in the 64 QAM symbol constellation map of FIG. 34. The vertical band of ONEs is four lattice points wide, and the flanking vertical bands of ZEROes are each two lattice points wide. FIG. 35C shows the pattern exhibited by bits in the third bit-places of the 6-bit sequences respectively associated with the square array of sixty-four lattice points in the 64 QAM symbol constellation map of FIG. 34. The vertical band of ONEs is four lattice points wide, and the vertical band of ZEROes is four lattice points wide.

FIG. 35D shows the pattern exhibited by bits in the fourth bit-places of the 6-bit sequences respectively associated with the square array of sixty-four lattice points in the 64 QAM symbol constellation map of FIG. 34. The horizontal bands of ONEs are each two lattice points deep, and the horizontal bands of ZEROes are each two lattice points deep except at top and bottom edges of the 64 QAM symbol constellation map. FIG. 35E shows the pattern exhibited by bits in the fifth bit-places of the 6-bit sequences respectively associated with the square array of sixty-four lattice points in the 64 QAM symbol constellation map of FIG. 34. The horizontal band of ONEs is four lattice points deep, and the flanking horizontal bands of ZEROes are each two lattice points deep. FIG. 35F shows the pattern exhibited by bits in the sixth bit-places of the 6-bit sequences respectively associated with the square array of sixty-four lattice points in the 64 QAM symbol constellation map of FIG. 34. The horizontal band of ONEs is four lattice points deep, and the horizontal band of ZEROes is four lattice points deep.

The decision bits in the first and fourth bit-places are more likely to have low confidence levels associated with them than the decision bits in the other bit-places. This is because the decision bits in the first and fourth bit-places are more likely to be from lattice points adjoining boundaries between ONEs and ZEROes, where confidence levels are reduced. So, as shown in FIG. 36, the first and fourth bit-places are used to convey earlier and later data bits of one-third-rate turbo coding. The second and fifth bit-places are used to convey earlier and later ones of a first set of parity bits of the one-third-rate turbo coding. The third and sixth bit-places are used to convey earlier and later ones of a second set of parity bits of the one-third-rate turbo coding. There is some preference for deriving the first set of parity bits from the data bits before their interleaving in connection with turbo coding, and for deriving the second set of parity bits from the data bits after their interleaving in connection with turbo coding. The integrated circuitry in receivers appears slightly simpler to implement.

FIGS. 37A, 37B, 37C and 37D illustrate the four quadrants of a representative square 256 QAM symbol constellation map that the constellation mapper 14 in the portion of a COFDM transmitter shown in FIG. 2 preferably uses with bit-wise FEC coding having one-half code rate. The eight decision bits associated with each lattice point are considered to be ordinally numbered first through eighth, scanning from left to right. As shown in FIG. 38 the odd-numbered decision bits are used to convey successive data bits of the one-half-rate bit-wise FEC coding. The even-numbered decision bits are used to convey successive parity bits of the one-half-rate bit-wise FEC coding. The odd-numbered decision bits are more likely than the even-numbered decision bits to have low confidence levels associated with them, which is the reason for using the odd-numbered bit places for conveying data bits. The four pairs of bits in each of the Gray code labels associated with respective lattice points in the 256 QAM symbol constellation shown in FIGS. 37A, 37B, 37C and 37D have a particular order. This order can be permuted in alternative 256 QAM symbol constellations each of which provides substantially the same receiver performance as the 256 QAM symbol constellation shown in FIGS. 37A, 37B, 37C and 37D.

The following pattern is exhibited by bits in the first bit-places of the 8-bit sequences respectively associated with the square point lattice in the 256 QAM symbol constellation map of FIGS. 37A, 37B, 37C and 37D. The vertical bands of ONEs are each two lattice points wide, and the vertical bands of ZEROes are each two lattice points wide except at left and right edges of the complete 256 QAM symbol constellation map. The following pattern is exhibited by bits in the second bit-places of the 8-bit sequences respectively associated with the square array of 256 lattice points in the complete 256 QAM symbol constellation map. The two vertical bands of ONEs are each four lattice points wide, and the two vertical bands of ZEROes are each four lattice points wide. The boundaries between ONEs and ZEROes in the patterns of first, second, third, and fourth bit-places do not overlap in the Gray mapping shown in FIGS. 37A, 37B, 37C and 37D. Decision bits in the first bit-places are more likely to be from lattice points adjoining boundaries between ONEs and ZEROes, where confidence levels are reduced, than decision bits in the second bit-places are. So, as shown in FIG. 38, the first and second bit-places are used to convey data bits and parity bits, respectively, of the one-half-rate FEC coding of individual bits.

The following pattern is exhibited by bits in the third bit-places of the 8-bit sequences respectively associated with the square point lattice in the 256 QAM symbol constellation map of FIGS. 37A, 37B, 37C and 37D. The vertical bands of ONEs are each four lattice points wide, and the vertical bands of ZEROes are each four lattice points wide except at left and right edges of the complete 256 QAM symbol constellation map where they are only two lattice points wide. The following pattern is exhibited by bits in the fourth bit-places of the 8-bit sequences respectively associated with the square array of 256 lattice points in the complete 256 QAM symbol constellation map. The vertical band of ONEs is eight lattice points wide, and the vertical band of ZEROes is eight lattice points wide. Decision bits in the third bit-places are more likely to be from lattice points adjoining boundaries between ONEs and ZEROes, where confidence levels are reduced, than are decision bits in the fourth bit-places. So, as shown in FIG. 38, the third and fourth bit-places are used to convey data bits and parity bits, respectively, of the one-half-rate FEC coding of individual bits.

The following pattern is exhibited by bits in the fifth bit-places of the 8-bit sequences respectively associated with the point lattice in the 256 QAM symbol constellation map of FIGS. 37A, 37B, 37C and 37D. The horizontal bands of ONEs are each two lattice points deep, and the horizontal bands of ZEROes are each two lattice points deep except at top and bottom edges of the 256 QAM symbol constellation map. The following pattern is exhibited by bits in the sixth bit-places of the 8-bit sequences respectively associated with the point lattice in the 256 QAM symbol constellation map of FIGS. 37A, 37B, 37C and 37D. The horizontal bands of ONEs are each four lattice points deep, and the horizontal bands of ZEROes are each four lattice points deep. The boundaries between ONEs and ZEROes in the patterns of fifth, sixth, seventh, and eighth bit-places do not overlap in the Gray mapping shown in FIGS. 37A, 37B, 37C and 37D. Decision bits in the fifth bit-places are more likely to be from lattice points adjoining boundaries between ONEs and ZEROes, where confidence levels are reduced, than are decision bits in the sixth bit-places. So, as shown in FIG. 38, the fifth and sixth bit-places are used to convey data bits and parity bits, respectively, of the one-half-rate FEC coding of individual bits.

The following pattern is exhibited by bits in the seventh bit-places of the 8-bit sequences respectively associated with the point lattice in the 256 QAM symbol constellation map of FIGS. 37A, 37B, 37C and 37D. In this pattern horizontal bands of ONEs are each four lattice points deep, and horizontal bands of ZEROes are also four lattice points deep, except at top and right edges of the complete 256 QAM symbol constellation map where they are only two lattice points deep. The following pattern is exhibited by bits in the eighth bit-places of the 8-bit sequences respectively associated with the point lattice in the 256 QAM symbol constellation map of FIGS. 37A, 37B, 37C and 37D. In this pattern a horizontal band of ONEs is eight lattice points deep, and a horizontal band of ZEROes is also eight lattice points deep. Decision bits in the seventh bit-places are more likely to be from lattice points adjoining boundaries between ONEs and ZEROes, where confidence levels are reduced, than decision bits in the eighth bit-places are. So, as shown in FIG. 38, the seventh and eighth bit-places are used to convey data bits and parity bits, respectively, of the one-half-rate FEC coding of individual bits.

FIGS. 40A, 40B, 40C and 40D illustrate the four quadrants of a representative cruciform 512 QAM symbol constellation map that the constellation mapper 14 in the portion of a COFDM transmitter shown in FIG. 2 preferably uses with bit-wise FEC coding having one-third code rate. The nine decision bits associated with each lattice point are considered to be ordinally numbered first through ninth, scanning from left to right. As shown in FIG. 39 the first, fourth and seventh decision bits are used to convey successive data bits of one-third-rate turbo coding. The second, fifth and eighth decision bits are used to convey successive ones of a first set of parity bits of the one-third-rate turbo coding. The third, sixth and ninth decision bits are used to convey successive ones of a second set of parity bits of the one-third-rate turbo coding. The first and fourth decision bits are more likely than the other decision bits to have low confidence levels associated with them, which is the reason for using the first and fourth bit places for conveying data bits.

FIG. 41 is an assembly drawing, showing how each of the four quadrants of the cruciform 512 QAM symbol constellation map is disposed with respect to the others. The 512 QAM symbol constellation map can be analyzed as being composed of thirty-two 16-point square arrays of lattice points. Each of these 16-point square arrays uses a unique set of third, sixth, seventh, eighth and ninth bits within the sequences of nine decision bits associated with respective lattice points within that 16-point square array. In FIG. 41 each of these thirty-two regions within the cruciform 512 QAM symbol constellation map is identified by the unique set of third, sixth, seventh, eighth and ninth bits associated with respective lattice points within that region.

The 5-bit number for each region is succeeded by a letter A, B, C or D. The letter A is an indication that first, second, fourth and fifth decision bits of 9-bit sequences of turbo coding map to the sixteen lattice points in that region per FIG. 42A. The letter B is an indication that first, second, fourth and fifth decision bits of 9-bit sequences of turbo coding map to the sixteen lattice points in that region per FIG. 42B. The letter C is an indication that first, second, fourth and fifth decision bits of 9-bit sequences of turbo coding map to the sixteen lattice points in that region per FIG. 42C. The letter D is an indication that first, second, fourth and fifth decision bits of 9-bit sequences of turbo coding map to the sixteen lattice points in that region per FIG. 42D.

The maintenance of Gray mapping in most of the cruciform 512 QAM symbol constellation map is furthered by the tiling pattern in which regions per FIGS. 42A, 42B, 42C and 42D are arranged respective to each other. The tiling pattern is such that the first, second, fourth and fifth decision bits associated with a lattice point close to the edge of a region are the same as the first, second, fourth and fifth decision bits associated with the adjoining lattice point in the next region. So, the difference between the 9-bit sequences of turbo coding associated with such a pair of adjoining lattice points is determined by bits in the third, sixth, seventh, eighth and ninth bit-places.

Sixteen of the thirty-two regions are arrayed as a square central core of the cruciform 512 QAM symbol constellation map. Another four of the thirty-two regions are arrayed in a rectangular tab adjoining the top edge of the square central core of the cruciform 512 QAM symbol constellation map. Yet another four of the thirty-two regions are arrayed in a rectangular tab adjoining the bottom edge of the square central core of the cruciform 512 QAM symbol constellation map. Gray mapping is maintained throughout these twenty-four contiguous regions. Four of the remaining eight regions are arrayed in a rectangular tab adjoining the left edge of the square central core of the cruciform 512 QAM symbol constellation map to form a left arm thereof. The other four are arrayed in a rectangular tab adjoining the right edge of the square central core of the cruciform 512 QAM symbol constellation map to form a right arm thereof. Gray mapping is maintained throughout the four regions arrayed in the rectangular tab that forms the left arm of the cruciform 512 QAM symbol constellation map. Gray mapping is maintained throughout the four regions arrayed in the rectangular tab that forms a right arm of the cruciform 512 QAM symbol constellation map. Adjoining lattice points, one of which is disposed within the square central core of the cruciform 512 QAM symbol constellation map and the other of which is disposed within either the left or the right arm of the cruciform map, will differ in two bit places, rather than just one.

Perfect Gray mapping, in which every pair of adjoining lattice points differ in only a single bit place, appears not to be possible in a cruciform 512 QAM symbol constellation map. Several cruciform 512 QAM symbol constellation maps which depart from perfect Gray mapping only insofar as 32 pairs of adjoining lattice points differing in two bit places are possible, besides the map shown in FIGS. 42A, 42B, 42C, 42D and 41. 512 QAM symbol constellation maps which depart from perfect Gray mapping only insofar as 16 pairs of adjoining lattice points differing in three bit places are possible, too.

FIG. 43A shows the pattern exhibited by bits in the first bit-places of 9-bit sequences of turbo coding in each of the FIG. 42A, FIG. 42B, FIG. 42C and FIG. 42D maps of square arrays of sixteen lattice points. This pattern repeats in vertical bands of ONEs interleaved with vertical bands of ZEROes in the complete cruciform 512 QAM symbol constellation map. The vertical bands of ONEs are each two lattice points wide, and the vertical bands of ZEROes are each two lattice points wide except at left and right edges of the complete 512 QAM symbol constellation map. The relatively high frequency of change between ONEs and ZEROes in the vertical direction tends to reduce confidence levels of bits assigned to the first bit-places compared to confidence levels of bits assigned to the other bit-places except the fourth. For this reason, the data bits in the turbo decoding, which will be subjected to adjustment during turbo decoding procedures, are assigned in part to the first bit-places in the 9-bit sequences of turbo coding.

FIG. 43B shows the pattern exhibited by bits in the second bit-places of 9-bit sequences of turbo coding in each of the FIG. 42A, FIG. 42B, FIG. 42C and FIG. 42D maps of square arrays of sixteen lattice points. This pattern repeats in vertical bands of ONEs interleaved with vertical bands of ZEROes in the complete cruciform 512 QAM symbol constellation map. The vertical bands of ONEs are each four lattice points wide, and the vertical bands of ZEROes are each four lattice points wide except at left and right edges of the complete 512 QAM symbol constellation map. The frequency of change between ONEs and ZEROes in the vertical direction is half that for first-bit-place bits in the 9-bit sequences of turbo coding. This frequency of change between ONEs and ZEROes in the vertical direction is higher than for third-bit-place, sixth-bit-place, seventh-bit-place, eighth-bit-place and ninth-bit-place bits in the 9-bit sequences of turbo coding.

However, ones of the first set of parity bits of turbo coding are assigned to the second bit-places of 9-bit sequences of turbo coding. The pattern of ONEs and ZEROes in the second bit-places overlaps the pattern of ONEs and ZEROes in the first bit-places in such way that transitions between ONEs and ZEROes in the two patterns interleave. Accordingly, confidence levels in the first set of parity bits will be higher when confidence levels in the data bits are low, and vice versa. This is a desirable relationship as between the data bits and the first set of parity bits, presuming particularly that the second set of parity bits and not the first set are generated from the data bits as subjected to turbo-code interleaving.

FIG. 43C shows the pattern exhibited by bits in the third bit-places of 9-bit sequences of turbo coding in the complete cruciform 512 QAM symbol constellation map. Ones of the second set of parity bits of turbo coding are assigned to the third bit-places of the 9-bit sequences of turbo coding. Boundaries between ONEs and ZEROes in these third bit-places are mostly vertical. When the confidence levels of bits in these third bit-places are low near such vertical boundaries, which are at the edges of square arrays of sixteen lattice points, the confidence levels of bits in the first and second bit-places is high. The confidence levels of bits in these third bit-places become high within these square arrays, where the confidence levels of bits in the first and second bit-places are apt to dip low.

FIG. 43D shows the pattern exhibited by bits in the fourth bit-places of 9-bit sequences of turbo coding in each of the FIG. 42A, FIG. 42B, FIG. 42C and FIG. 42D maps of square arrays of sixteen lattice points. This pattern repeats in horizontal bands of ONEs interleaved with horizontal bands of ZEROes in the complete cruciform 512 QAM symbol constellation map. The horizontal bands of ONEs are each two lattice points tall, and the horizontal bands of ZEROes are each two lattice points tall except at top and bottom edges of the complete 512 QAM symbol constellation map. The relatively high frequency of change between ONEs and ZEROes in the horizontal direction tends to reduce confidence levels of bits assigned to the fourth bit-places compared to confidence levels of bits assigned to the other bit-places except the first. For this reason, the data bits in the turbo decoding, which will be subjected to adjustment during turbo decoding procedures, are assigned in further part to the fourth bit-places in the 9-bit sequences of turbo coding.

FIG. 43E shows the pattern exhibited by bits in the fifth bit-places of 9-bit sequences of turbo coding in each of the FIG. 42A, FIG. 42B, FIG. 42C and FIG. 42D maps of square arrays of sixteen lattice points. This pattern repeats in horizontal bands of ONEs interleaved with horizontal bands of ZEROes in the complete cruciform 512 QAM symbol constellation map. The horizontal bands of ONEs are each four lattice points tall, and the vertical bands of ZEROes are each four lattice points tall except at top and bottom edges of the complete 512 QAM symbol constellation map. The frequency of change between ONEs and ZEROes in the horizontal direction is half that for fourth-bit-place bits in the 9-bit sequences of turbo coding. This frequency of change between ONEs and ZEROes in the vertical direction is higher than for third-bit-place, sixth-bit-place, seventh-bit-place, eighth-bit-place and ninth-bit-place bits in the 9-bit sequences of turbo coding.

However, ones of the first set of parity bits of turbo coding are assigned in further part to the fifth bit-places of 9-bit sequences of turbo coding. The pattern of ONEs and ZEROes in the fifth bit-places overlaps the pattern of ONEs and ZEROes in the fourth bit-places in such way that transitions between ONEs and ZEROes in the two patterns interleave. Accordingly, confidence levels in the first set of parity bits will be higher when confidence levels in the data bits are low, and vice versa. This is a desirable relationship as between the data bits and the first set of parity bits, presuming particularly that the second set of parity bits and not the first set are generated from the data bits as subjected to turbo-code interleaving.

FIG. 43F shows the pattern exhibited by bits in the sixth bit-places of 9-bit sequences of turbo coding in the complete cruciform 512 QAM symbol constellation map. Further ones of the second set of parity bits of turbo coding are assigned to the sixth bit-places of the 9-bit sequences of turbo coding. Boundaries between ONEs and ZEROes in these sixth bit-places are mostly horizontal. When the confidence levels of bits in these sixth bit-places are low near such horizontal boundaries, which are at the edges of square arrays of sixteen lattice points, the confidence levels of bits in the fourth and fifth bit-places is high. The confidence levels of bits in these sixth bit-places become high within these square arrays, where the confidence levels of bits in the fourth and fifth bit-places are apt to dip low.

FIG. 43G shows the pattern exhibited by bits in the sixth bit-places of 9-bit sequences of turbo coding in the complete cruciform 512 QAM symbol constellation map. The bits of this pattern were chosen to convey data, partly because this pattern of all the patterns depicted in FIGS. 43A, 43B, 43C, 43D, 43E, 43F, 43G, 43H and 43I is the only one not displaying a noticeable degree of symmetry with one of the other patterns. This pattern has two vertical boundaries between ONEs and ZEROes. It also has two horizontal boundaries between ONEs and ZEROes.

FIG. 43H shows the pattern exhibited by bits in the eighth bit-places of 9-bit sequences of turbo coding in the complete cruciform 512 QAM symbol constellation map, which pattern has one horizontal boundary between ONEs and ZEROes. FIG. 43I shows the pattern exhibited by bits in the ninth bit-places of 9-bit sequences of turbo coding in the complete cruciform 512 QAM symbol constellation map, which pattern has one vertical boundary between ONEs and ZEROes. Arbitrary choices were made to use the eighth bit-places of 9-bit sequences of turbo coding to convey ones of the first set of parity bits and to use the ninth bit-places of 9-bit sequences of turbo coding to convey ones of the second set of parity bits. The opposite choices would also result in an acceptable 512 QAM symbol constellation map.

QAM symbol constellation mappers, such as mapper 14 shown in FIG. 2 and mapper 40 shown in FIG. 4, customarily include inner interleaving that permutes the temporal order of groups of bits before coding them into successive QAM symbols for constellation mapping. The bits should be grouped for such inner interleaving in such way as to maintain the nature of the bits at each lattice point of the QAM symbol constellations as shown in FIG. 33, FIG. 36, FIG. 38 or FIG. 39. If the QAM symbol constellation mapper 14 shown in FIG. 2 includes inner interleaving, the de-mapper 55 of QAM constellations shown in FIG. 11 will include inner de-interleaving of the groups of bits decoded from successive QAM symbol constellations. If the 64 QAM symbol constellation mapper 40 shown in FIG. 4 includes inner interleaving, the de-mapper 155 of 64 QAM constellations shown in FIG. 14 will include inner de-interleaving of the groups of bits decoded from successive 64 QAM symbol constellations.

Byte interleaving of randomized data is performed somewhat differently in variants of the system of COFDM digital television broadcasting described supra, which variant systems furnish alternative embodiments of aspects of the invention. In one such variant the response of the data randomizer 3 in the FIG. 1 portion of a DTV transmitter is byte de-interleaved before the LRS encoder 7 to complement byte interleaving by the convolutional byte interleaver 8 in the succeeding FIG. 2 portion of that DTV transmitter. In another such variant the response of the IP encapsulator 32 in the FIG. 3 portion of a DTV transmitter is byte de-interleaved before the LRS encoder 33 to complement byte interleaving by the convolutional byte interleaver 34 in the succeeding FIG. 2 portion of that DTV transmitter. In these two variant DTV broadcasting systems the (204, 188) RS codewords are subsequently provided "coded" or "implied" convolutional byte interleaving in which the randomized IP data appear in their original order, possibly with bit-complementation, in the datastream to be bit-wise FEC coded. In DTV receivers for these two variant DTV broadcasting systems decoding of the (204, 188) RS codewords has to be followed by convolutional byte interleaving to restore randomized IP data to their original order for further processing. In these two variant DTV broadcasting systems, burst noise that corrupts successive bytes in the response of the decoder of bit-wise FEC coding is not dispersed through as many IP packets. This is advantageous in that more correct IP packets may be corrected if the decoding of RS codewords occasionally fails to regenerate correct randomized IP data.

The invention is described in a preferred context of COFDM digital television broadcasting, but the FEC coding of bit-complementary data streams can afford improvement for other forms of digital television broadcasting, such as 8-VSB digital television broadcasting, insofar as avoiding the need for de-interleaving decoded data bits in turbo decoding procedures employed within receivers.

Optimal Gray mapping and close-to-Gray mapping of bit-wise FEC coding at one-half and one-third code rates to QAM symbol constellations are specifically described supra. However, bit-wise FEC coding can be performed at other code rates, such as the ⅞, ⅚, ¾ and ⅔ code rates that together with ½ code rate are the valid code rates for DVB DTV broadcasting. Transmissions for iterative-diversity reception will halve the overall code rate for bit-wise FEC coding, of course.

Frequency-domain equalization, as described supra, is supplemented by adaptive time-domain equalization in some receiver designs. Variants of the specifically described systems that replace the (204, 188) RS coding of MPEG-2 compatible data packets with a slightly different sort of Reed-Solomon coding, such as the (207, 187) RS coding used in 8-VSB DTV broadcasting should be considered as functional equivalents when construing the claims that follow.

Provisional U.S. Pat. App. Ser. No. 61/520,532 filed 11 Jun. 2011, provisional U.S. Pat. App. Ser. No. 61/629,369 filed 17 Nov. 2011, and provisional U.S. Pat. App. Ser. No. 61/631,834 filed 12 Jan. 2012 are incorporated herein by reference, particularly for their showing of arrangements for randomizing data in the transmitter that are alternative to preferred arrangements shown in FIGS. 1, 3, 8 and 10 hereof.

These alternative arrangements use a respective data randomizer for each of the services to be transmitted. These various arrangements for randomizing data in the transmitter should be considered as being functional equivalents when construing the claims that follow. Provisional U.S. Pat. App. Ser. No. 61/520,532 is incorporated herein by reference for its showing also of arrangements for generating bit-complementary bitstreams for parallel concatenated coding alternative to those disclosed herein. When construing the claims that follow, these alternative arrangements for generating bit-complementary bitstreams for parallel concatenated coding should be considered as being functional equivalents to preferred arrangements disclosed herein.

It will be apparent to persons skilled in the art that various other modifications and variations can be made in the specifically described apparatus without departing from the spirit or scope of the invention. Accordingly, it is intended that these modifications and variations of the specifically described apparatus be considered to result in further embodiments of the invention and to be included within the scope of the appended claims and their equivalents.

Moreover, while the invention has been described in the particular context of DTV signals being broadcast for iterative-diversity reception by transmitting initial-transmission and final-transmission components a few seconds apart, the parallel concatenated FEC coding techniques disclosed in this specification can have broader application. Parallel concatenated FEC coding of ONEs' complementary bit streams may be used to avoid the need for data-bit de-interleavers in digital signal receivers in applications where information bits are transmitted just once together with two sets of parity bits, rather than twice together with two sets of parity bits, for example.

In the appended claims, the word "said" rather than the word "the" is used to indicate the existence of an antecedent basis for a term being provided earlier in the claims. The word "the" is used for purposes other than to indicate the existence of an antecedent basis for a term having being provided earlier in the claims, the usage of the word "the" for other purposes being consistent with customary grammar in the American English language.

What is claimed is:

1. Transmitter apparatus for a digital broadcasting system, said transmitter apparatus comprising:
   a source of successive time-slices of first digital data alternating with successive time-slices of second digital data that are bit-complemented repeats of respective ones of said successive time-slices of said first digital data as delayed by a prescribed delay interval longer than several ones of said time-slices, each of said time-slices composed of at least a few thousands of serial bits;
   apparatus for forward-error-correction (FEC) coding successive bits of said successive time-slices of first digital data alternating with successive time-slices of second digital data, thus to generate bit-wise forward-error-correction coding with a reduced code rate;
   a modulation symbol constellation mapper for mapping consecutive groups of bits of said bit-wise forward-error-correction coding to respective ones of successive modulation symbol constellations and
   apparatus for transmitting a radio-frequency digital broadcasting signal modulated in accordance with said successive modulation symbol constellations.

2. Transmitter apparatus as set forth in claim 1, wherein said apparatus for FEC coding is configured to perform recursive systematic convolutional (RSC) coding of successive bits of said successive time-slices of first digital data alternating with successive time-slices of second digital data, thus to generate said bit-wise forward-error-correction coding.

3. Transmitter apparatus as set forth in claim 2, wherein said modulation symbol constellation mapper is configured for mapping said consecutive groups of bits of said bit-wise forward-error-correction coding to quadrature-amplitude-modulation (QAM) symbol constellations, each of said QAM symbol constellations having a prescribed number of lattice points therein each having its own respective labeling, and wherein said apparatus for transmitting a radio-frequency digital broadcasting signal modulated in accordance with said successive modulation symbol constellations comprises:

a OFDM modulator for orthogonal frequency-division multiplexing complex samples of plural carrier waves in each of successive OFDM windows responsive to respective OFDM symbol blocks supplied thereto;

a parser of said complex samples descriptive of QAM symbols from said modulation symbol constellation mapper into effective portions of successive ones of said OFDM symbol blocks supplied to said first OFDM modulator;

a pilot-carrier-insertion unit for completing said OFDM symbol blocks supplied to said OFDM modulator, by inserting complex samples descriptive of unmodulated pilot carrier waves and of carrier waves modulated by Transmission Parameters Signaling (TPS);

a guard interval and cyclic prefix insertion unit for prefacing said complex symbols of said plural carrier waves in each of said successive OFDM windows employed by said OFDM modulator with complex symbols identical to those in a concluding portion of the same OFDM window, thereby to generate a respective one of a first succession of extended OFDM windows; and a digital-to-analog converter for converting said first succession of extended OFDM windows to an analog signal.

4. Transmitter apparatus as set forth in claim 1, wherein said apparatus for FEC coding is configured to perform low-density parity-check (LDPC) coding of successive bits of said successive time-slices of first digital data alternating with successive time-slices of second digital data, thus to generate said bit-wise forward-error-correction coding.

5. Transmitter apparatus as set forth in claim 4, wherein said modulation symbol constellation mapper is configured for mapping said consecutive groups of bits of said bit-wise forward-error-correction coding to quadrature-amplitude-modulation (QAM) symbol constellations, each of said QAM symbol constellations having a prescribed number of lattice points therein each having its own respective labeling, and wherein said apparatus for transmitting a radio-frequency digital broadcasting signal modulated in accordance with said successive modulation symbol constellations comprises:

a OFDM modulator for orthogonal frequency-division multiplexing complex samples of plural carrier waves in each of successive OFDM windows responsive to respective OFDM symbol blocks supplied thereto;

a parser of said complex samples descriptive of QAM symbols from said modulation symbol constellation mapper into effective portions of successive ones of said OFDM symbol blocks supplied to said first OFDM modulator;

a pilot-carrier-insertion unit for completing said OFDM symbol blocks supplied to said OFDM modulator, by inserting complex samples descriptive of unmodulated pilot carrier waves and of carrier waves modulated by Transmission Parameters Signaling (TPS);

a guard interval and cyclic prefix insertion unit for prefacing said complex symbols of said plural carrier waves in each of said successive OFDM windows employed by said OFDM modulator with complex symbols identical to those in a concluding portion of the same OFDM window, thereby to generate a respective one of a first succession of extended OFDM windows; and a digital-to-analog converter for converting said first succession of extended OFDM windows to an analog signal.

6. Transmitter apparatus as set forth in claim 1, wherein said source of successive time-slices of first digital data alternating with successive time-slices of second digital data comprises:

a respective memory associated with each of a plurality of timed-sliced services scheduled for reception by stationary receivers for digital broadcasting signals, each said memory connected for temporarily storing data for the timed-sliced service with which it is associated, temporarily stored data being read from each said memory an initial time to provide a basis for one of said time-slices of said first digital data, temporarily stored data being read from each said memory being read from a final time to provide a basis for a respective one of said time-slices of said second digital data;

a data randomizer for randomizing packets of data read from each said memory;

an encoder for Reed-Solomon coding successive packets of randomized data bits provided as said basis for one of said time-slices of said first digital data or said basis for a respective one of said time-slices of said second digital data, thus to generate successive respective Reed-Solomon codewords each composed of a prescribed number of respective bytes;

a convolutional byte interleaver connected for interleaving said respective bytes of said successive Reed-Solomon codewords and supplying a succession of byte-interleaved Reed-Solomon codewords;

a logic inverter connected for complementing the bits of said succession of byte-interleaved Reed-Solomon codewords to generate a succession of bit-complemented byte-interleaved Reed-Solomon codewords; and a time-slice interleaver for selectively reproducing said time-slices of said first digital data from said succession of bit-complemented byte-interleaved Reed-Solomon codewords and for selectively reproducing said time-slices of said second digital data from said succession of byte-interleaved Reed-Solomon codewords, said time-slice interleaver thus generating a response therefrom supplied as input signal to said apparatus for forward-error-correction (FEC) coding successive bits of said successive time-slices of first digital data alternating with successive time-slices of second digital data.

7. Transmitter apparatus as set forth in claim 1, wherein said source of successive time-slices of first digital data alternating with successive time-slices of second digital data comprises:

a respective memory associated with each of a plurality of timed-sliced services scheduled for reception by stationary receivers for digital broadcasting signals, each said memory connected for temporarily storing data for the timed-sliced service with which it is associated, temporarily stored data being read from each said memory an initial time to provide a basis for one of said time-slices of said first digital data, temporarily stored data being read from each said memory being read from a final time to provide a basis for a respective one of said time-slices of said second digital data;

a data randomizer for randomizing data read from each said memory;

an encoder for transverse Reed-Solomon coding said randomized data bits provided as said basis for one of said time-slices of said first digital data or said basis for a respective one of said time-slices of said second digital data;

apparatus for encapsulating the results of said transverse Reed-Solomon coding in successive uniform-length data packets;

an encoder for Reed-Solomon coding said successive uniform-length data packets, thus to generate successive respective lateral Reed-Solomon codewords each composed of a prescribed number of respective bytes;

a convolutional byte interleaver connected for interleaving said respective bytes of said successive lateral Reed-Solomon codewords and supplying a succession of byte-interleaved lateral Reed-Solomon codewords;

a logic inverter connected for complementing the bits of said succession of byte-interleaved lateral Reed-Solomon codewords to generate a succession of bit-complemented byte-interleaved lateral Reed-Solomon codewords; and a time-slice interleaver for selectively reproducing said time-slices of said first digital data from said succession of bit-complemented byte-interleaved lateral Reed-Solomon codewords and for selectively reproducing said time-slices of said second digital data from said succession of byte-interleaved lateral Reed-Solomon codewords, said time-slice interleaver thus generating a response therefrom supplied as input signal to said apparatus for forward-error-correction (FEC) coding successive bits of said successive time-slices of first digital data alternating with successive time-slices of second digital data.

8. Receiver apparatus for a digital broadcasting system that transmits successive time-slices of first coded digital data alternating with successive time-slices of second coded digital data, said first coded digital data generated by first Reed-Solomon coding of bit-complemented randomized digital data followed by byte-interleaving and bit-wise forward-error-correction coding of byte-interleaved results of said first Reed-Solomon coding, said second coded digital data generated by second Reed-Solomon coding of repeated said randomized digital data followed by byte-interleaving and bit-wise forward-error-correction coding of byte-interleaved results of said second Reed-Solomon coding, said second coded digital data being delayed a number of time-slice epochs respective to said first coded digital data based on the same original data, said receiver apparatus comprising:

a front-end tuner for converting a selected radio-frequency signal that conveys successive time-slices of said first coded digital data alternating with successive time-slices of said second coded digital data to a baseband digital signal composed of successive time-slices of said first coded digital data in soft-decision form alternating with successive time-slices of said second coded digital data in soft-decision form;

first selector apparatus for separating successive time-slices of said first coded digital data in soft-decision form from said baseband digital signal;

second selector apparatus for separating successive time-slices of said second coded digital data in soft-decision form from said baseband digital signal;

delay memory for delaying successive time-slices of said first coded digital data in soft-decision form as separated from said baseband signal to be contemporaneous with time-slices of said second coded digital data in soft-decision form separated from said baseband signal that they are bit-complements thereof, thus generating successive time-slices of delayed said first coded digital data in soft-decision form;

turbo decoder apparatus configured for decoding said bit-wise forward-error-correction (FEC) coding of said time-slices of said second coded digital data in soft-decision form separated from said baseband signal and said time-slices of said delayed first coded digital data in soft-decision form, thus to recover soft bits of Reed-Solomon-coded digital data, said decoding of said bit-wise FEC coding being performed cyclically, each cycle of that performance composed of a respective initial portion and a respective final portion;

a maximal-ratio code combiner for constructively combining soft bits of the byte-interleaved said first Reed-Solomon coding from said delayed first coded digital data with corresponding soft bits of the byte-interleaved said second Reed-Solomon coding from said second coded digital data to generate soft bits of combined Reed-Solomon-coded digital data for subsequent use by said turbo decoder apparatus for decoding said bit-wise forward-error-correction coding of said time-slices of said second coded digital data in soft-decision form separated from said baseband signal and said time-slices of said delayed first coded digital data in soft-decision form;

Reed-Solomon (RS) decoder apparatus configured for decoding said combined Reed-Solomon-coded digital data, thus to recover said randomized digital data; and a de-randomizer for de-randomizing said randomized digital data, thus to recover digital data in original form before randomization thereof.

9. Receiver apparatus as set forth in claim 8, wherein said RS decoder apparatus is configured for decoding 2-dimensional Reed-Solomon coding of digital data, thus to recover said randomized digital data.

10. Receiver apparatus as set forth in claim 8, further comprising:

apparatus for separating said delayed first coded digital data into first and second components thereof, said first component of said delayed first coded digital data composed of the delayed soft parity bits of the bit-wise FEC coding of said byte-interleaved results of said first Reed-Solomon coding, said second component of said delayed first coded digital data composed of the delayed soft bits of said byte-interleaved results of said first Reed-Solomon coding;

a first logic inverter for complementing the soft bits of said separated second component of said delayed first coded digital data, said first logic inverter connected for supplying the complemented soft bits of said second component of said delayed first coded digital data to the first of two input ports of said maximal-ratio code combiner; and apparatus for separating said second coded digital data into first and second components thereof, said first component of said second coded digital data composed of the soft parity bits of the bit-wise FEC coding of said byte-interleaved results of said second Reed-Solomon coding, said second component of said second coded digital data composed of the soft bits of said byte-interleaved results of said second Reed-Solomon coding, said apparatus for separating said second coded digital data into first and second components thereof connected for supplying the separated said second component of said second coded digital data to a second of said two input ports of said maximal-ratio code combiner.

11. Receiver apparatus as set forth in claim 10, wherein said turbo decoder apparatus comprises:
   first memory for temporarily storing a time-slice of soft bits of combined Reed-Solomon coding supplied thereto from an output port of said maximal-ratio code combiner and for further temporarily storing extrinsic data bits related to those soft bits of combined Reed-Solomon coding supplied from said maximal-ratio code combiner for temporary storage in said first memory, during reading from said first memory said extrinsic data bits being combined with said soft bits of said combined Reed-Solomon coding to which they respectively relate;
   second memory for temporarily storing a time-slice of said soft parity bits of the bit-wise FEC coding of said byte-interleaved results of said second Reed-Solomon coding that have been separated from said second coded digital data;
   a first soft-input/soft-output (SISO) decoder for recursive systematic convolutional (RSC) coding of bits, said first SISO decoder connected for receiving as input signal thereto soft bits read from said first memory and soft bits read from said second memory, said first SISO decoder configured for decoding said input signal thereto during said respective initial portion of each cycle of turbo decoding, said soft bits read from said first memory reproducing soft bits of said combined Reed-Solomon coding as augmented by extrinsic data bits when available, and said soft bits read from said second memory reproducing said soft parity bits of the bit-wise FEC coding of said byte-interleaved results of said second Reed-Solomon coding;
   a first extrinsic-data-feedback processor connected for comparing soft data bits of decoding results from said first SISO decoder with soft bits read from said first memory to generate updated extrinsic data bits for temporary storage within said first memory;
   a second logic inverter connected for complementing soft bits read from said first memory during said respective final portion of each cycle of turbo decoding;
   third memory for temporarily storing a time-slice of said soft parity bits of said bit-wise FEC coding of said byte-interleaved results of said first Reed-Solomon coding that have been separated from said delayed first coded digital data;
   a second soft-input/soft-output (SISO) decoder for recursive systematic convolutional (RSC) coding of bits, said second SISO decoder connected for receiving as input signal thereto soft bits complemented by said second logic inverter and soft bits read from said third memory, said second SISO decoder configured for decoding said input signal thereto during said respective final portion of each cycle of turbo decoding, said soft bits read from said third memory reproducing said soft parity bits of the bit-wise FEC coding of said byte-interleaved results of said first Reed-Solomon coding;
   a third logic inverter connected for complementing soft data bits of decoding results supplied from said second SISO decoder during said respective final portion of each cycle of turbo decoding;
   a second extrinsic-data-feedback processor connected for comparing the complemented soft data bits of decoding results from said second SISO decoder with soft bits read from said first memory to generate updated extrinsic data bits for temporary storage within said first memory; and
   means for de-interleaving byte interleaving of said Reed-Solomon-coded digital data in each said time-slice of soft bits read from said first memory at the conclusion of turbo decoding procedures performed on that said time slice.

12. Receiver apparatus as set forth in claim 11, wherein said first memory is configured for reading each said time-slice of soft data bits temporarily stored therein at the conclusion of turbo decoding procedures on that said time slice, so as to de-interleave byte interleaving of said Reed-Solomon-coded digital data preparatory to its being supplied to said RS decoder apparatus for decoding.

13. Receiver apparatus as set forth in claim 10, wherein said turbo decoder apparatus comprises:
   first memory for temporarily storing a time-slice of soft bits of combined Reed-Solomon coding supplied thereto from an output port of said maximal-ratio code combiner and for further temporarily storing extrinsic data bits related to those soft bits of combined Reed-Solomon coding supplied from said maximal-ratio code combiner for temporary storage in said first memory, during reading from said first memory said extrinsic data bits being combined with said soft bits of said combined Reed-Solomon coding to which they respectively relate;
   second memory for temporarily storing a time-slice of said soft parity bits of the bit-wise FEC coding of said byte-interleaved results of said second Reed-Solomon coding that have been separated from said second coded digital data;
   a first soft-input/soft-output (SISO) decoder for low-density parity-check (LDPC) coding of bits, said first SISO decoder connected for receiving as input signal thereto soft bits read from said first memory and soft bits read from said second memory, said first SISO decoder configured for decoding said input signal thereto during said respective initial portion of each cycle of turbo decoding, said soft bits read from said first memory reproducing soft bits of said combined Reed-Solomon coding as augmented by extrinsic data bits when available, and said soft bits read from said second memory reproducing said soft parity bits of the bit-wise FEC coding of said byte-interleaved results of said second Reed-Solomon coding;
   a first extrinsic-data-feedback processor connected for comparing soft data bits of decoding results from said first SISO decoder with soft bits read from said first memory to generate updated extrinsic data for temporary storage within said first memory;
   a second logic inverter connected for complementing soft bits read from said first memory during said respective final portion of each cycle of turbo decoding;
   third memory for temporarily storing a time-slice of said soft parity bits of said bit-wise FEC coding of said byte-interleaved results of said first Reed-Solomon coding that have been separated from said delayed first coded digital data;
   a second soft-input/soft-output (SISO) decoder for low-density parity-check (LDPC) coding of bits, said second SISO decoder connected for receiving as input signal thereto soft bits complemented by second logic inverter and soft bits read from said third memory, said second SISO decoder configured for decoding said input signal thereto during said respective final portion of each cycle of turbo decoding, said soft bits read from said third memory reproducing said soft parity bits of the bit-wise FEC coding of said byte-interleaved results of said first Reed-Solomon coding;

a third logic inverter connected for complementing soft data bits of decoding results supplied from said second SISO decoder during said respective final portion of each cycle of turbo decoding;

a second extrinsic-data-feedback processor connected for comparing the complemented soft data bits of decoding results from said second SISO decoder with soft bits read from said first memory to generate updated extrinsic data bits for temporary storage within said first memory; and means for de-interleaving byte interleaving of said Reed-Solomon-coded digital data in each said time-slice of soft bits read from said first memory at the conclusion of turbo decoding procedures that are performed on that said time slice.

14. Receiver apparatus as set forth in claim 13, wherein said first memory is configured for reading each said time-slice of soft data bits temporarily stored therein at the conclusion of turbo decoding procedures on that said time slice so as to de-interleave byte interleaving of said Reed-Solomon-coded digital data preparatory to its being supplied to said RS decoder apparatus for decoding.

15. Receiver apparatus as set forth in claim 8, further comprising:

apparatus for separating said delayed first coded digital data into first and second components thereof, said first component of said delayed first coded digital data composed of the delayed soft parity bits of the bit-wise FEC coding of said byte-interleaved results of said first Reed-Solomon coding, said second component of said delayed first coded digital data composed of the delayed soft bits of said byte-interleaved results of said first Reed-Solomon coding, said apparatus for separating said delayed first coded digital data into first and second components thereof connected for supplying the separated said second component of said delayed first coded digital data to a first of two input ports of said maximal-ratio code combiner;

apparatus for separating said second coded digital data into first and second components thereof, said first component of said second coded digital data composed of the soft parity bits of the bit-wise FEC coding of said byte-interleaved results of said second Reed-Solomon coding, said second component of said second coded digital data composed of the soft bits of said byte-interleaved results of said second Reed-Solomon coding; and a first logic inverter connected for complementing the soft bits of said second component of said second coded digital data, said first logic inverter connected for supplying the complemented said soft bits of said second component of said second coded digital data to a second of said two input ports of said maximal-ratio code combiner.

16. Receiver apparatus as set forth in claim 15, wherein said turbo decoder apparatus comprises:

first memory for temporarily storing a time-slice of soft bits of combined Reed-Solomon coding supplied thereto from an output port of said maximal-ratio code combiner and for further temporarily storing extrinsic data related to those soft bits of combined Reed-Solomon coding supplied from said maximal-ratio code combiner for temporary storage in said first memory, during reading from said first memory said extrinsic data bits being combined with said soft bits of said combined Reed-Solomon coding to which they respectively relate;

a second logic inverter connected for complementing soft bits read from said first memory during a respective initial half portion of each cycle of turbo decoding;

second memory for temporarily storing a time-slice of said soft parity bits of the bit-wise FEC coding of said byte-interleaved results of said second Reed-Solomon coding that have been separated from said second coded digital data;

a first soft-input/soft-output (SISO) decoder for recursive systematic convolutional (RSC) coding of bits, said first SISO decoder connected for receiving as input signal thereto complemented soft bits from said second logic inverter and soft parity bits read from said second memory, said first SISO decoder further connected for decoding said input signal thereto during said respective initial portion of each cycle of turbo decoding, said soft bits read from said second memory reproducing said soft parity bits of the bit-wise FEC coding of said byte-interleaved results of said second Reed-Solomon coding;

a third logic inverter connected for complementing soft bits of decoding results supplied from said first SISO decoder during said respective initial portion of each cycle of turbo decoding;

a first extrinsic-data-feedback processor connected for comparing the complemented soft data bits of decoding results from said first SISO decoder with soft bits read from said first memory to generate updated extrinsic data bits for temporary storage within said first memory;

third memory for temporarily storing a time-slice of said soft parity bits separated from said delayed first coded digital data;

a second soft-input/soft-output (SISO) decoder for recursive systematic convolutional (RSC) coding of bits, said second SISO decoder connected for receiving as input signal thereto soft bits read from said first memory and soft bits read from said third memory, said soft bits read from said third memory reproducing said soft parity bits of the bit-wise FEC coding of said byte-interleaved results of said first Reed-Solomon coding, said second SISO decoder further connected for decoding said input signal thereto during said respective final portion of each cycle of turbo decoding;

a second extrinsic-data-feedback processor connected for comparing soft data bits of decoding results from said second SISO decoder with soft bits read from said first memory to generate updated extrinsic data bits for temporary storage within said first memory;

means for de-interleaving byte interleaving of said Reed-Solomon-coded digital data in each said time-slice of soft bits read from said first memory at the conclusion of turbo decoding procedures that are performed on that said time slice; and a fourth logic inverter connected for complementing said soft bits of said Reed-Solomon-coded digital data de-interleaved at each said conclusion of said turbo decoding procedures that are respectively performed on each said time slice.

17. Receiver apparatus as set forth in claim 16, wherein said first memory is configured for reading each said time-slice of soft data bits temporarily stored therein at the conclusion of turbo decoding procedures on that said time slice so as to de-interleave byte interleaving of said Reed-Solomon-coded digital data preparatory to its being supplied to said RS decoder apparatus for decoding.

18. Receiver apparatus as set forth in claim 15, wherein said turbo decoder apparatus comprises:

- first memory for temporarily storing a time-slice of soft data bits supplied thereto from an output port of said maximal-ratio code combiner and for further temporarily storing extrinsic data related to those soft data bits supplied from said maximal-ratio code combiner for temporary storage in said first memory, during reading from said first memory said extrinsic data bits being combined with said soft bits of said combined Reed-Solomon coding to which they respectively relate;
- a second logic inverter connected for complementing soft bits read from said first memory during a respective initial portion of each cycle of turbo decoding;
- second memory for temporarily storing a time-slice of said soft parity bits separated from the soft data bits of said second coded digital data;
- a first soft-input/soft-output (SISO) decoder for low-density parity-check (LDPC) coding of bits, said first SISO decoder connected for receiving as input signal thereto complemented soft bits from said second logic inverter and soft parity bits read from said second memory, said soft bits read from said second memory reproducing said soft parity bits of the bit-wise FEC coding of said byte-interleaved results of said second Reed-Solomon coding, said first SISO decoder further connected for decoding said input signal thereto during said respective initial portion of each cycle of turbo decoding;
- a third logic inverter connected for complementing soft data bits of decoding results supplied from said first SISO decoder during said respective initial portion of each cycle of turbo decoding;
- a first extrinsic-data-feedback processor connected for comparing the complemented soft data bits of decoding results from said first SISO decoder with soft bits read from said first memory to generate updated extrinsic data for temporary storage within said first memory;
- third memory for temporarily storing a time-slice of said soft parity bits separated from said delayed first coded digital data;
- a second soft-input/soft-output (SISO) decoder for low-density parity-check (LDPC) coding of bits, said second SISO decoder connected for receiving as input signal thereto soft bits read from said first memory and soft bits read from said third memory, said second SISO decoder further connected for decoding said input signal thereto during said respective final portion of each cycle of turbo decoding said soft bits read from said third memory reproducing said soft parity bits of the bit-wise FEC coding of said byte-interleaved results of said first Reed-Solomon coding;
- a second extrinsic-data-feedback processor connected for comparing soft data bits of decoding results from said second SISO decoder with soft data bits read from said first memory to generate updated extrinsic data for temporary storage within said first memory;
- means for de-interleaving byte interleaving of said Reed-Solomon-coded digital data in each said time-slice of soft data bits read from said first memory at the conclusion of turbo decoding procedures on that said time slice; and
- a fourth logic inverter connected for complementing said soft bits of said Reed-Solomon-coded digital data de-interleaved at each said conclusion of said turbo decoding procedures that are respectively performed on each said time slice.

19. Receiver apparatus as set forth in claim 18, wherein said first memory is configured for reading each said time-slice of soft data bits temporarily stored therein at the conclusion of turbo decoding procedures on that said time slice so as to de-interleave byte interleaving of said Reed-Solomon-coded digital data preparatory to its being supplied to said RS decoder apparatus for decoding.

20. Receiver apparatus for a digital broadcasting system that transmits successive time-slices of first coded digital data alternating with successive time-slices of second coded digital data, said first coded digital data generated by first outer forward-error-correction (FEC) coding of bit-complemented randomized digital data followed by byte-interleaving and first inner forward-error-correction (FEC) coding of byte-interleaved results of said first outer FEC coding, said second coded digital data generated by second outer FEC coding of repeated said randomized digital data followed by interleaving and bit-wise second inner FEC coding of byte-interleaved results of said second inner FEC coding, said second coded digital data being delayed a number of time-slice epochs respective to said first coded digital data based on the same original data, said receiver apparatus comprising:

- a front-end tuner for converting a selected radio-frequency signal that conveys successive time-slices of said first coded digital data alternating with successive time-slices of said second coded digital data to a baseband digital signal composed of successive time-slices of said first coded digital data in soft-decision form alternating with successive time-slices of said second coded digital data in soft-decision form;
- first selector apparatus for separating successive time-slices of said first coded digital data in soft-decision form from said baseband digital signal;
- second selector apparatus for separating successive time-slices of said second coded digital data in soft-decision form from said baseband digital signal;
- delay memory for delaying successive time-slices of said first coded digital data in soft-decision form as separated from said baseband signal to be contemporaneous with time-slices of said second coded digital data in soft-decision form separated from said baseband signal that they are bit-complements thereof, thus generating successive time-slices of delayed said first coded digital data in soft-decision form;
- turbo decoder apparatus configured for decoding said second inner FEC coding of said time-slices of said second coded digital data in soft-decision form separated from said baseband signal and said first inner FEC coding of said time-slices of said delayed first coded digital data in soft-decision form separated from said baseband signal, thus to recover soft bits of outer-coded digital data, said decoding being performed cyclically, each cycle of turbo decoding composed of a respective initial portion and a respective final portion, the decoding of said bit-wise first inner FEC coding and the decoding of said bit-wise second inner FEC coding being performed alternately during different ones of the initial and final portions of each cycle of turbo decoding;
- a maximal-ratio code combiner for constructively combining soft bits of the byte-interleaved said first outer FEC coding from said delayed first coded digital data with corresponding soft bits of the interleaved said second outer FEC coding from said second coded digital data to generate soft bits of combined outer-FEC-coded digital data for subsequent use by said turbo decoder apparatus for decoding said bit-wise forward-error-correction coding of said time-slices of said second coded digital data in soft-decision form separated from said baseband signal and said time-slices of said delayed first coded digital data in soft-decision form;

further decoder apparatus configured for decoding said combined outer-FEC-coded digital data, thus to recover said randomized digital data; and a de-randomizer for de-randomizing said randomized digital data, thus to recover digital data in original form before randomization thereof.

21. Receiver apparatus as set forth in claim 20, further comprising:

apparatus for separating said delayed first coded digital data into first and second components thereof, said first component of said delayed first coded digital data composed of the delayed soft parity bits of the first inner FEC coding, said second component of said delayed first coded digital data composed of the delayed soft bits of said interleaved results of said first outer FEC coding;

a first logic inverter for complementing the soft bits of said separated second component of said delayed first coded digital data, said first logic inverter connected for supplying the complemented soft bits of said second component of said delayed first coded digital data to a first of two input ports of said maximal-ratio code combiner; and apparatus for separating said second coded digital data into first and second components thereof, said first component of said second coded digital data composed of the soft parity bits of the second inner FEC coding, said second component of said second coded digital data composed of the soft bits of said interleaved results of said second outer FEC coding, said apparatus for separating said second coded digital data into first and second components thereof connected for supplying the separated said second component of said second coded digital data to a second of said two input ports of said maximal-ratio code combiner;

first memory for temporarily storing a time-slice of soft bits of combined outer FEC coding supplied thereto from an output port of said maximal-ratio code combiner and for further temporarily storing extrinsic data bits related to those soft bits of combined outer FEC coding supplied from said maximal-ratio code combiner for temporary storage in said first memory, during reading from said first memory said extrinsic data bits being combined with said soft bits of said combined outer FEC coding to which they respectively relate;

second memory for temporarily storing a time-slice of said soft parity bits of the second inner FEC coding that has been separated from said second coded digital data;

a first soft-input/soft-output (SISO) decoder for said second inner FEC coding, said first SISO decoder connected for receiving as input signal thereto soft bits read from said first memory and soft bits read from said second memory, said first SISO decoder configured for decoding said input signal thereto during said respective initial portion of each cycle of turbo decoding, said soft bits read from said first memory reproducing soft bits of said combined outer FEC coding as augmented by extrinsic data bits when available, and said soft bits read from said second memory reproducing said soft parity bits of the second inner FEC coding;

a first extrinsic-data-feedback processor connected for comparing soft data bits of decoding results from said first SISO decoder with soft bits read from said first memory to generate updated extrinsic data bits for temporary storage within said first memory;

a second logic inverter connected for complementing soft bits read from said first memory during said respective final portion of each cycle of turbo decoding;

third memory for temporarily storing a time-slice of said soft parity bits of said first inner FEC coding that have been separated from said delayed first coded digital data;

a second soft-input/soft-output (SISO) decoder for said first inner FEC coding, said second SISO decoder connected for receiving as input signal thereto soft bits complemented by said second logic inverter and soft bits read from said third memory, said second SISO decoder configured for decoding said input signal thereto during said respective final portion of each cycle of turbo decoding, said soft bits read from said third memory reproducing said soft parity bits of the first inner FEC coding of said byte-interleaved results of said first outer FEC coding;

a third logic inverter connected for complementing soft data bits of decoding results supplied from said second SISO decoder during said respective final portion of each cycle of turbo decoding;

a second extrinsic-data-feedback processor connected for comparing the complemented soft data bits of decoding results from said second SISO decoder with soft bits read from said first memory to generate updated extrinsic data bits for temporary storage within said first memory; and means for de-interleaving interleaving of said combined outer-FEC-coded digital data in each said time-slice of soft bits read from said first memory at the conclusion of turbo decoding procedures performed on that said time slice.

22. Receiver apparatus as set forth in claim 21, wherein said first memory is configured for reading each said time-slice of soft data bits temporarily stored therein at the conclusion of turbo decoding procedures on that said time slice, so as to de-interleave interleaving of said combined outer-FEC-coded digital data preparatory to its being supplied to said further decoder apparatus configured for decoding said combined outer-FEC-coded digital data.

23. Receiver apparatus as set forth in claim 20, further comprising:

apparatus for separating said delayed first coded digital data into first and second components thereof, said first component of said delayed first coded digital data composed of the delayed soft parity bits of said first inner FEC coding, said second component of said delayed first coded digital data composed of the delayed soft bits of said interleaved results of said first outer FEC coding, said apparatus for separating said delayed first coded digital data into first and second components thereof connected for supplying the separated said second component of said delayed first coded digital data to a first of two input ports of said maximal-ratio code combiner;

apparatus for separating said second coded digital data into first and second components thereof, said first component of said second coded digital data composed of the soft parity bits of said second inner FEC coding, said second component of said second coded digital data composed of the soft bits of said byte-interleaved results of said second outer FEC coding; and a first logic inverter connected for complementing the soft bits of said second component of said second coded digital data, said first logic inverter connected for supplying the complemented said soft bits of said second component of said second coded digital data to a second of said two input ports of said maximal-ratio code combiner;

first memory for temporarily storing a time-slice of soft bits of combined outer FEC coding supplied thereto from an output port of said maximal-ratio code combiner and for further temporarily storing extrinsic data related to those soft bits of combined outer FEC coding supplied from said maximal-ratio code combiner for temporary storage in said first memory, during reading from said first memory said extrinsic data bits being combined with said soft bits of said combined outer FEC coding to which they respectively relate;

a second logic inverter connected for complementing soft bits read from said first memory during a respective initial portion of each cycle of turbo decoding;

second memory for temporarily storing a time-slice of said soft parity bits of said second inner FEC coding that have been separated from said second coded digital data;

a first soft-input/soft-output (SISO) decoder for recursive systematic convolutional (RSC) coding of bits, said first SISO decoder connected for receiving as input signal thereto complemented soft bits from said second logic inverter and soft parity bits read from said second memory, said first SISO decoder further connected for decoding said input signal thereto during said respective initial portion of each cycle of turbo decoding, said soft bits read from said first memory reproducing soft bits of said combined Reed-Solomon coding as augmented by extrinsic data bits when available, and said soft bits read from said second memory reproducing said soft parity bits of said second inner FEC coding;

a third logic inverter connected for complementing soft data bits of decoding results supplied from said first SISO decoder during said respective initial portion of each cycle of turbo decoding;

a first extrinsic-data-feedback processor connected for comparing the complemented soft data bits of decoding results from said first SISO decoder with soft bits read from said first memory to generate updated extrinsic data bits for temporary storage within said first memory;

third memory for temporarily storing a time-slice of said soft parity bits separated from said delayed first coded digital data;

a second soft-input/soft-output (SISO) decoder for said first inner FEC coding of bits, said second SISO decoder connected for receiving as input signal thereto soft bits read from said first memory and soft bits read from said third memory, said soft bits read from said third memory reproducing said soft parity bits of said first inner FEC coding, said second SISO decoder further connected for decoding said input signal thereto during said respective final portion of each cycle of turbo decoding;

a second extrinsic-data-feedback processor connected for comparing soft bits of decoding results from said second SISO decoder with soft bits read from said first memory to generate updated extrinsic data bits for temporary storage within said first memory;

means for de-interleaving said interleaving of said first outer-FEC-coded digital data in each said time-slice of soft bits read from said first memory at the conclusion of turbo decoding procedures that are performed on that said time slice; and a fourth logic inverter connected for complementing the first outer-FEC-coded digital data de-interleaved at each said conclusion of said turbo decoding procedures that are respectively performed on each said time slice.

24. Receiver apparatus as set forth in claim 23, wherein said first memory is configured for reading each said time-slice of soft data bits temporarily stored therein at the conclusion of turbo decoding procedures on that said time slice, so as to de-interleave byte interleaving of said combined outer-FEC-coded digital data preparatory to its being supplied to said further decoder apparatus configured for decoding said combined outer-FEC-coded digital data.

* * * * *